(12) United States Patent
Mellor, Jr. et al.

(10) Patent No.: US 11,515,837 B2
(45) Date of Patent: Nov. 29, 2022

(54) SOLAR POWER SYSTEM COMMISSIONING

(71) Applicant: SunPower Corporation, San Jose, CA (US)

(72) Inventors: Richard E. Mellor, Jr., San Jose, CA (US); Gaurang Kavaiya, San Jose, CA (US); Jonathan Tucker Thompson, San Jose, CA (US); Sandeep Narla, San Jose, CA (US); Joseph Griffin, San Jose, CA (US); Rasoul Ghadami, San Jose, CA (US); Udo Uebel, San Jose, CA (US); Alvin Cheung, San Jose, CA (US); Fernando Cervantes, San Jose, CA (US); Alberto Fonts Zaragoz, San Jose, CA (US); Troy Yang, San Jose, CA (US); Daidipya Patwa, San Jose, CA (US); Rex Liu, San Jose, CA (US)

(73) Assignee: SUNPOWER CORPORATION, San Jose, CA (US)

( * ) Notice: Subject to any disclaimer, the term of this patent is extended or adjusted under 35 U.S.C. 154(b) by 118 days.

(21) Appl. No.: 17/163,671

(22) Filed: Feb. 1, 2021

(65) Prior Publication Data

US 2021/0257968 A1 Aug. 19, 2021

Related U.S. Application Data

(60) Provisional application No. 63/066,043, filed on Aug. 14, 2020, provisional application No. 62/987,036, filed on Mar. 9, 2020, provisional application No. 62/978,187, filed on Feb. 18, 2020.

(51) Int. Cl.
| | | |
|---|---|---|
| *H02S 50/00* | (2014.01) | |
| *H04B 3/54* | (2006.01) | |
| *H02J 7/00* | (2006.01) | |
| *H02J 7/35* | (2006.01) | |
| *H04W 88/02* | (2009.01) | |

(52) U.S. Cl.
CPC ............ *H02S 50/00* (2013.01); *H02J 7/0048* (2020.01); *H02J 7/35* (2013.01); *H04B 3/542* (2013.01); *H04W 88/02* (2013.01)

(58) Field of Classification Search
CPC . H02S 50/00; H02J 7/0048; H02J 7/35; H02J 7/00; H04B 3/542; H04B 3/54; H04W 88/02
See application file for complete search history.

(56) References Cited

U.S. PATENT DOCUMENTS

| | | |
|---|---|---|
| 2015/0188486 A1 | 7/2015 | Marroquin |
| 2018/0109224 A1 | 4/2018 | Chapman et al. |
| 2019/0260207 A1 | 8/2019 | Chapman et al. |
| 2019/0267939 A1 | 8/2019 | Rodriguez et al. |

*Primary Examiner* — Robert L Deberadinis
(74) *Attorney, Agent, or Firm* — Xsensus LLP

(57) ABSTRACT

Commissioning a solar power monitoring system includes imaging a plurality of labels, wherein each label of the plurality of labels is associated with an electronic component. Further, commissioning the solar power monitoring system includes discovering each electronic component at the same time based on the imaging of the plurality of labels, displaying a list of the discovered electronic components, and commissioning a solar power monitoring system including the discovered electronic components for use.

20 Claims, 46 Drawing Sheets

120

2100

2505

SOLAR POWER SYSTEM COMMISSIONING

CROSS-REFERENCE TO RELATED APPLICATIONS

This application claims the benefit of U.S. Provisional Application No. 62/978,187, filed Feb. 18, 2020, U.S. Provisional Application No. 62/987,036, filed Mar. 9, 2020, and U.S. Provisional Application No. 63/066,043, filed Aug. 14, 2020, which are incorporated herein by reference in their entirety. Related application U.S. patent application Ser. No. 14/810,423, filed Jul. 27, 2015 is incorporated herein by reference in its entirety.

BACKGROUND

Photovoltaic (PV) cells, commonly known as solar cells, are devices for conversion of solar radiation into electrical energy. Generally, solar radiation impinging on the surface of, and entering into, the substrate of a solar cell creates electron and hole pairs in the bulk of the substrate. The electron and hole pairs migrate to p-doped and n-doped regions in the substrate, thereby creating a voltage differential between the doped regions. The doped regions are connected to the conductive regions on the solar cell to direct an electrical current from the cell to an external circuit. When PV cells are combined in an array such as a PV module, the electrical energy collected from all of the PV cells can be combined in series and parallel arrangements to provide power with a certain voltage and current.

Solar power systems can include solar or photovoltaic (PV) modules installed in a layout at an installation site. The installation process involves an installer placing rows of PV modules and connecting these rows of PV modules together into one or more groupings of the installation layout. The PV modules may be connected in groupings of various numbers and have several groupings at an installation site. The groupings may be uniform, for example six PV modules in each grouping, and nonuniform, for example, four PV modules in two groups and six PV modules in one group. Cabling and connections are also installed by an installer to connect and support the PV modules of a grouping and for the PV system installation as a whole. Once finished, the cabling and connections for the groupings of the PV modules, and of the PV system installation, remain in place, to permit the PV modules, and the whole installation, to transmit the electrical power the system is generating.

Some PV module are physically associated with an electronic component, power optimizer for processing DC power produced by the PV module. In one example, a microinverter is physically associated with a PV module to convert direct current (DC) generated by a single PV module to alternating current (AC). In these applications, DC power generated by a DC PV module may be converted to AC power through the use of a DC-to-AC power inverter, or microinverter physically associated with a PV module and the PV module may be referred to as an alternating current photovoltaic (ACPV) module. In some typical ACPV module implementations, the junction box of the PV module is replaced with the microinverter.

After installation of a solar power system, the solar power system is commissioned before it is fully operational. Conventionally, with the migration to microinverter or ACPV module platforms, commissioning solar power systems is time consuming and error prone due to electrical noise and low data transmission speed.

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

SUMMARY

According to aspects of the disclosed subject matter, commissioning a solar power monitoring system includes imaging a plurality of labels, wherein each label of the plurality of labels is associated with an electronic component (e.g., power optimizer, power conditioner, microinverter). Further, commissioning the solar power monitoring system includes discovering each electronic component in one step based on the imaging of one or more labels, displaying a list of the discovered electronic components, and commissioning a solar power monitoring system including the discovered electronic components for use.

According to aspects of the disclosed subject matter, commissioning a solar power system includes discovering electronic components of the solar power system, mapping the electronic components in a solar power system topology, determining health status of the electronic components, and determining a health status of the solar power system.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
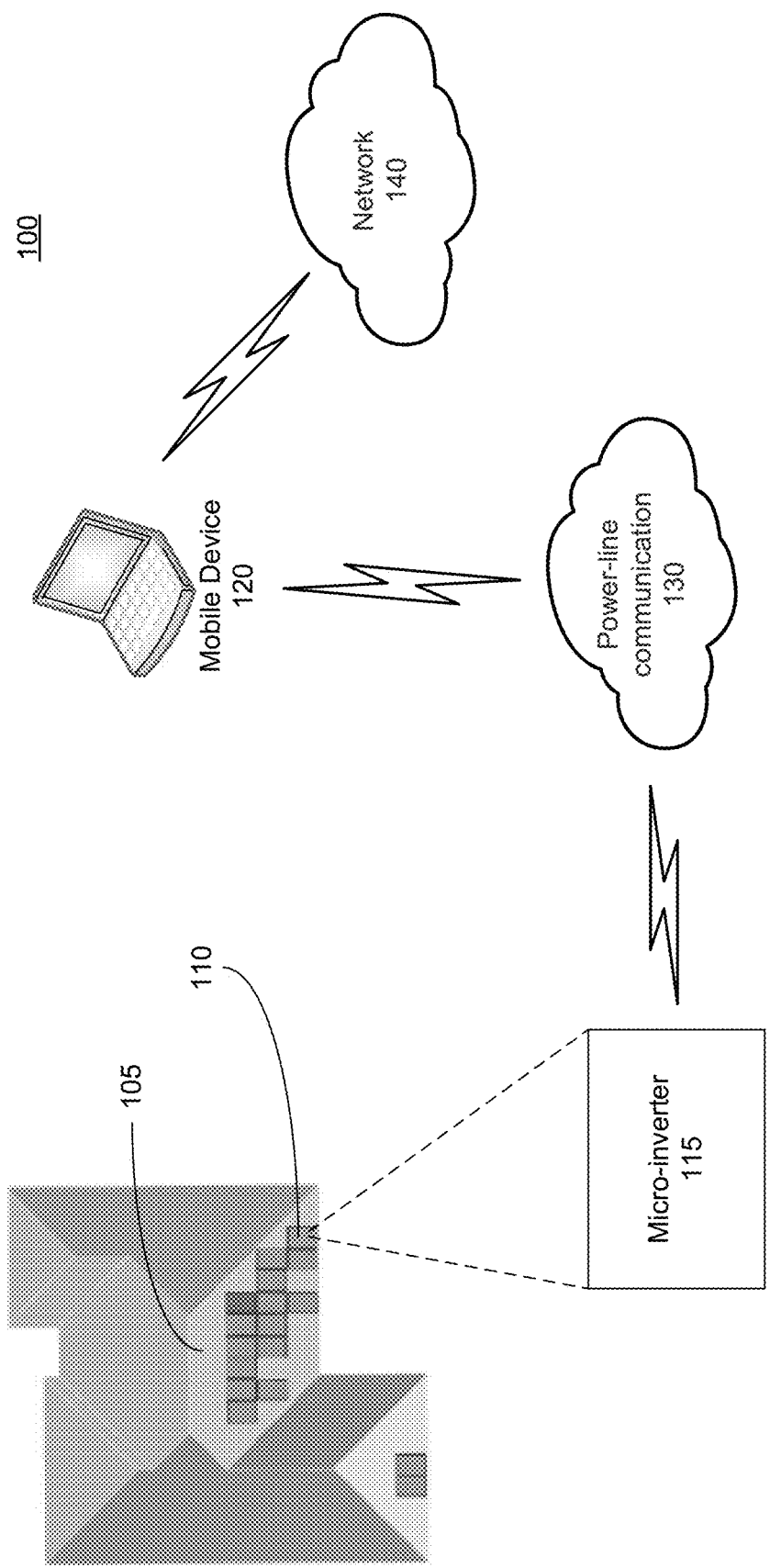
FIG. 1 illustrates an exemplary overview of a system for commissioning a solar power system according to one or more aspects of the disclosed subject matter.

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed subject matter. However, it will be apparent to those skilled in the art that embodiments may be practiced without these specific details. In some instances, well-known structures and components may be shown in block diagram form in order to avoid obscuring the concepts of the disclosed subject matter.

Reference throughout the specification to "one embodiment" or "an embodiment" means that a particular feature, structure, characteristic, operation, or function described in connection with an embodiment is included in at least one embodiment of the disclosed subject matter. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments. Further, it is intended that embodiments of the disclosed subject matter can and do cover modifications and variations of the described embodiments.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit embodiments of the disclosed subject matter to any particular orientation or configuration. Furthermore, terms such as "first," "second," "third," etc., merely identify one of a number of portions, components, points of reference, operations and/or functions as described herein, and likewise do not necessarily limit embodiments of the disclosed subject matter to any particular configuration or orientation.

Physically installing a solar panel system or array includes various steps like attaching rails or mounts to a support surface of the installation site, securing or mounting solar panels, electrically interconnecting or grouping the solar panels, e.g., in series and/or in parallel, and the like. In some solar power systems, an electronic component, power optimizer, power conditioner and/or power converter (e.g., string inverter) is associated with a group or string of PV panels. In some solar power systems, an electronic component, power optimizer, power conditioner and/or power converter is associated with the PV panel. However, as part of the commissioning process for a solar power monitoring system, each electronic component of a PV module (e.g., microinverter) may need to be discovered and associated with the physical location of the solar panel it is connected to or associated with. Discovery as a process has been a requirement of solar power monitoring systems for years. In earlier iterations of the on-site technology this was a quick process due to the nature of the communications medium used to connect the equipment. With the migration to microinverter platforms these reliable communications channels gave way, for cost considerations, to power line communication (PLC) communications which is inherently less reliable than previous technologies such as RS485 and Ethernet. As a result, commissioning times and reliability suffered greatly. For example, the communication method is broad and results in neighboring sites being able to communicate with one another which creates problems like interference from other equipment, devices from other systems can be discoverable, and the like, which creates many opportunities for problems. In other words, when trying to discover microinverters for a particular solar power system, the PLC communications can end up associating the solar power monitoring system with the wrong equipment (i.e., poaching). As systems grow in size and additional power conditioning equipment gets deployed on residential and/or commercial sites (e.g., storage inverters, EV chargers, etc.), these complications are magnified.

Referring now to the drawings, wherein like reference numerals designate identical or corresponding parts throughout the several views:

FIG. 1 illustrates an exemplary overview of a system 100 for commissioning a solar power system (herein referred to as the system 100) according to one or more aspects of the disclosed subject matter. The system 100 can include a structure having a roof, or at least one facet 105 of a roof, that includes at least one solar panel 110, a microinverter 115 electrically coupled to the solar panel 110, and a mobile device 120 communicably coupled to the microinverter 115 via power line communication (PLC) 130. The mobile device 120 can also be configured to access to other networks (e.g., network 140).

The facet 105 can represent a portion of a roof on which solar panels 110 can be installed. The solar panel 110 can represent one or more solar panels installed on a roof, where each solar panel 110 is connected to a microinverter 115.

The microinverter 115 can represent one or more microinverters 115 where each of the one or more microinverters 115 is electrically connected to the solar panels 110, respectively. In other words, each solar panel 110 includes a microinverter 115 electrically connected to it. In one aspect, the microinverters 115 can be electrically connected to each other in parallel.

The mobile device 120 can represent one or more mobile devices communicably coupled to the microinverter 115 via the PLC 130. The mobile device 120 can be a computer, laptop, smartphone, tablet, PDA, smart watch, and the like. The mobile device 120 can be operated by a user to interact with the system 100 as further described herein. For example, an installation technician commissioning the solar power system can use the mobile device 120 to discover the microinverters 115, identify faulted microinverters 115, and commission the solar power system as further described herein.

The PLC 130 is a communication technology that enables sending data over existing power cables. In other words, power-line communication encompasses systems that use electric power lines to carry information. The mobile device 120 can be configured to discover the microinverters 115 via PLC 130 more efficiently and more robustly as further described herein.

The network 140 can be a public network, such as the Internet, or a private network, such as an LAN or WAN network, or any combination thereof and can also include PSTN or ISDN sub-networks. The network 140 can also be wired, such as an Ethernet network, or can be wireless such as a cellular network including EDGE, 3G, 4G, and 5G wireless cellular systems. The wireless network can also be Wi-Fi, Bluetooth, or any other wireless form of communication that is known.

Generally, the mobile device 120 can be configured to discover the microinverters 115 connected to the solar panels 110. After discovering the microinverters 115, the mobile device 120 can be configured to display a list of the discovered microinverters 115. Further, the process of discovering the microinverters 115 and displaying the list of the discovered microinverters 115 can be repeated for each facet (e.g., facet 105) of a roof on which at least one solar panel 110 is installed. In other words, the mobile device 120 can be configured to rapidly bulk scan all of the site equipment and configure it for use by the solar power monitoring system, including an automatic determination of solar array layout. The process allows installation technicians to quickly assemble all of the device labels into a format that is suitable for bulk scanning and provides mobile application software that allows the technician to scan, in one action, all of the labels for the equipment they're installing on site. The relative position of the labels may also be used to generate a map of the solar array layout with correct micro inverter position associations. The legacy method of adding and configuring these devices would take a long time and would often need to be attempted multiple times due to PLC errors. This bulk scanning and mapping method can be performed in seconds and the gathered information can be configured directly on the solar power monitoring platform, resolving the time and performance issues.

More specifically, the goal for commissioning the solar power system includes knowing which microinverters 115 are on the roof and to connect the solar power monitoring system to the microinverters 115. In other words, the microinverters 115 need to be associated with the gateway that does the monitoring for the solar power monitoring system. Instead of using a blind broadcast discovery mechanism to locate and associate that equipment, the mobile device 120 can be configured to use an imaging sensor (e.g., a camera) to associate the microinverters 115 with the gateway more explicitly by scanning labels associated with each microinverter 115. For example, this identifies a definitive list of equipment installed on the site, and the list can be handed over to the solar power monitoring system for monitoring.

Further, to streamline the process as much as possible, a bulk scanning method can be implemented so the installation technician does not have to scan each label (e.g., barcode, QR code, etc. printed on the label) individually. Instead, all the labels can be arranged on one page (e.g., the page can represent one facet 105 of the roof) such that the arrangement matches the physical positional layout of the solar panels 110 on that facet 105 of the roof, and all the labels can be scanned at the same time. Because all the labels are scanned at the same time, the full list of the microinverters 115, each being associated with their respective solar panel, can be displayed in a list. Additionally, because the labels are arranged to represent the physical layout of the solar panels 110, solar panel layout information (e.g., relative positions of the solar panels 110) can be determined. Accordingly, the bulk scanning provides several advantages. Because the bulk scanning is based on computer vision, additional information can be inferred based on the scan. For example, by placing the labels in a way that approximates the layout, the relative positions of the solar panels 110 can be determined from the bulk scan as well. As a result, the bulk scan provides the list of devices and the solar panel layout information all in one step.

Figure 2:
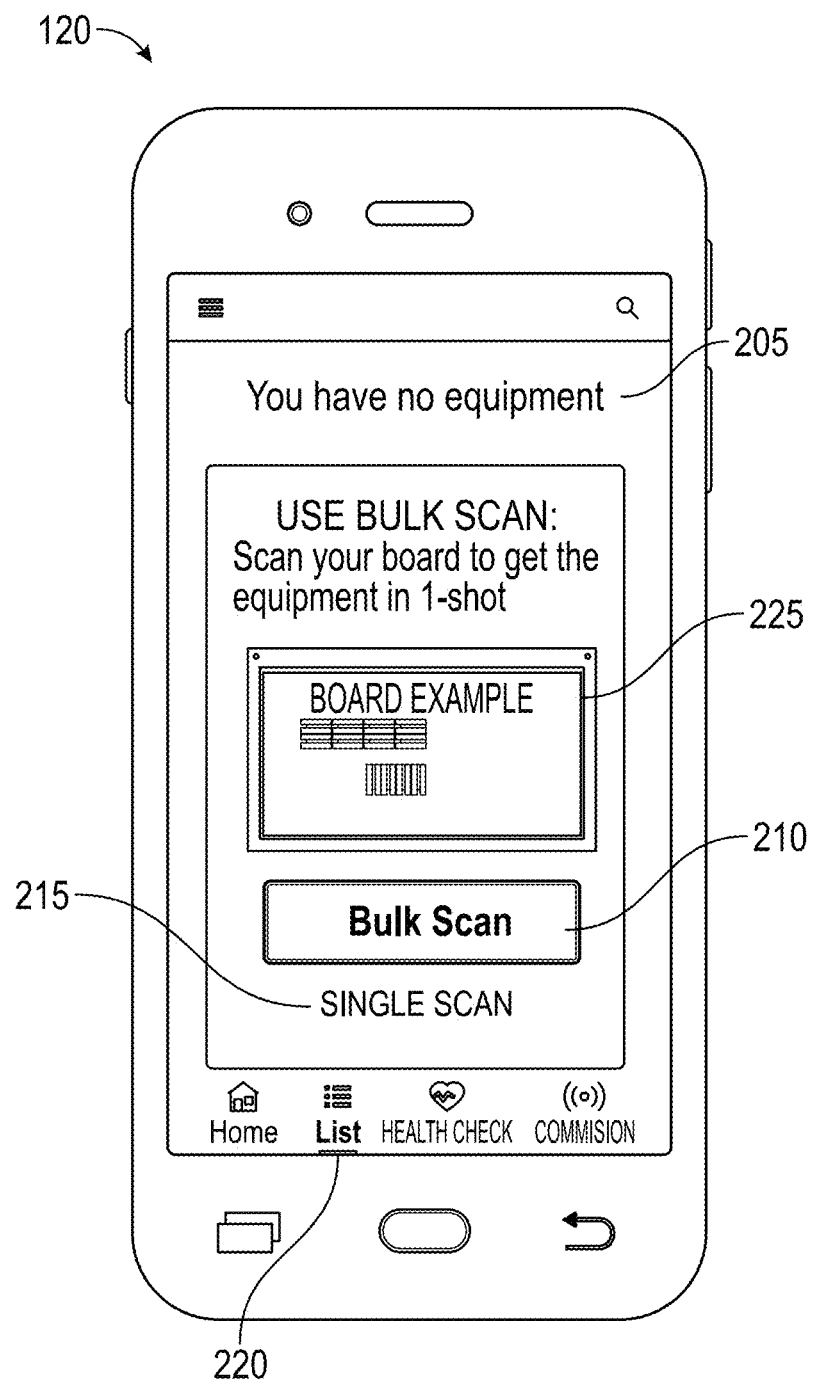
FIG. 2 illustrates an exemplary user interface of a mobile device for initiating a scan according to one or more aspects of the disclosed subject matter.

FIG. 2 illustrates an exemplary user interface 205 of the mobile device 120 for initiating a scan according to one or more aspects of the disclosed subject matter. In one aspect, the mobile device 120 can be programmed to execute a mobile software application (e.g., a commissioning application) where the user interfaces 205, 305, 405, and 505 in FIGS. 2, 3, 4, and 5, respectively, can be part of the mobile software application, and the various functionality described herein to commission the solar power system can be performed using the mobile software application. Additionally, for example, reference to the mobile device 120 being configured to perform the functionality described herein can be interchangeable with reference to the mobile software application executing the functionality described herein via the mobile device 120.

The user interface 205 can include a bulk scan button 210 and a single scan button 215 as part of a list tab 220. The bulk scan button 210 can be configured to access a camera of the mobile device 120. The functionality provided by the bulk scan button 210 (e.g., by using the camera to image an arrangement of a plurality of labels as described in FIG. 3) can include initiating imaging using machine vision to scan a plurality of labels and determine a relative position of the solar panels in one step. The single scan button 215 can also be configured to access a camera of the mobile device 120 so that the mobile device can scan a single label, for example. Additionally, the user interface 205 can include an example 225 of a label layout for a bulk scan. The example includes labels associated with microinverters (e.g., via barcode, QR code, serial number, etc.). For example, the labels can be removed from the microinverters before installing the microinverters, and the labels can be arranged to match the physical layout of the solar panels installed on a facet of the roof. It should be appreciated that reference to the physical layout of the solar panels can correspond to the where each solar panel is installed in a solar panel array on the roof.

Figure 3:
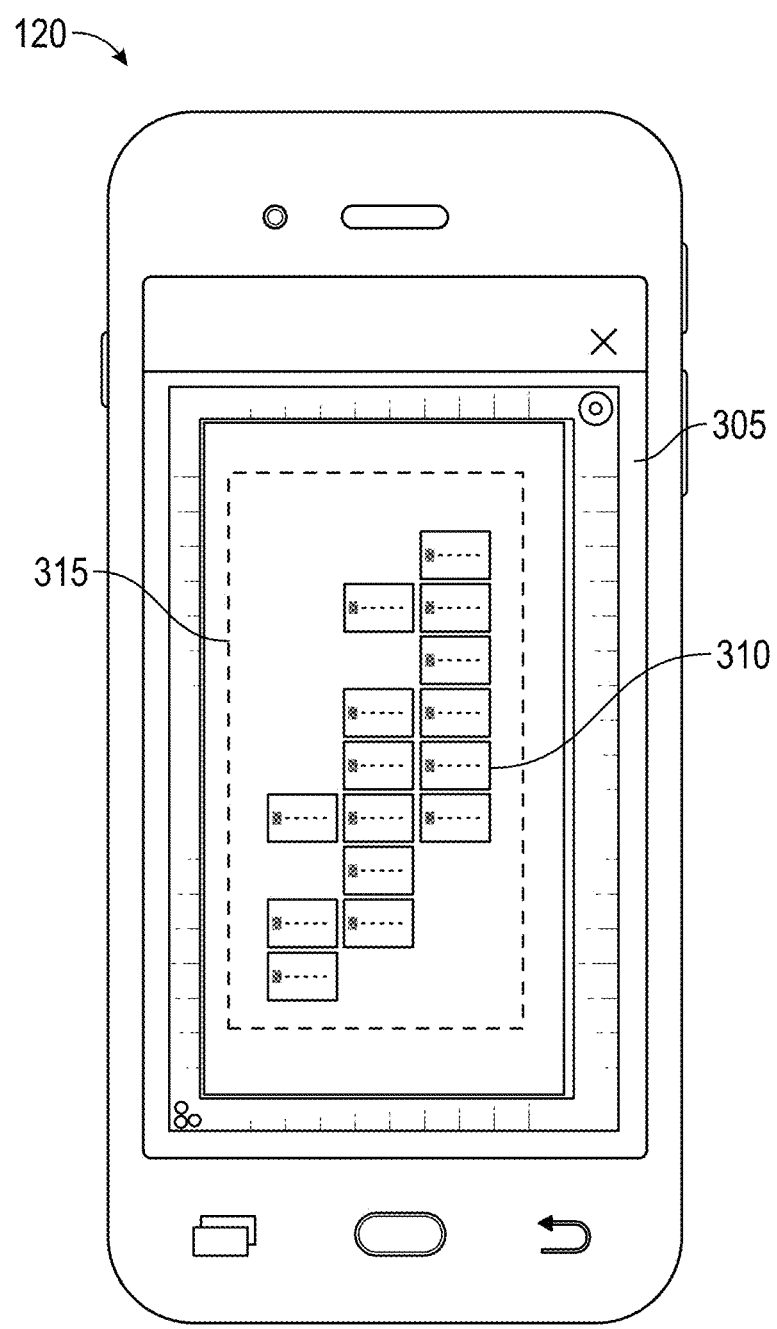
FIG. 3 illustrates an exemplary user interface of a mobile device for capturing an image according to one or more aspects of the disclosed subject matter.

FIG. 3 illustrates an exemplary user interface 305 of the mobile device 120 for capturing an image according to one or more aspects of the disclosed subject matter. For example, the camera of the mobile device 120 can be configured to perform a bulk scan in response to selecting the bulk scan button 210. Additionally, the camera of the mobile device 120 can be configured to perform a single scan in response to selecting the single scan button 215. The user interface 305 can display an image based on a viewfinder of the camera of the mobile device 120. Fr example, the image displayed can include a plurality of labels 310, and the labels can be arranged in a solar panel layout 315 to match the physical layout of the solar panels installed on that facet of the roof. Further, each label 310 an directly correspond to a microinverter 115 (e.g., the label 310 can be removed from the microinverter before installing the microinverter 115). Additionally, each label 310 can include a unique identifier (e.g., serial number, barcode, QR code, etc.) that allows the scan (e.g., bulk scan or single scan) to explicitly discover the corresponding microinverter 115, as well as identify the position of the microinverter 115 in the physical solar panel layout. In one aspect, the labels 310 can be arranged on a printout of each facet of the roof, and each facet can include a diagram outlining the position of each solar panel as a guide. In one aspect, the labels can be arranged on a sheet of paper (or similar material) that doesn't have an outline of the solar panel layout as a guide.

Figure 4:
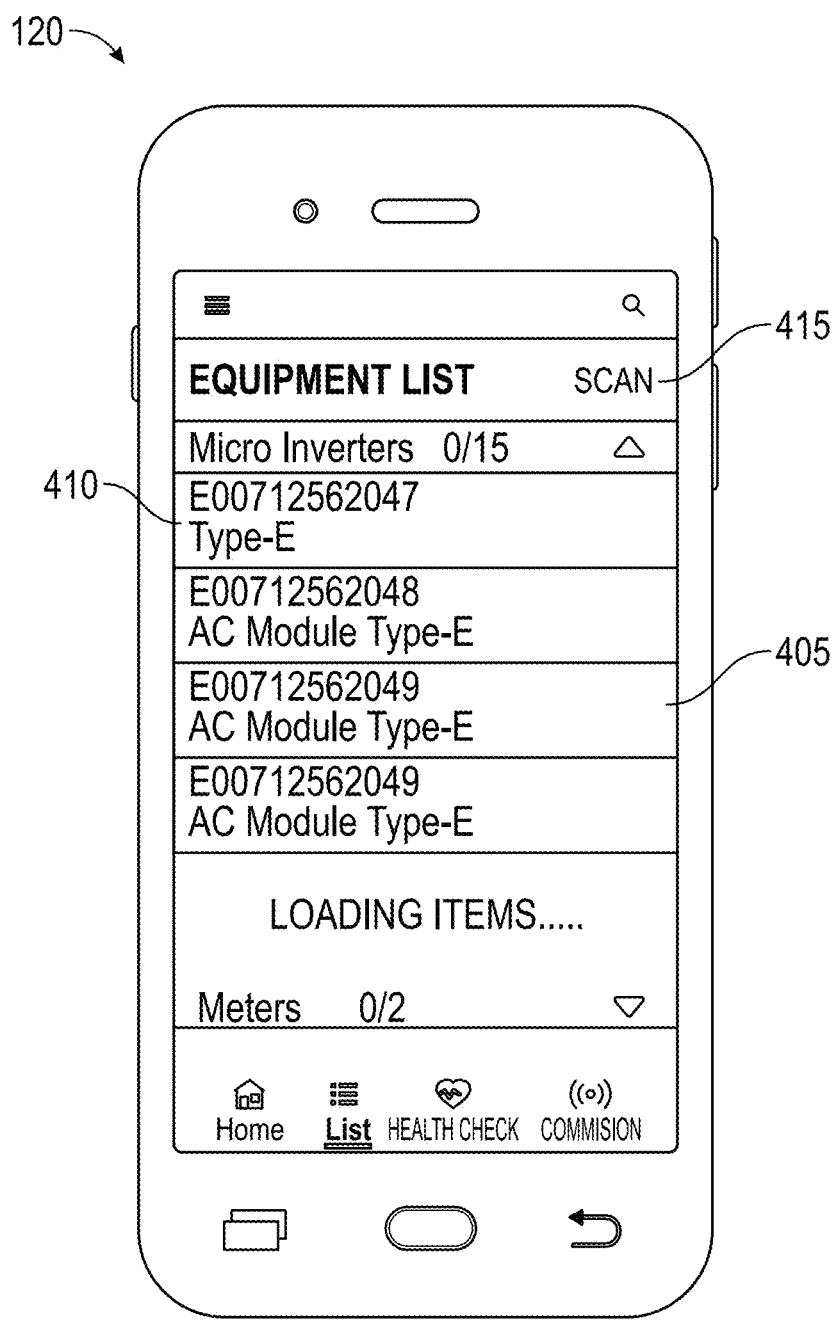
FIG. 4 illustrates an exemplary user interface of a mobile device for displaying a list of hardware according to one or more aspects of the disclosed subject matter.

FIG. 4 illustrates an exemplary user interface 405 of mobile device 120 for displaying a list of hardware according to one or more aspects of the disclosed subject matter. After the scanning described in FIG. 3, the mobile device 120 can be configured to display the discovered hardware (e.g., microinverters 115) in a list of the discovered microinverters 410. For example, in response to a bulk scan, the mobile device 120 can be configured to discover a plurality of microinverters 115 and display each discovered microinverter 115 in the list of discovered microinverters 410 in one step, from the user's perspective, for example. Additionally, the user interface 405 includes a scan button 415. The scan button 415 can return the user to the user interface 205 to perform an additional scan. For example, if more than one facet (e.g., the facet 105) of the roof includes solar panels, then the user can select the scan button 415 to return to the user interface 205 to perform the same process to discover the microinverters 115 for other facets of the roof that include solar panels.

Figure 5:
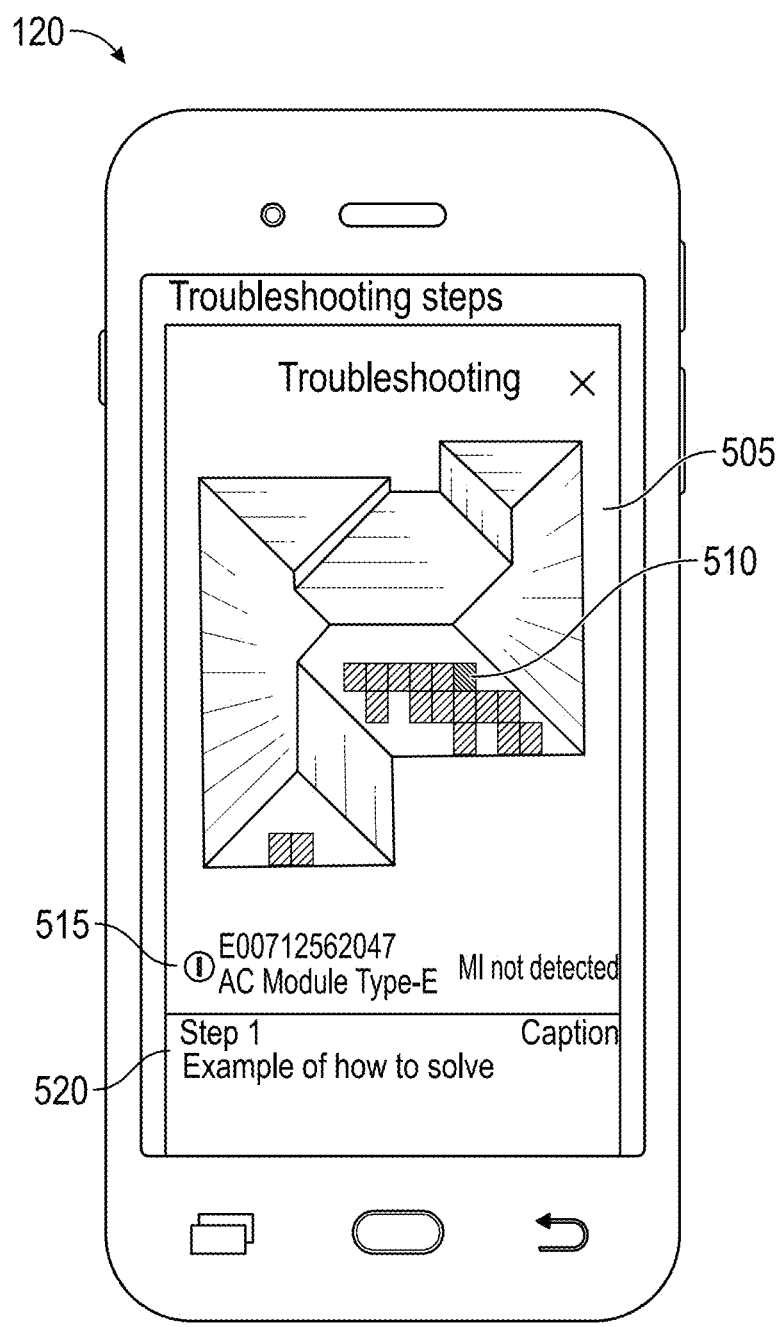
FIG. 5 illustrates an exemplary user interface of a mobile device for trouble shooting faulted hardware according to one or more aspects of the disclosed subject matter.

FIG. 5 illustrates an exemplary user interface 505 of the mobile device 120 for trouble shooting faulted hardware according to one or more aspects of the disclosed subject matter. For example, as a result of the scan in FIG. 3, the relative position of each microinverter 115 can be displayed on the facet of the roof where it is installed. In other words, the machine vision, based on the unique identifier of each label 310 and the solar panel layout 315 that matches the physical layout of the solar panels installed on the roof, can determine the relative position of each microinverter 115 and display it accordingly on a digital representation of the roof. Additionally, the user interface 505 includes a fault indication 510. The fault indication 510 can correspond to a faulted solar panel and/or microinverter, for example. The fault indication 510 can be displayed so that it appears differently in the user interface 505 than the equipment that are functioning normally. For example, the fault indication 510 can be displayed with a different color, different design, predetermined lettering, predetermined numbering, and the like that would distinguish it from the equipment that is functioning normally. The fault indication 510 can assist the installation technician in locating and servicing the equipment. Various types of faults that would trigger the fault indication 510 can include a microinverter 115 that is dead on arrival (e.g., damaged in shipping/transit, not able to be discovered, won't power on, bad electrical connection, etc.). Another example is that if the microinverter/solar panel that is indicated as having an error (e.g., fault indication 510) is detecting an unstable grid even though it is still able to communicate with the gateway device (e.g., faulted but still able to communicate). If it is an electrical connection fault or dead on arrival, the microinverter 115 can appear to be missing entirely. But this information is still useful because, based on the derived map (i.e., user interface 505), the microinverter that appears to be missing can be identified (e.g., fault indication 510).

The user interface 505 can also include a fault summary 515 which can identify (e.g., by serial number) the specific equipment that is faulted and/or indicate the potential fault (e.g., microinverter not detected). Further, the user interface 505 can include trouble shooting instructions 520. The trouble shooting instructions 520 can include steps to assist in resolving the problem of the identified faulted equipment.

Figure 6:
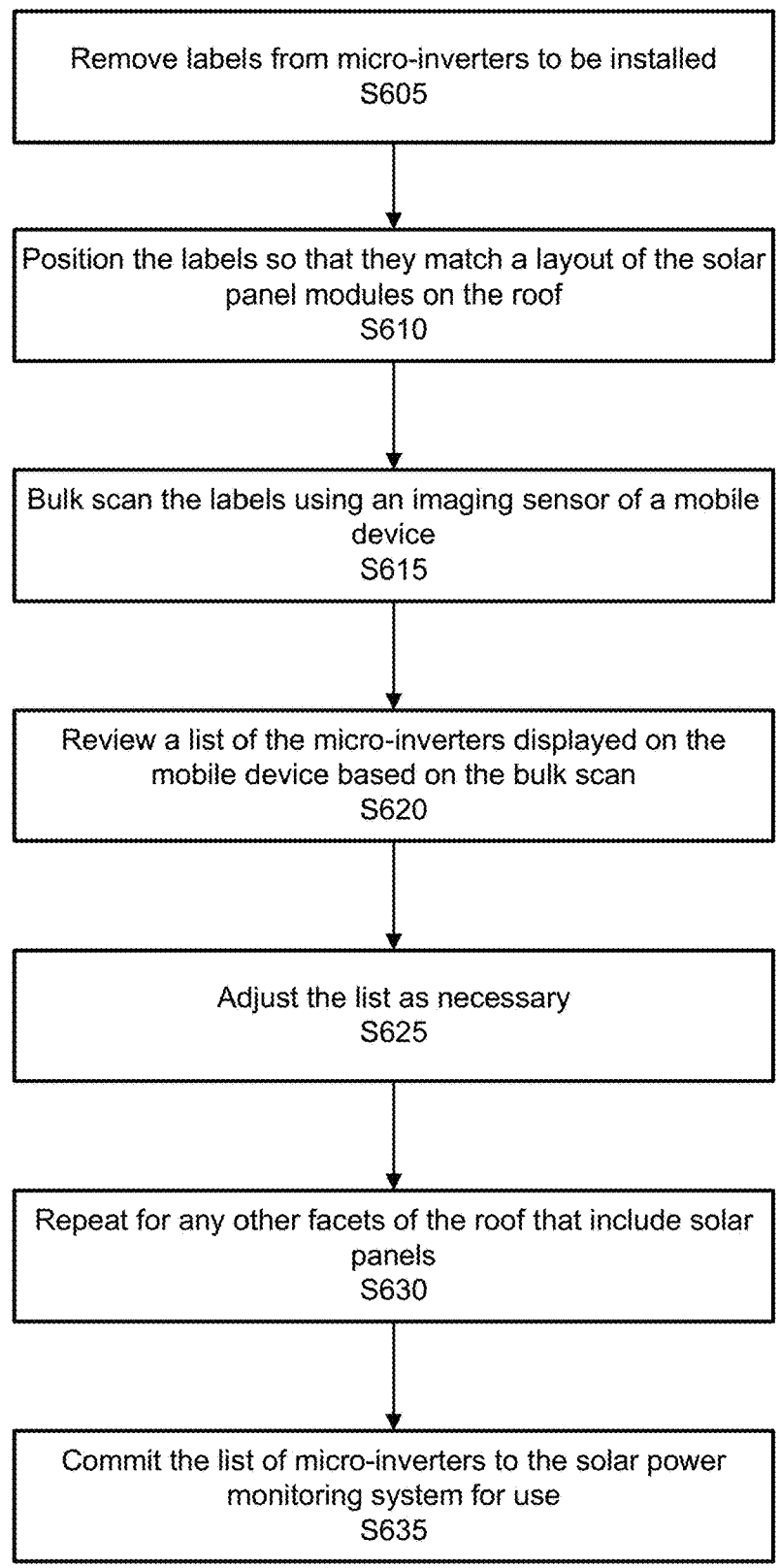
FIG. 6 is an exemplary workflow of commissioning a solar power system according to one or more aspects of the disclosed subject matter.

FIG. 6 is an exemplary workflow of commissioning a solar power system according to one or more aspects of the disclosed subject matter.

In S605, a user (e.g., installation technician) can remove a label (e.g., label 310) from each of the microinverters 115 before installing the microinverters 115. Each label can include a unique identifier (e.g., a barcode, QR code, serial number, etc.).

In S610, the installation technician can position the labels 310 on a piece of paper, for example, so that the arrangement of the layout (e.g., solar panel layout 315) matches a physical layout of the solar panels installed on a corresponding facet of the roof. In one aspect, the installation technician can have a template print-out ahead of time and they can affix the labels to the template.

In S615, the installation technician can use a mobile device 120 running a mobile software application for commissioning solar power monitoring systems. Using the mobile device 120, the labels 310, positioned according to the physical layout of the solar panels, can be bulk scanned (e.g., using machine vision) via an image sensor (e.g., camera) of the mobile device 120. In other words, the installation technician can aim the mobile device's camera at the layout template and all the labels are read in a single action, so the installation technician does not need to scan each label individually. Additionally, the relative position of the solar panels can be determined at this time.

In S620, the installation technician can review a list of the solar panels associated with each discovered microinverter displayed via the mobile device 120.

In S625, the installation technician can adjust the list as necessary. For example, the installation technician can confirm the correct number of solar panels, add or remove a solar panel from the list, and the like. In one aspect, the installation technician can adjust the list via interaction with a touch screen of the mobile device, for example.

In S630, the installation technician can repeat the workflow for any other facets of the roof that include solar panels. For example, the installation technician can return to the user interface 205 to bulk scan labels for another facet of the roof In S635, the installation technician can commit the list of discovered microinverters to the solar power monitoring system for use. In other words, the installation technician can commit the list of discovered microinverters to the solar power monitoring system for use. Because microinverters communicate via power line communications it is necessary to assign logical addresses to associate each microinverter with the solar power monitoring system. This association can be performed at this time.

The step of commissioning can be to verify properties of a solar system before connection to the grid, for example according to local codes. Particular commissioning steps can vary depending on system size and complexity, but often include verifying that the physical installation matches the planned design, electrical testing and inspection (e.g., measuring polarity, voltage), identifying failed devices, and the like.

It should be appreciated that the workflow can also include troubleshooting when one or more of the solar panels have a fault indication, as further described herein. In other words, the relative positions of the relative positions of the solar panels can be mapped to a representation of the roof they're installed on, which can be a useful aid for troubleshooting performance issues. For example, troubleshooting any faulted solar panels can optionally be included between S625 and S630.

Figure 7:
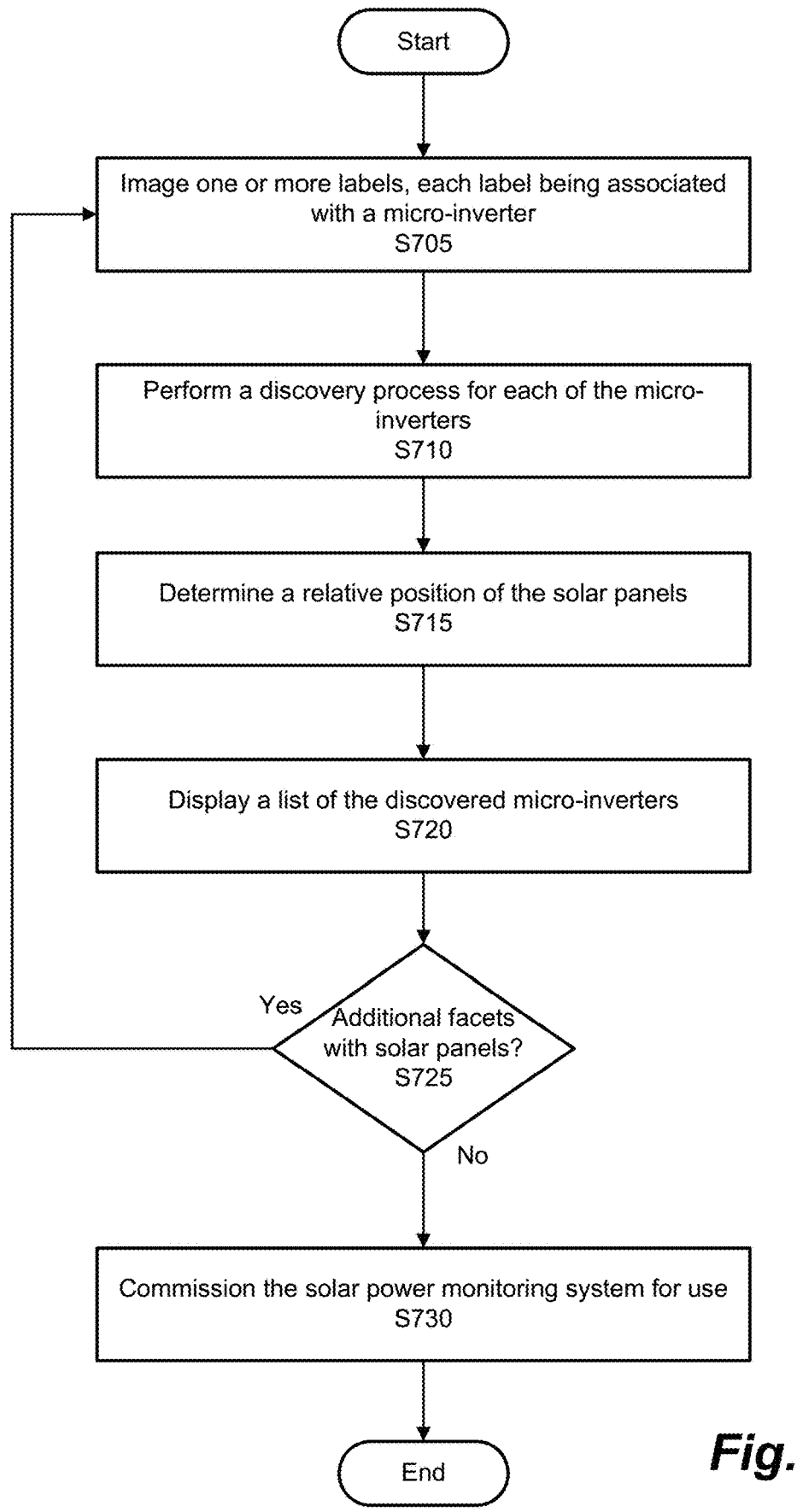
FIG. 7 is an algorithmic flow chart of a method for commissioning a solar power system using a mobile device according to one or more aspects of the disclosed subject matter.

FIG. 7 is an algorithmic flow chart of a method for commissioning a solar power system using the mobile device 120 according to one or more aspects of the disclosed subject matter.

In S705, the mobile device 120 can be configured to image, using a camera, one or more labels (e.g., labels 310), where each label 310 is associated with a microinverter (e.g., microinverter 115). For example, the imaging can be a bulk scan using computer vision to read all of the labels 310 at the same time after the labels have been positioned according to the physical solar panel layout.

In 710, the mobile device 120 can be configured to perform a discovery process for each of the microinverters. For example, because each label is associated with a specific microinverter, each microinverter can be discovered explicitly instead of using a blind broadcast discovery mechanism which can result in poaching (e.g., accidentally selecting the wrong microinverter and claiming it belongs to the wrong solar power monitoring system).

In S715, the mobile device 120 can be configured to determine a relative position of the solar panels based on the bulk scan of the labels 310. In one aspect, a recursive best fit algorithm can be used to map the layout of the labels 310 according to a vector map of the roof layout (e.g., different facets) and the solar panel positions on each facet that includes solar panels.

In S720, the mobile device 120 can be configured to display a list of the discovered microinverters.

In S725, the mobile device 120 can determine whether the roof includes additional facets that include solar panels, where the labels for microinverters for that facet of the roof have not been scanned. If it is determined that there are additional facets of the roof that include solar panels, the processing can return to S705 to image the labels that correspond to microinverters installed on that facet of the roof. If it is determined that there are not additional facets of the roof that include solar panels, the mobile device 120 can be configured to commission the solar power monitoring system for use in S730, and the process can end.

Figure 8:
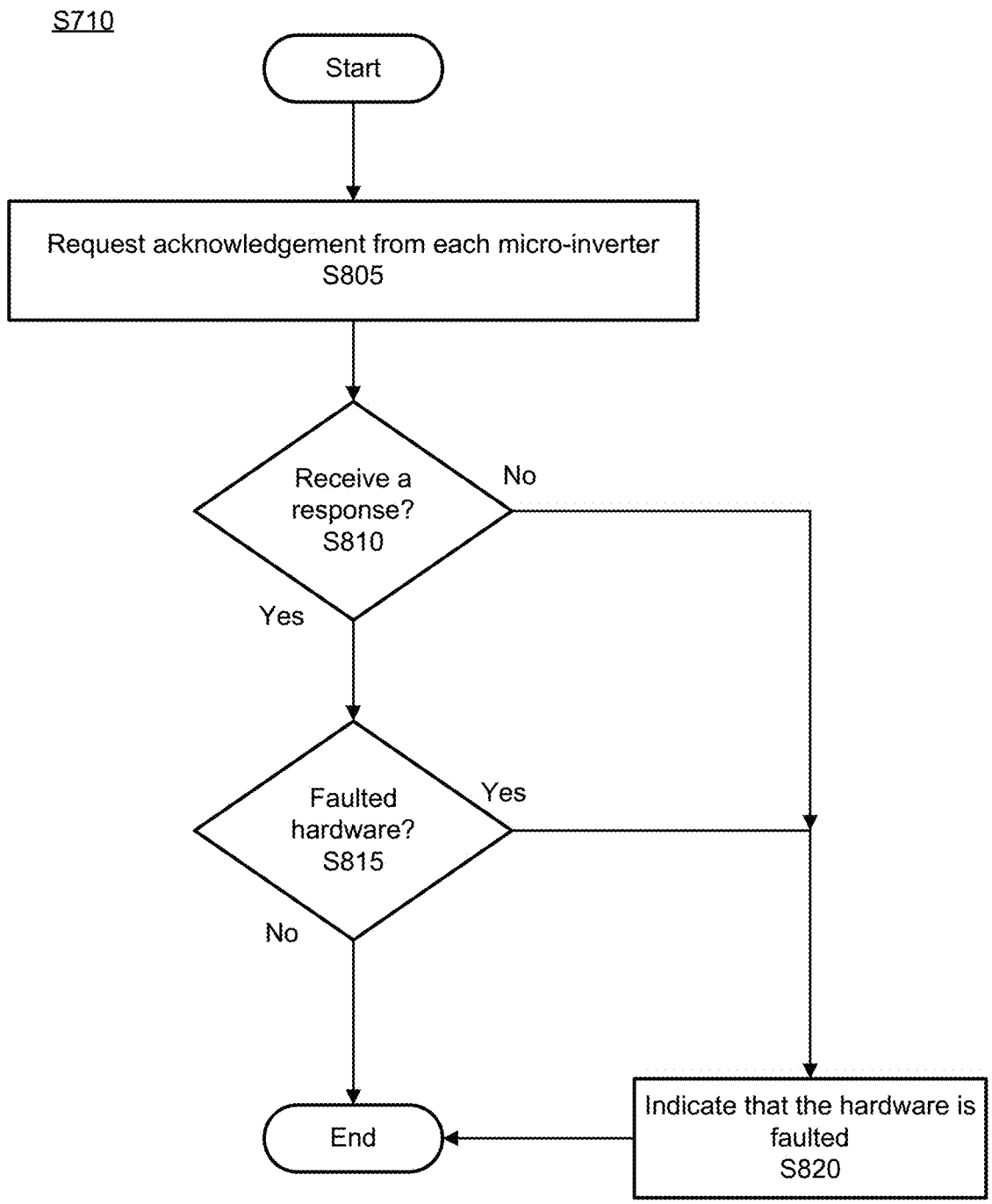
FIG. 8 is an algorithmic flow chart of a method for discovering hardware in the solar power system according to one or more aspects of the disclosed subject matter.

FIG. 8 is an algorithmic flow chart of a method for discovering hardware (e.g., microinverters) in the solar power system according to one or more aspects of the disclosed subject matter. For example, the method for discovering microinverters in the solar power system can correspond to S710 in FIG. 7.

In S805, the mobile device 120 can be configured to request acknowledgement from each microinverter. For example, because the label corresponding to each microinverter was scanned in S705, the mobile device 120 can call each microinverter explicitly using the unique identifier on the label rather than perform a general broadcast. This explicit request significantly speeds up the discovery process.

In S810, the mobile device 120 can determine if a response to the request is received from the corresponding microinverter. If a response is not received, the mobile device 120 can be configured to indicate that the hardware (e.g., microinverter, solar panel, etc.) is faulted in S820. For example, the mobile device 120 can indicate the hardware is faulted via the fault indication 510 and as otherwise illustrated in FIG. 5, for example. However, if it is determined that a response is received, the process can continue to S815 to determine if the hardware is faulted despite receiving a response.

In S815, the mobile device 120 can determine if the hardware is faulted despite receiving a response from the microinverter in S810. For example, if the microinverter is detecting an unstable grid, this may trigger a fault indication even though the microinverter was not dead on arrival and can still communicate. If it is determined that the hardware is not faulted in S815, the process can end. However, if it is determined that the process is faulted in S815, the mobile device 120 can indicate that the hardware is faulted in S820 as illustrated in FIG. 5, for example. After indicating that the hardware is faulted in S820, the process can end. In other words, S805-S815 can provide three basic cases including 1) the hardware is functioning normally, 2) the microinverter has no communication (e.g., dead on arrival), and 3) the microinverter can communicate but the hardware is triggering an error.

Figure 9:
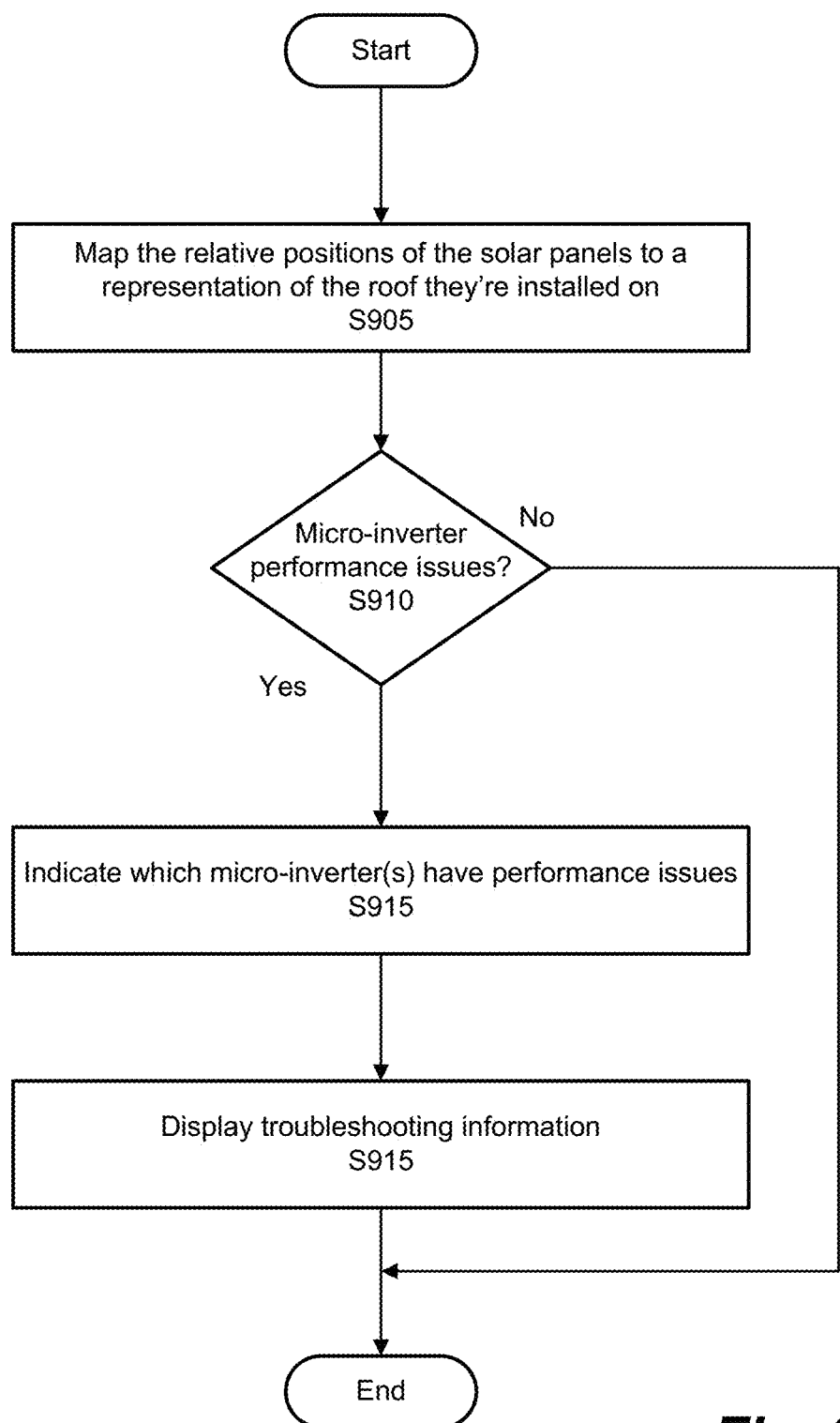
FIG. 9 is an algorithmic flow chart of a method for troubleshooting faulted hardware according to one or more aspects of the disclosed subject matter.

FIG. 9 is an algorithmic flow chart of a method for troubleshooting faulted hardware according to one or more aspects of the disclosed subject matter.

In S905, the mobile device 120 can map the relative positions of the solar panels to a representation of the roof they're installed on. This mapping can be performed based on the information from the bulk scan determining the relative positions of the solar panels based on the labels of the microinverters being arranged to match the physical layout of the solar panels on the roof as illustrated in FIG. 3, for example. In other words, when the microinverter is connected to a solar panel, the microinverter becomes associated with that solar panel. Accordingly, when the microinverter is discovered by explicitly pinging it based on the unique identifier of the label associated with that microinverter, the microinverter's response back to the mobile device 120 can also include information regarding the solar panel associated with that microinverter.

In S910, the mobile device 120 can determine if the microinverter has performance issues. In other words, the mobile device 120 can determine if any hardware is faulted as described in the determinations in S810 and S815 in FIG. 8. If it is determined that there are no microinverter performance issues, the process can end because troubleshooting is not necessary. However, if it is determined that there are microinverter issues (e.g., various faults and errors as has been further described herein), the mobile device 120 can indicate which microinverters and/or corresponding hardware are faulted.

In S915, the mobile device 120 can indicated which hardware (e.g., solar panel, microinverter, etc.) is having performance issues. For example, the mobile device 120 can indicate faulted hardware as described in S820 in FIG. 8.

In S920, the mobile device 120 can display troubleshooting information based on the identified fault. For example, as illustrated in FIG. 5, the trouble shooting information can correspond to steps to take to correct the identified fault. After the mobile device 120 displays the trouble shooting information, the process can end.

It should be appreciated that various processes in the workflow illustrated in FIG. 6 and the algorithmic flow charts in FIGS. 7-9 can be repeated for each facet of the roof that includes solar panels.

Commissioning solar power systems using the mobile device 120 includes several advantages. For example, a significant advantage is reducing commissioning time by discovering the microinverters explicitly rather than performing a general broadcast. A general broadcast is time consuming and error prone because it is not known if the microinverters are on different circuits or behind different breakers, for example, because they're all part of the same broadcast space. Because total system installation time as a whole is a key differentiator in the solar power market, the faster a solar power system can be installed and commissioned corresponds to fewer hours of labor required from an installation technician. This results in a direct impact on the bottom line.

A further advantage is discovering all the microinverters for a particular facet of the roof at the same time using bulk scanning. This is easy to use for the installation technician and is significantly faster than performing a general broadcast or single scanning while also prevent errors like poaching.

Another advantage includes inferring from additional information detected in the bulk scan (e.g., relative position of the solar panels). When referring to the solar panel layout (e.g., the digital representation of the physical layout of the modules on the roof), by placing the labels in a way that approximates the layout, the relative position of the solar panels can be determined from the bulk scan as well. Accordingly, the bulk scan provides the list of devices (which is able to be displayed very quickly) and also provides the layout information all in one step.

In one aspect, the system 100 can include a software application run on the mobile device 120 as described in FIGS. 10-24. It should be appreciated that one or more of the interfaces in FIGS. 2-5 and FIGS. 10-24 can be include with each other, replace each other, and/or be combined with each other.

Figure 10:
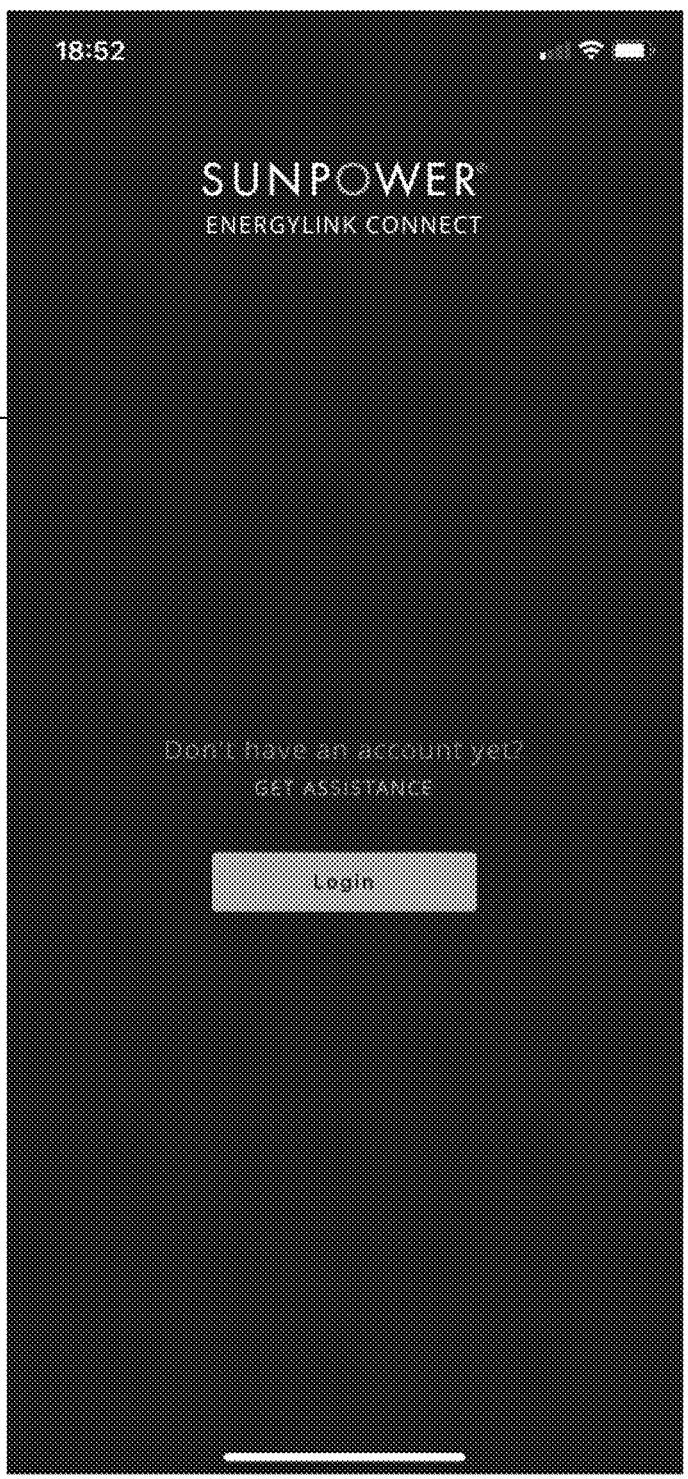
FIG. 10 illustrates an exemplary login screen implemented in the software application displayed on the mobile device according to one or more aspects of the disclosed subject matter.

FIG. 10 illustrates an exemplary login screen 1000 implemented in the software application displayed on the mobile device 120 according to one or more aspects of the disclosed subject matter. For example, the login screen 1000 can be configured to validate a user (e.g., an installation technician). After logging in, the user can look up an existing site (i.e., a location corresponding to the solar panel system) or create a new site.

Figure 11:
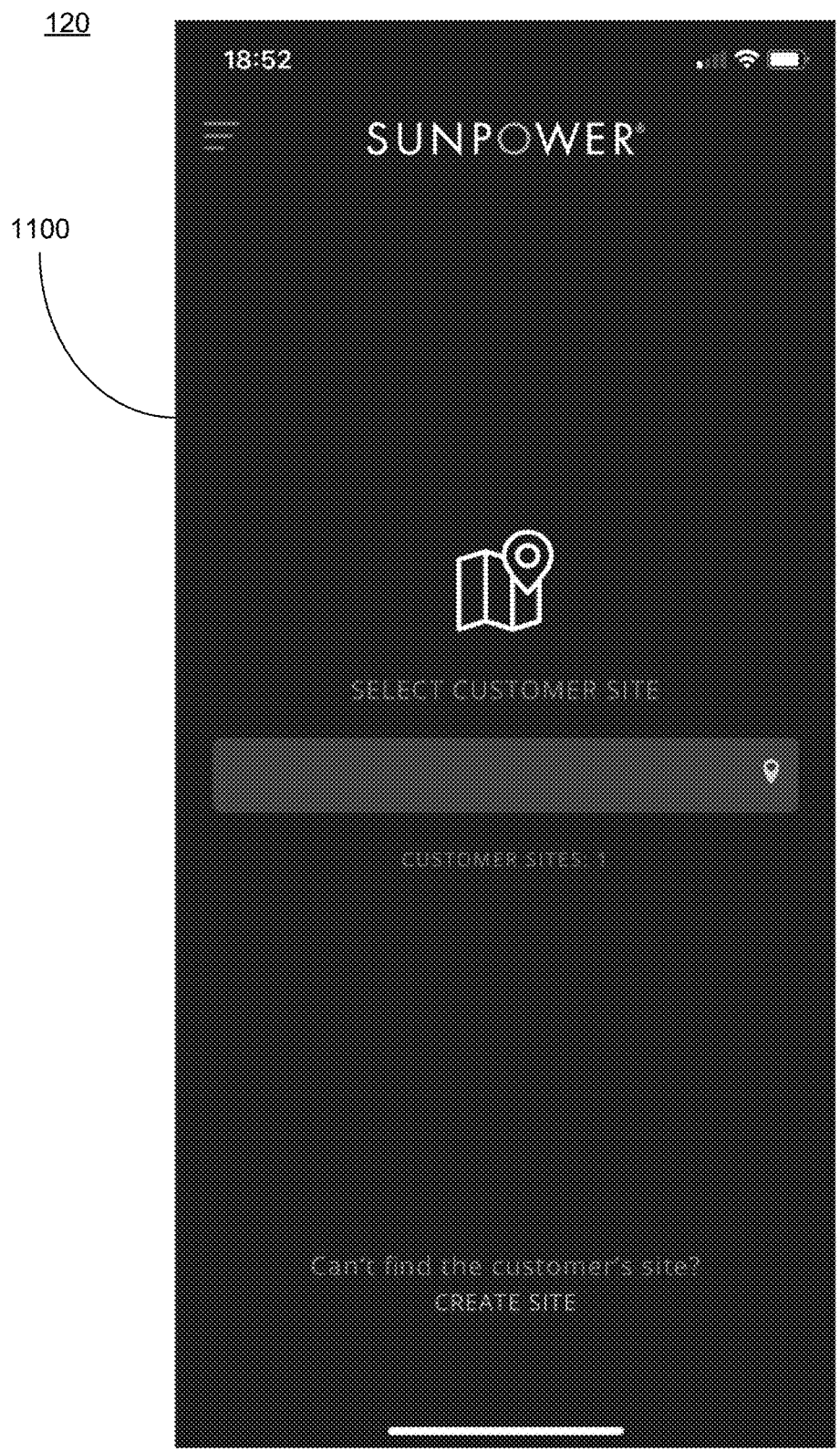
FIG. 11 illustrates an exemplary site selection page implemented in the software application displayed on the mobile device according to one or more aspects of the disclosed subject matter.

FIG. 11 illustrates an exemplary site selection page 1100 implemented in the software application displayed on the mobile device 120 according to one or more aspects of the disclosed subject matter. For example, selecting a site can correspond to querying a database of existing site entries that have been stored. In other words, if a site already exists, it can be looked up. However, if the site does not already exist, the user can create a site as further described in FIG. 12.

Figure 12:
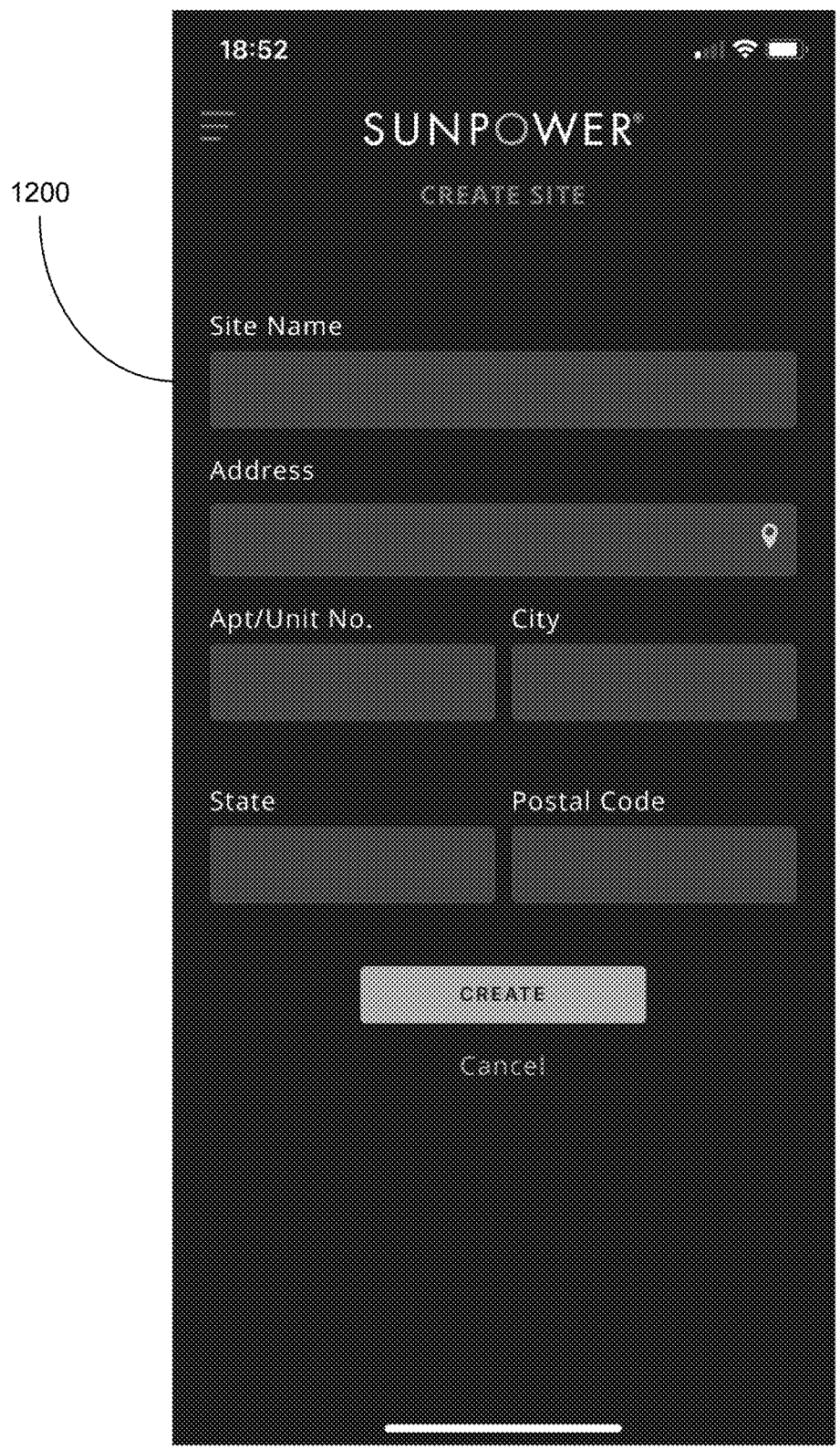
FIG. 12 illustrates an exemplary site creation page implemented in the software application displayed on the mobile device according to one or more aspects of the disclosed subject matter.

FIG. 12 illustrates an exemplary site creation page 1200 implemented in the software application displayed on the mobile device 120 according to one or more aspects of the disclosed subject matter. By filling in the information on the site creation page 1200, the user can create a new site. Once the user has looked up the site (e.g., FIG. 11) or created the site, the user can navigate to a home screen as described in FIG. 13.

Figure 13:
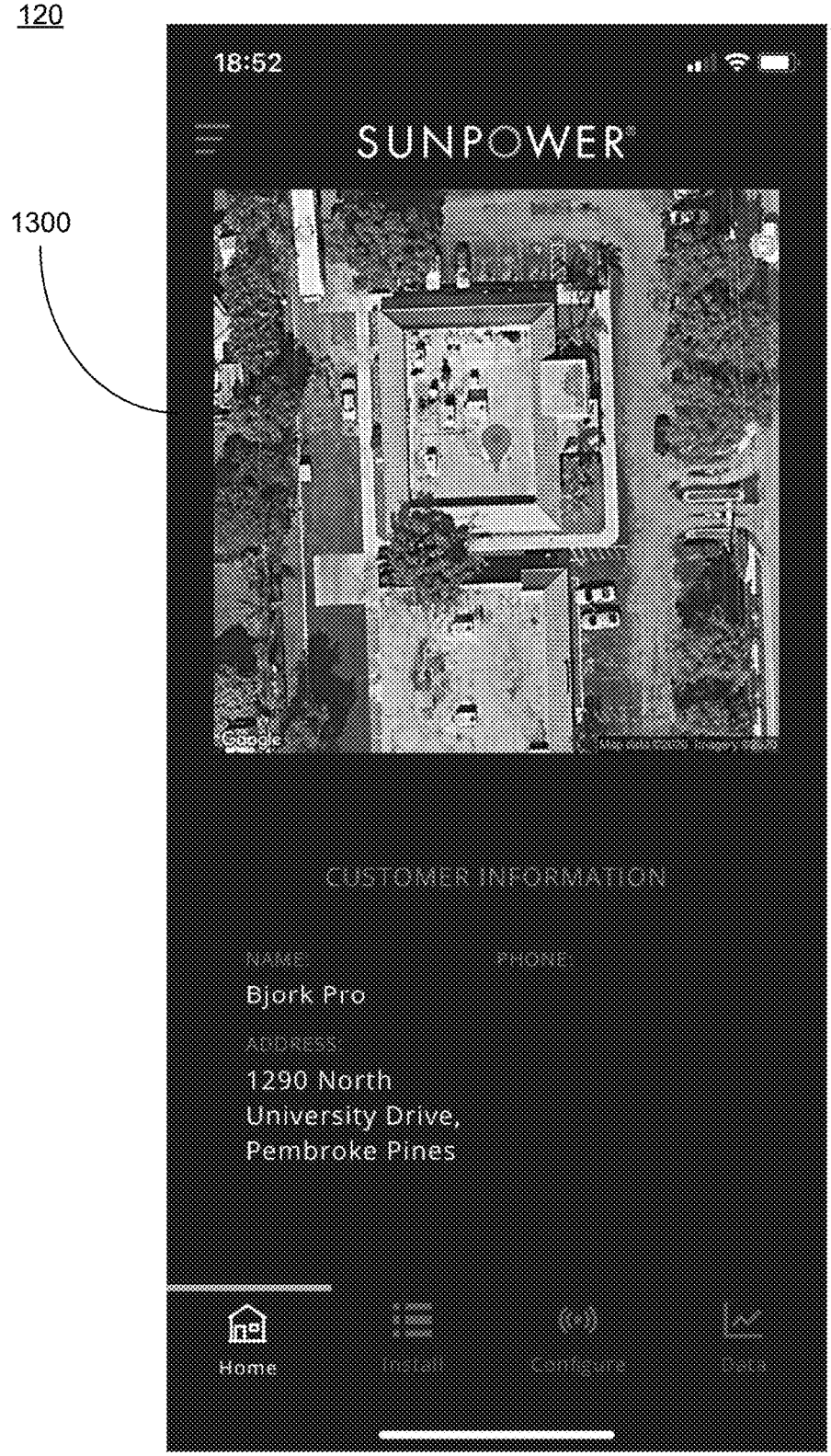
FIG. 13 illustrates an exemplary home screen implemented in the software application displayed on the mobile device according to one or more aspects of the disclosed subject matter.

FIG. 13 illustrates an exemplary home screen 1300 implemented in the software application displayed on the mobile device 120 according to one or more aspects of the disclosed subject matter. For example, the home screen can include information about the homeowner (e.g., name, phone, address, etc.). Additionally, the home screen 1300 can display an aerial view (e.g., satellite view, map view, illustration, etc.) of the home. Next, the user can navigate to an add inventory page in FIG. 14.

Figure 14:
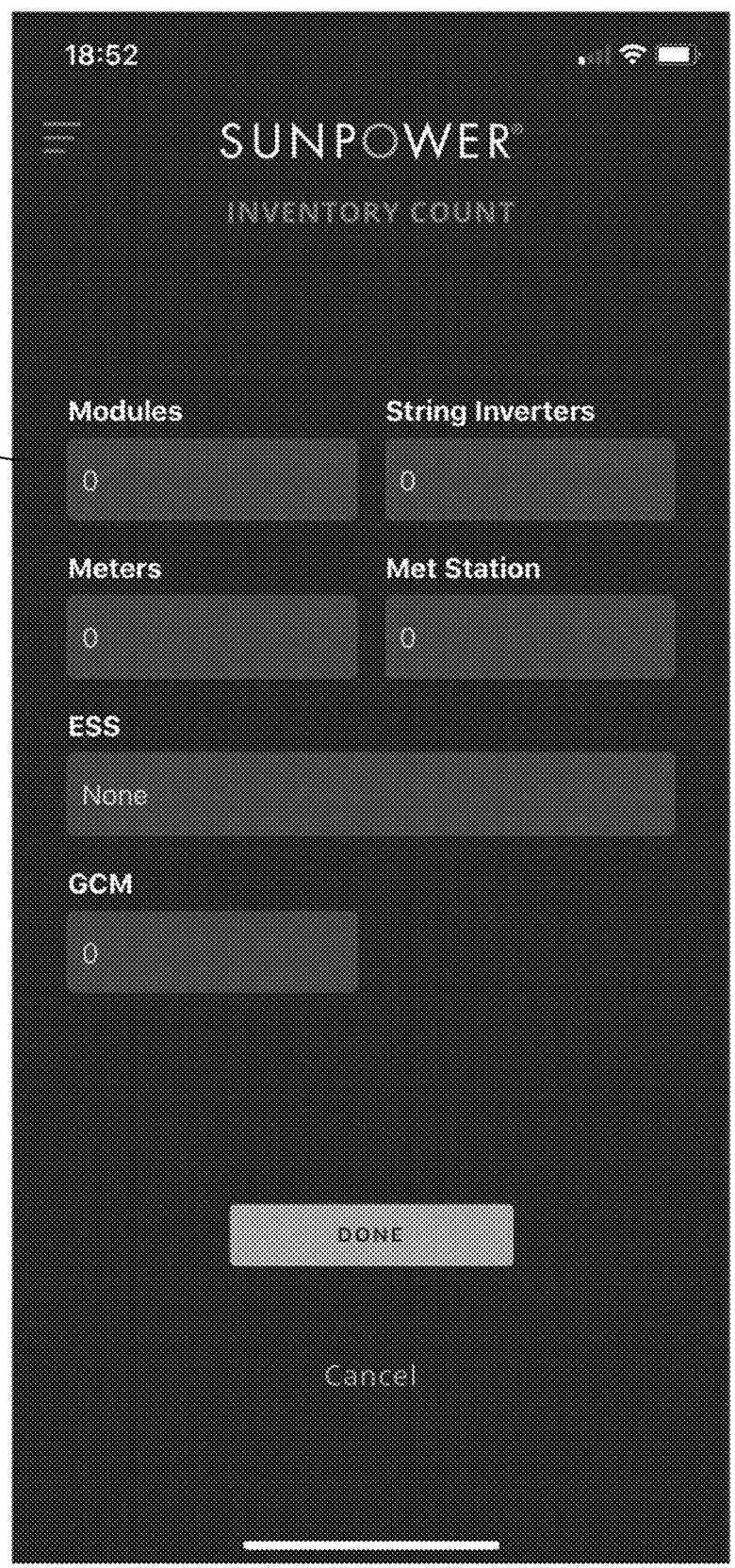
FIG. 14 illustrates an exemplary add inventory page implemented in the software application displayed on the mobile device according to one or more aspects of the disclosed subject matter.

FIG. 14 illustrates an exemplary add inventory page 1400 implemented in the software application displayed on the mobile device 120 according to one or more aspects of the disclosed subject matter. For example, the add inventory page 1400 can be configured to allow the user to add an inventory count of all the items being taken to the site. After adding the inventory, the user can return to the home screen, for example. On the home screen, the user can press an install button (e.g., on the home row) to move to the next step of connecting to an energy monitoring, control and/or communication device (e.g., SunPower's PV Supervisor (PVS)).

Figure 15:
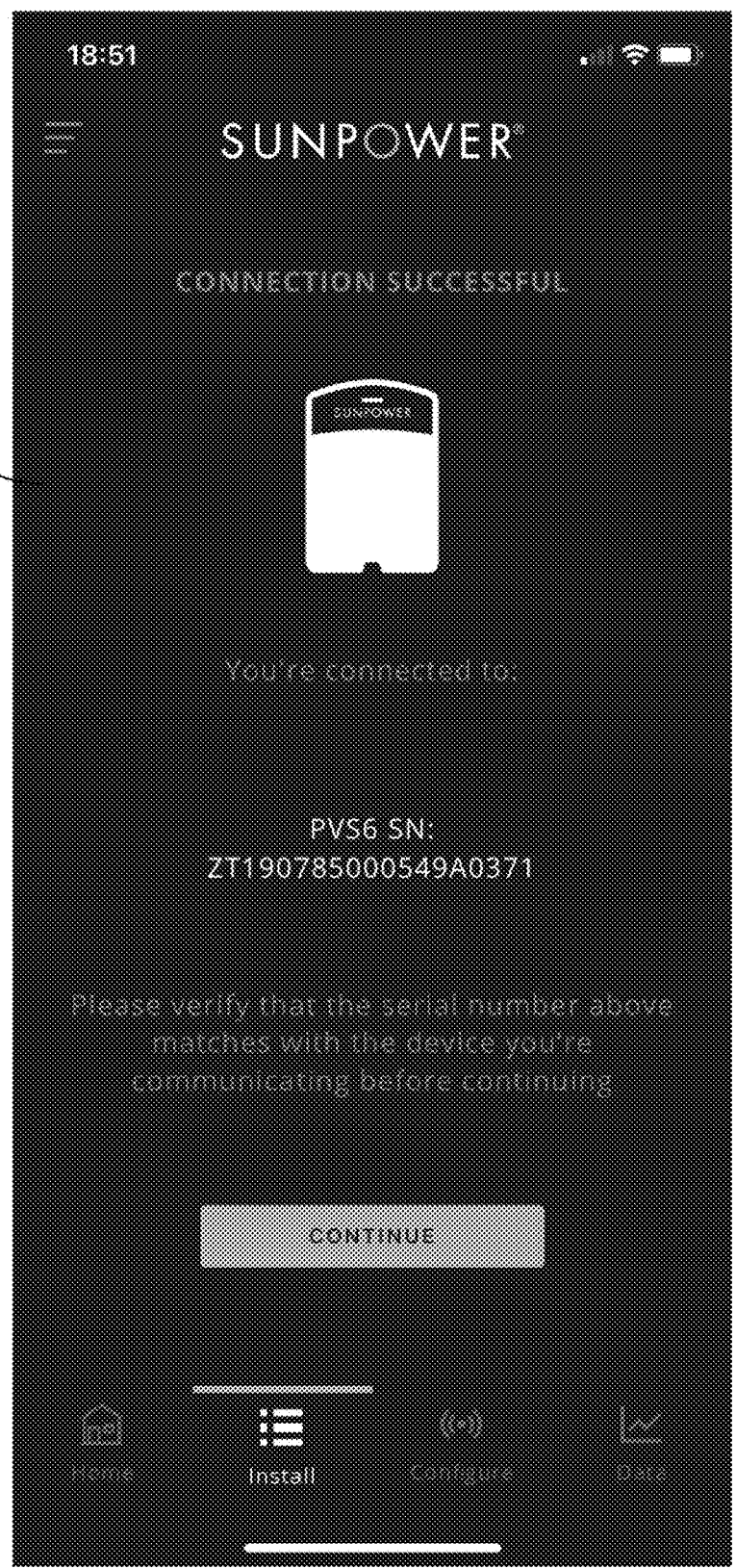
FIG. 15 illustrates an exemplary connection page implemented in the software application displayed on the mobile device according to one or more aspects of the disclosed subject matter.

FIG. 15 illustrates an exemplary connection page 1500 implemented in the software application displayed on the mobile device 120 according to one or more aspects of the disclosed subject matter. For example, the user can start a scan which can trigger a scanner in the mobile device 120 (e.g., camera configured to read QR code) so the user is able to scan a unique code (e.g., a QR code) on the energy monitoring, control and/or communication device (e.g., PVS device). This tells the PVS device to wake up, start its Wi-Fi beacon, and connect with the user. Accordingly, the user is connected to the PVS device (e.g., if the user navigates to the Wi-Fi settings in their mobile device 120, the network of this PVS device is now the Wi-Fi network, confirming that the mobile device 120 is communicating directly to the PVS device). Even if the user is in a remote location, for example, where there is no internet or network connectivity, the user is able to connect with the PVS device.

Figure 16:
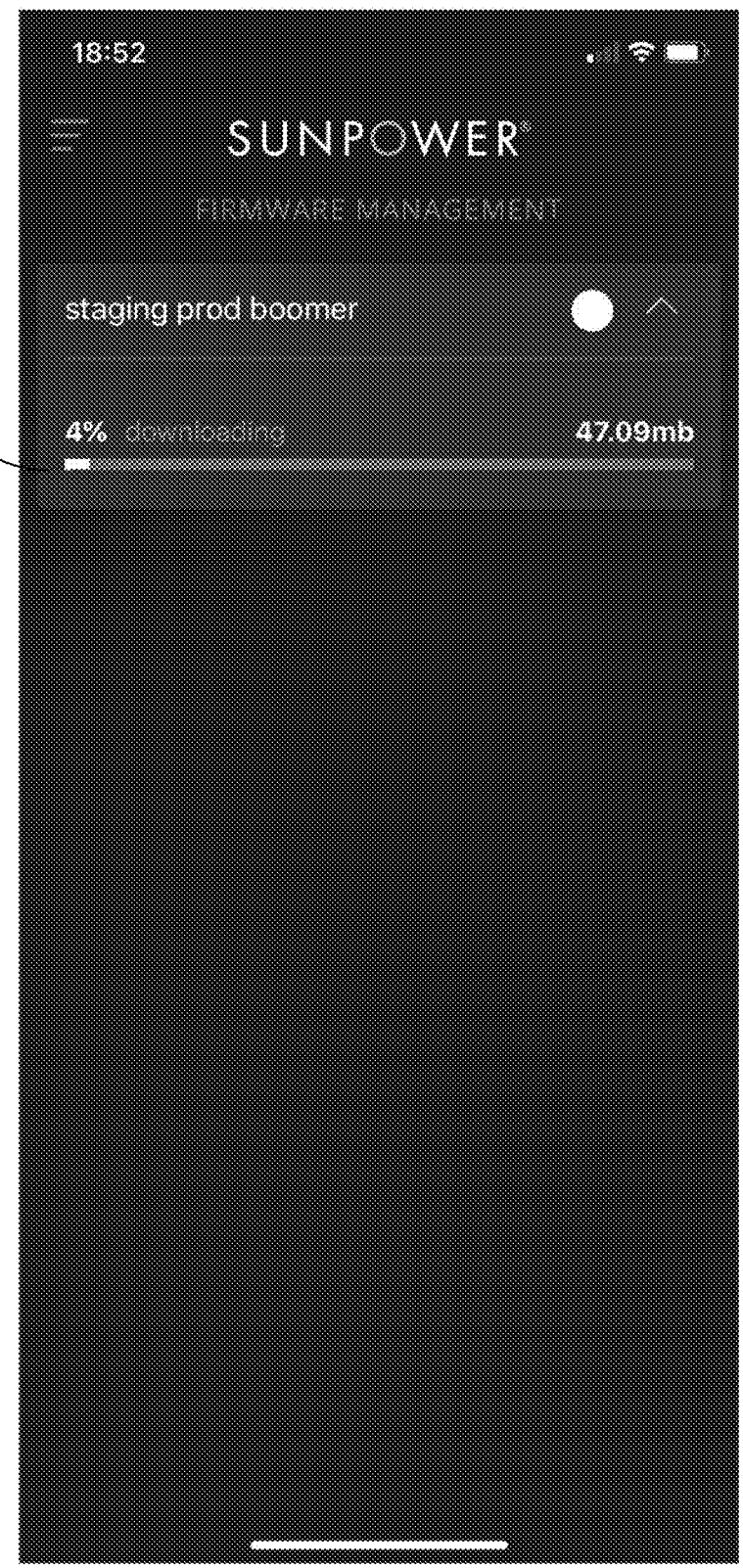
FIG. 16 illustrates an exemplary firmware update page implemented in the software application displayed on the mobile device according to one or more aspects of the disclosed subject matter.

FIG. 16 illustrates an exemplary firmware update page 1600 implemented in the software application displayed on the mobile device 120 according to one or more aspects of the disclosed subject matter. After the user connects to the device, if there is a critical firmware update (e.g., critical bug fix) and the PVS device does not have the udpate, the firmware can be automatically pushed to the PVS device. If the PVS device does not need to update the firmware right away, it will upload the firmware update to the PVS device and the PVS will wait until the system is not in a critical business flow and update the firmware when there is some downtime. After updating the PVS device and/or any storage devices as needed, the next step is the bulk scan.

Figure 17:
FIG. 17 illustrates an exemplary bulk scan page implemented in the software application displayed on the mobile device according to one or more aspects of the disclosed subject matter.

FIG. 17 illustrates an exemplary bulk scan page 1700 implemented in the software application displayed on the mobile device 120 according to one or more aspects of the disclosed subject matter. Generally, the mobile device 120 can be used to take a picture of the sheet of stickers, send it to be processed remotely (e.g., the "cloud"), the information in the sheet of stickers (e.g., the serial numbers and corresponding layout) gets processed, and a list of microinverters is returned for display as described in FIG. 18.

Figure 18:
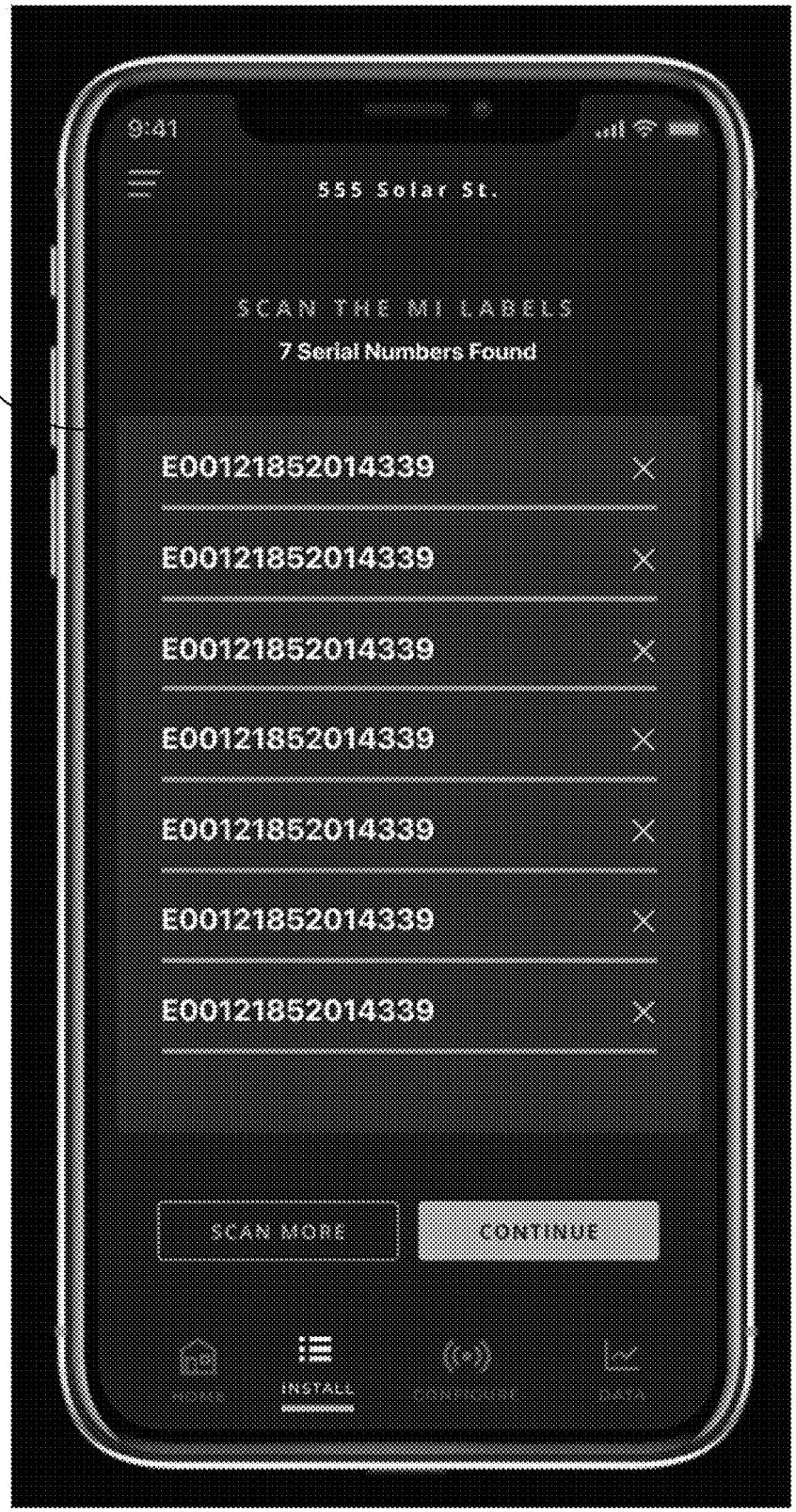
FIG. 18 illustrates an exemplary microinverter check page implemented in the software application displayed on the mobile device according to one or more aspects of the disclosed subject matter.

FIG. 18 illustrates an exemplary microinverter check page 1800 implemented in the software application displayed on the mobile device 120 according to one or more aspects of the disclosed subject matter. For example, the software application can be configured to check the microinverters. In other words, the mobile device 120 can be configured to communicate with the microinverters to check that they are operational and in communication with the system 100. If all the equipment is discovered and the microinverters, the meters, and/or the storage are identified, then the user can proceed to the next step which is where the user actually claims the equipment (i.e., commission/configuring).

Figure 19:
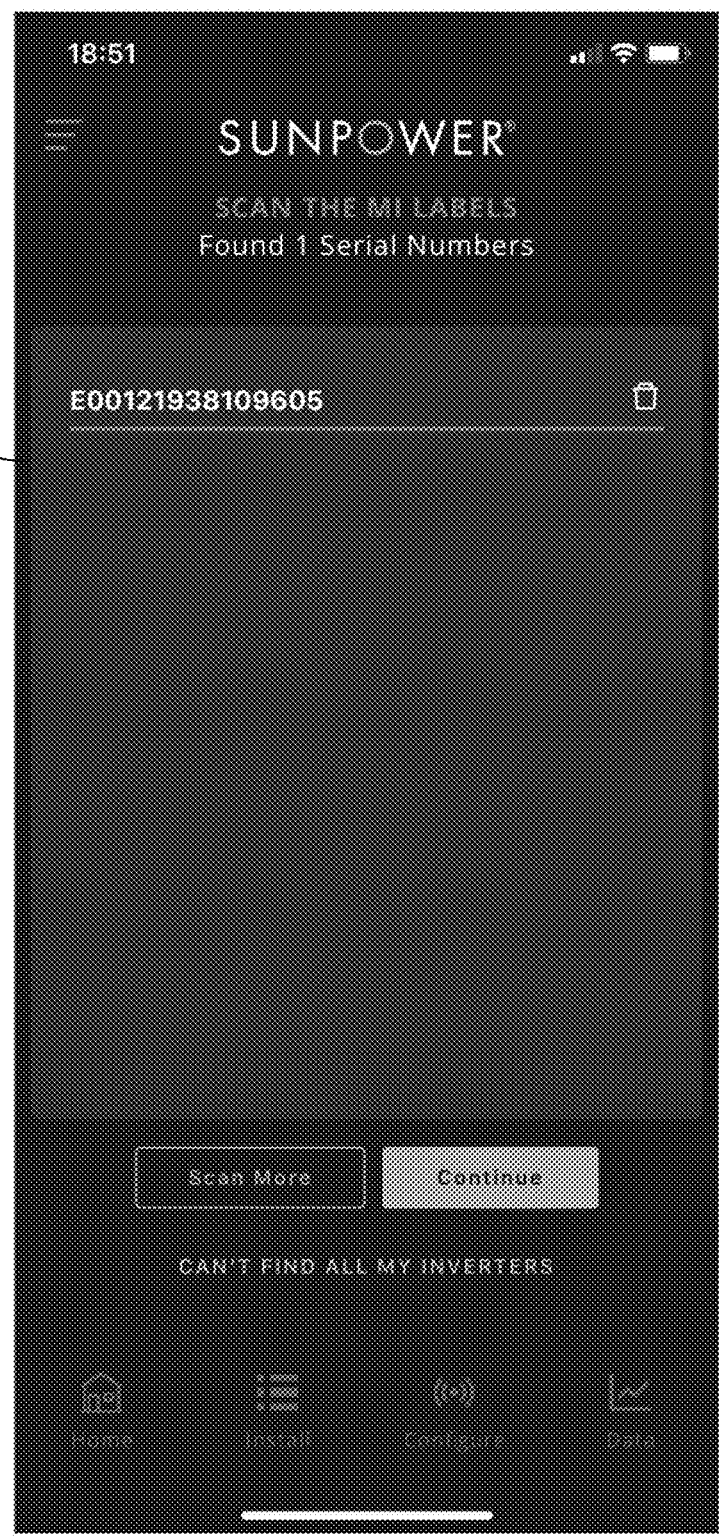
FIG. 19 illustrates an exemplary microinverter modification page implemented in the software application displayed on the mobile device according to one or more aspects of the disclosed subject matter.

FIG. 19 illustrates an exemplary microinverter modification page 1900 implemented in the software application displayed on the mobile device 120 according to one or more aspects of the disclosed subject matter. If the user needs to make any modifications, the user can do so by scanning individual equipment, for example.

Figure 20:
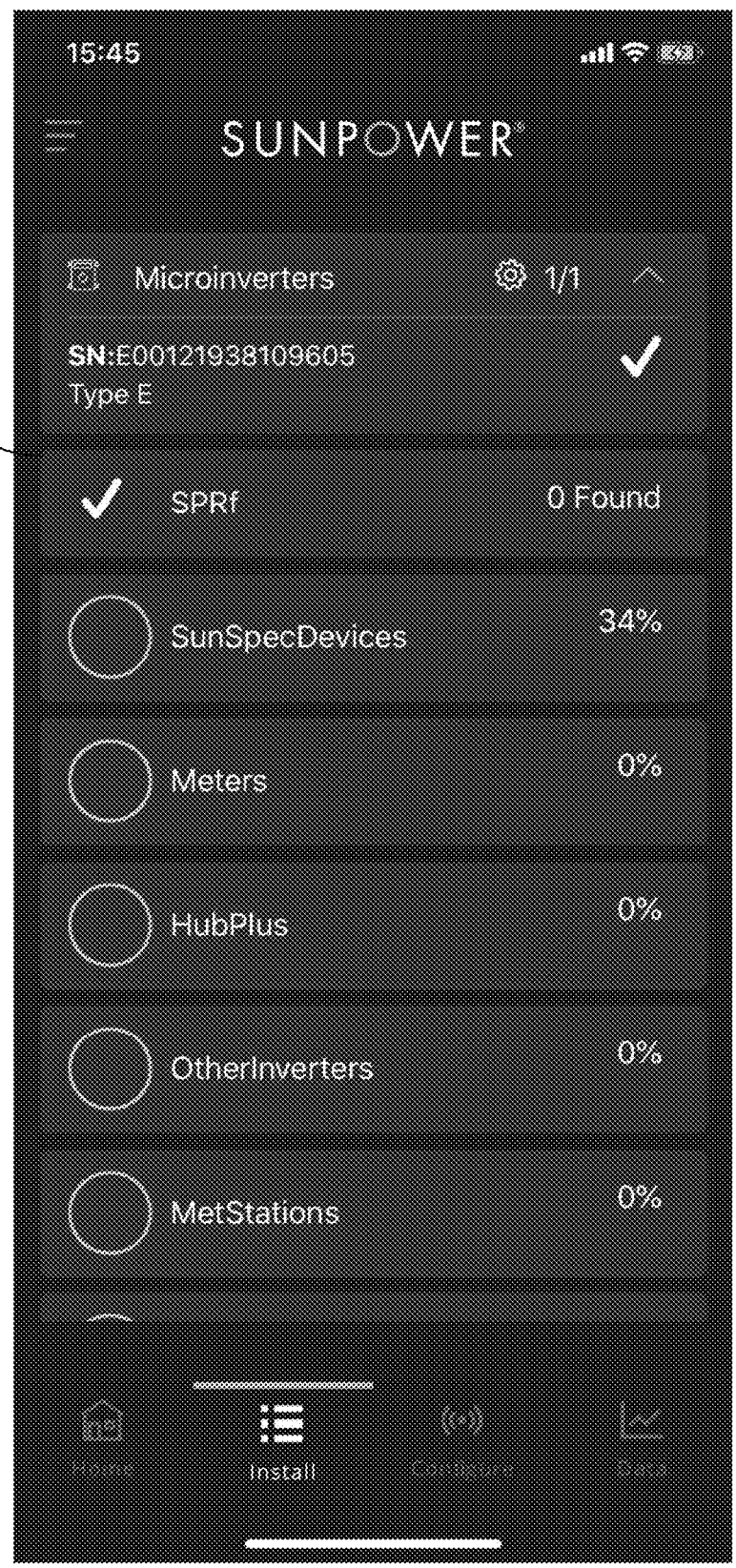
FIG. 20 illustrates an exemplary confirmation page implemented in the software application displayed on the mobile device according to one or more aspects of the disclosed subject matter.

FIG. 20 illustrates an exemplary confirmation page 2000 implemented in the software application displayed on the mobile device 120 according to one or more aspects of the disclosed subject matter. For example, once the user has a completed list, the software application can match up the equipment against the original list that was listed out earlier on the home screen. For example, if the user indicated that 15 panels were being taken to the site (e.g., via the add inventory page 1400), the software application can confirm that 15 panels were found so the user is clear to move forward to commissioning.

Figure 21:
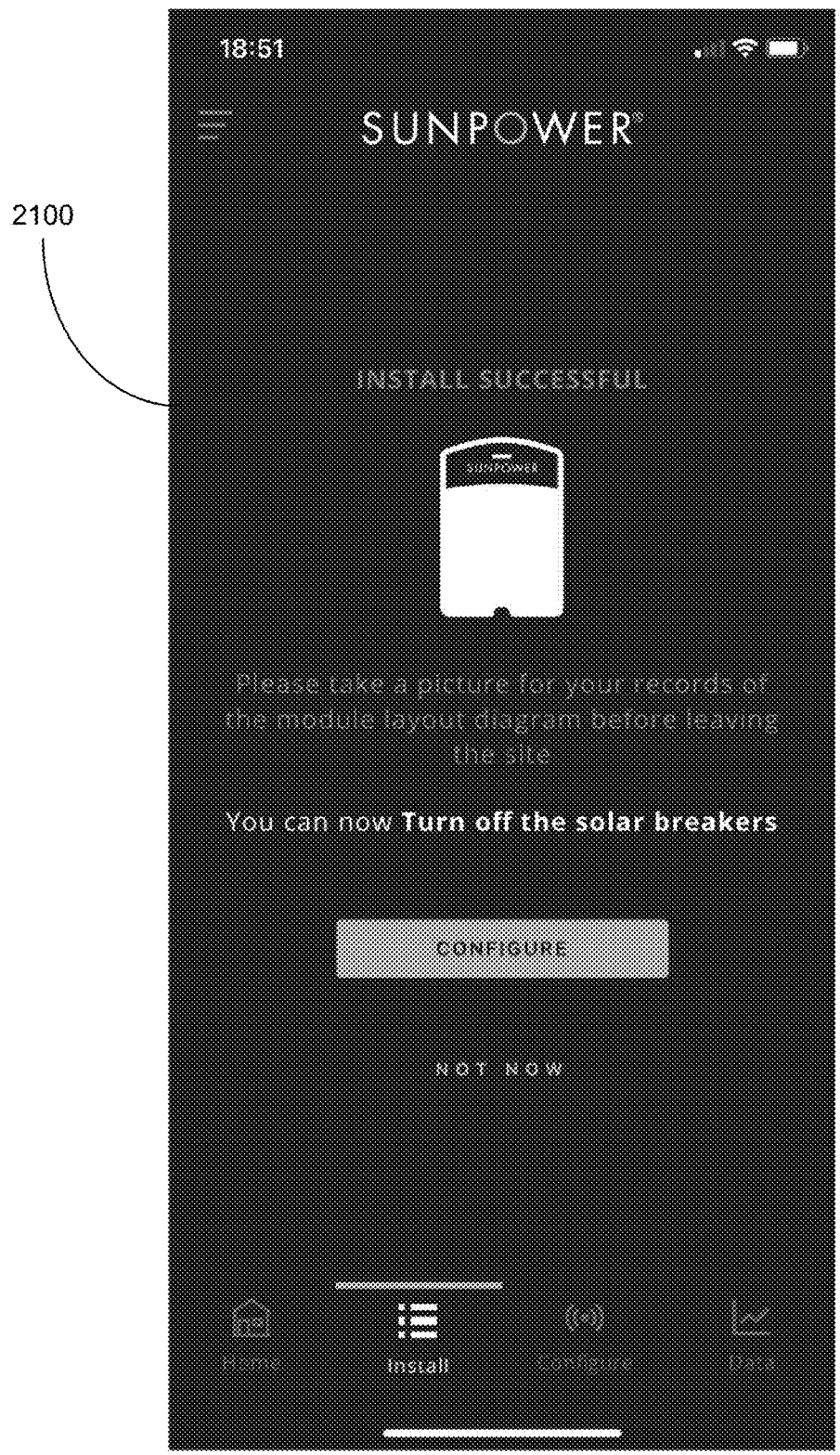
FIG. 21 illustrates an exemplary successful installation page implemented in the software application displayed on the mobile device according to one or more aspects of the disclosed subject matter.

FIG. 21 illustrates an exemplary successful installation page 2100 implemented in the software application displayed on the mobile device 120 according to one or more aspects of the disclosed subject matter. For example, the successful installation page 2100 can verify that the user has successful installed the equipment. At this point, the user can either move on to the commissioning process or stop, turn off the breakers, and leave. For example, some dealers separate the installation and commissioning, and some dealers perform the whole installation and commissioning flow at once.

FIGS. 22A-22E illustrate an exemplary configuration page 2200 implemented in the software application displayed on the mobile device 120 according to one or more aspects of the disclosed subject matter.

Figure 22A:
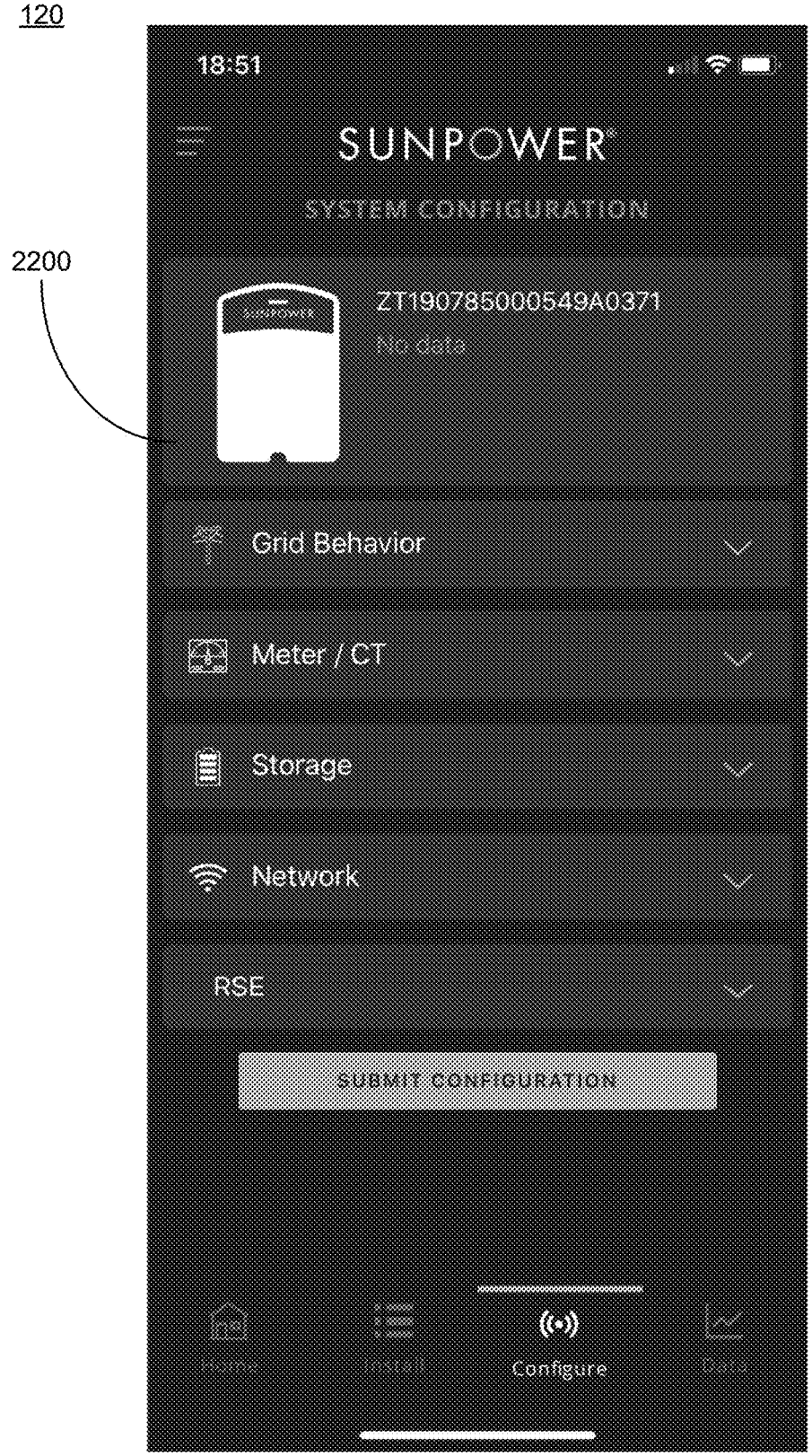
FIG. 22A illustrates an exemplary configuration page implemented in the software application displayed on the mobile device according to one or more aspects of the disclosed subject matter.

FIG. 22A illustrates an exemplary configuration page 2200 implemented in the software application displayed on the mobile device 120 according to one or more aspects of the disclosed subject matter. For example, the configuration page 2200 can include a grid behavior section, a meter/scale factor section, a storage section, a network section, and remote system energize (RSE) section, and the like.

Figure 22B:
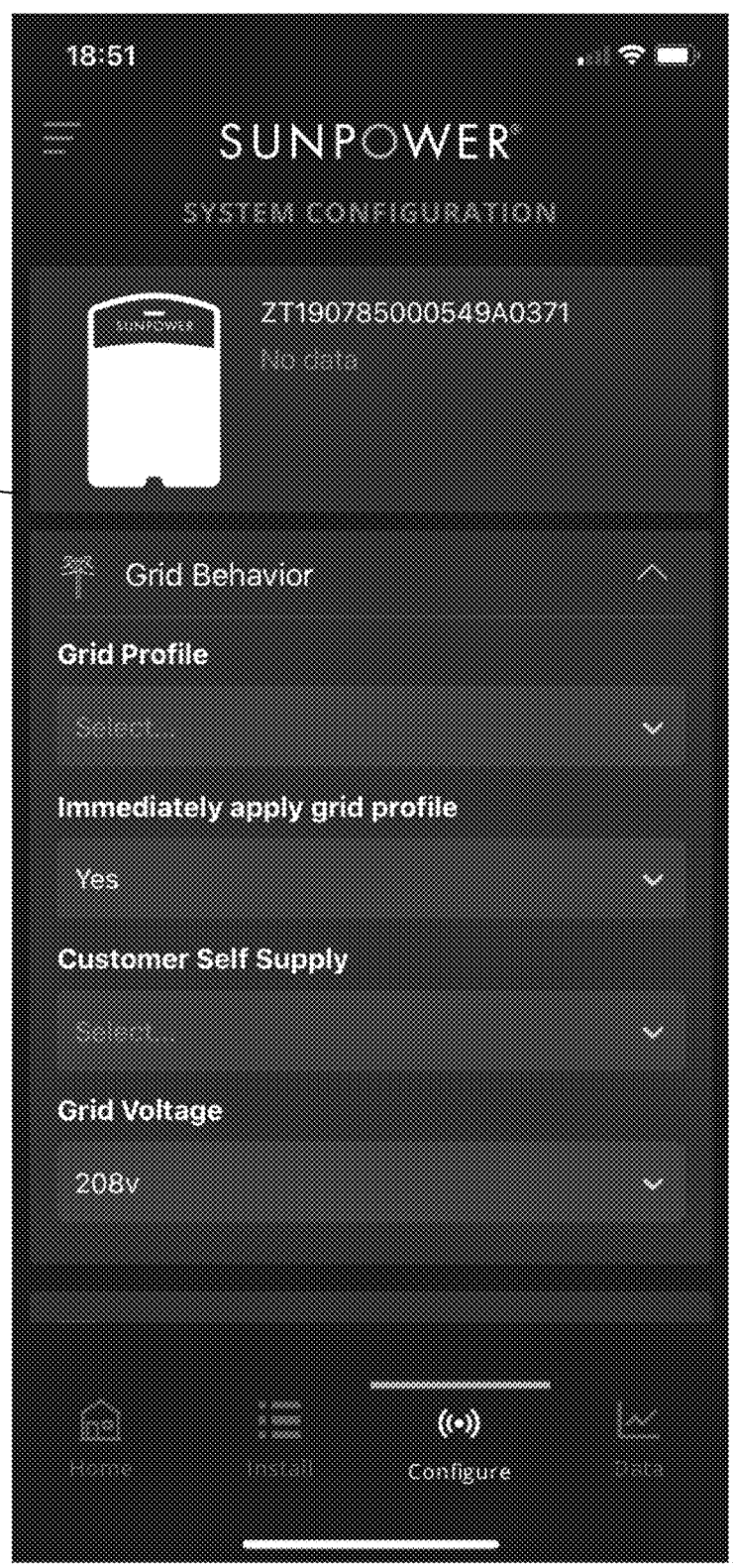
FIG. 22B illustrates the grid behavior section of configuration page implemented in the software application displayed on the mobile device according to one or more aspects of the disclosed subject matter.

FIG. 22B illustrates the grid behavior section of configuration page 2200 implemented in the software application displayed on the mobile device 120 according to one or more aspects of the disclosed subject matter.

Figure 22C:
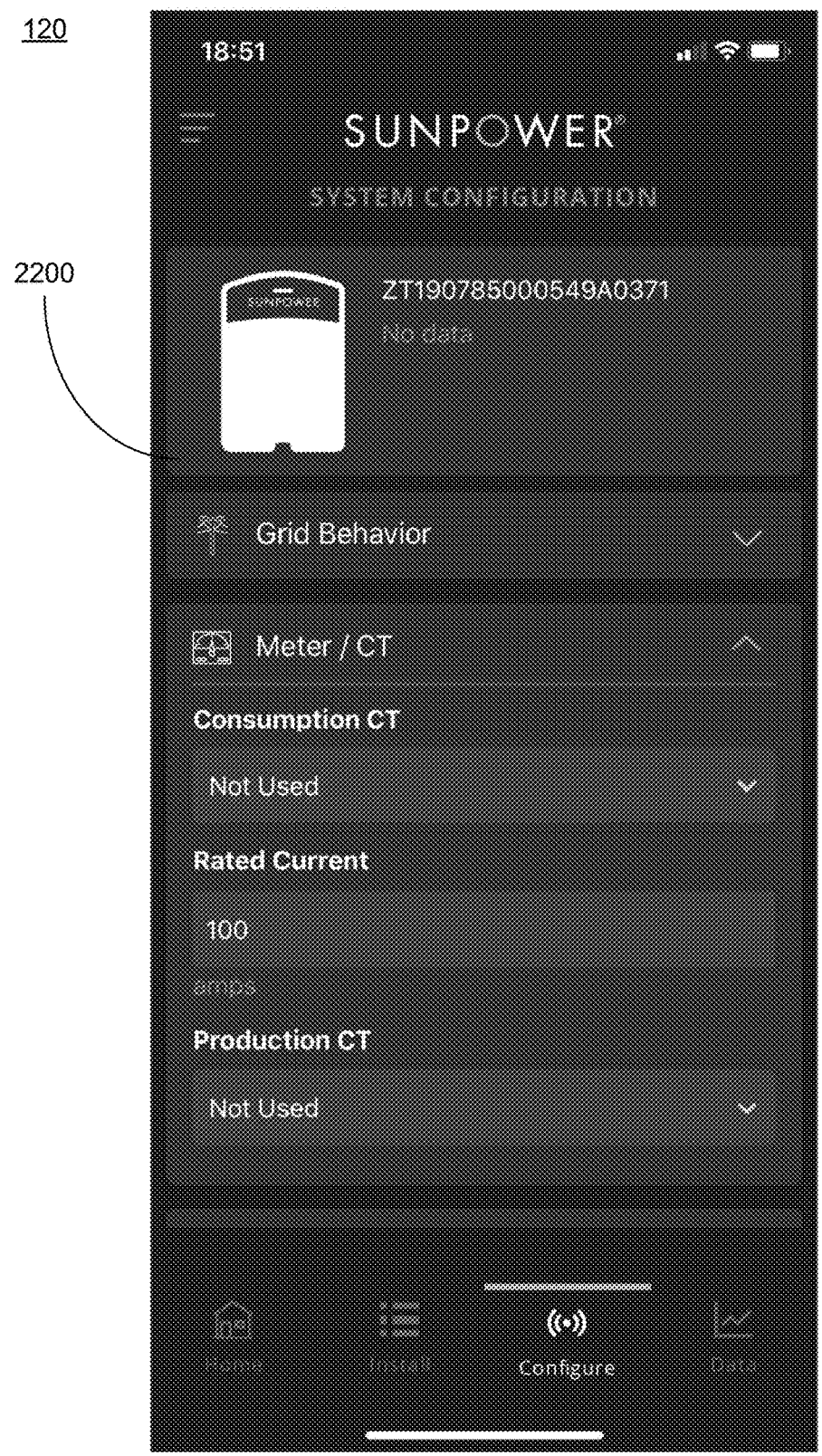
FIG. 22C illustrates the meter/scale factor section of configuration page implemented in the software application displayed on the mobile device according to one or more aspects of the disclosed subject matter.

FIG. 22C illustrates the meter/scale factor section of configuration page 2200 implemented in the software application displayed on the mobile device 120 according to one or more aspects of the disclosed subject matter.

Figure 22D:
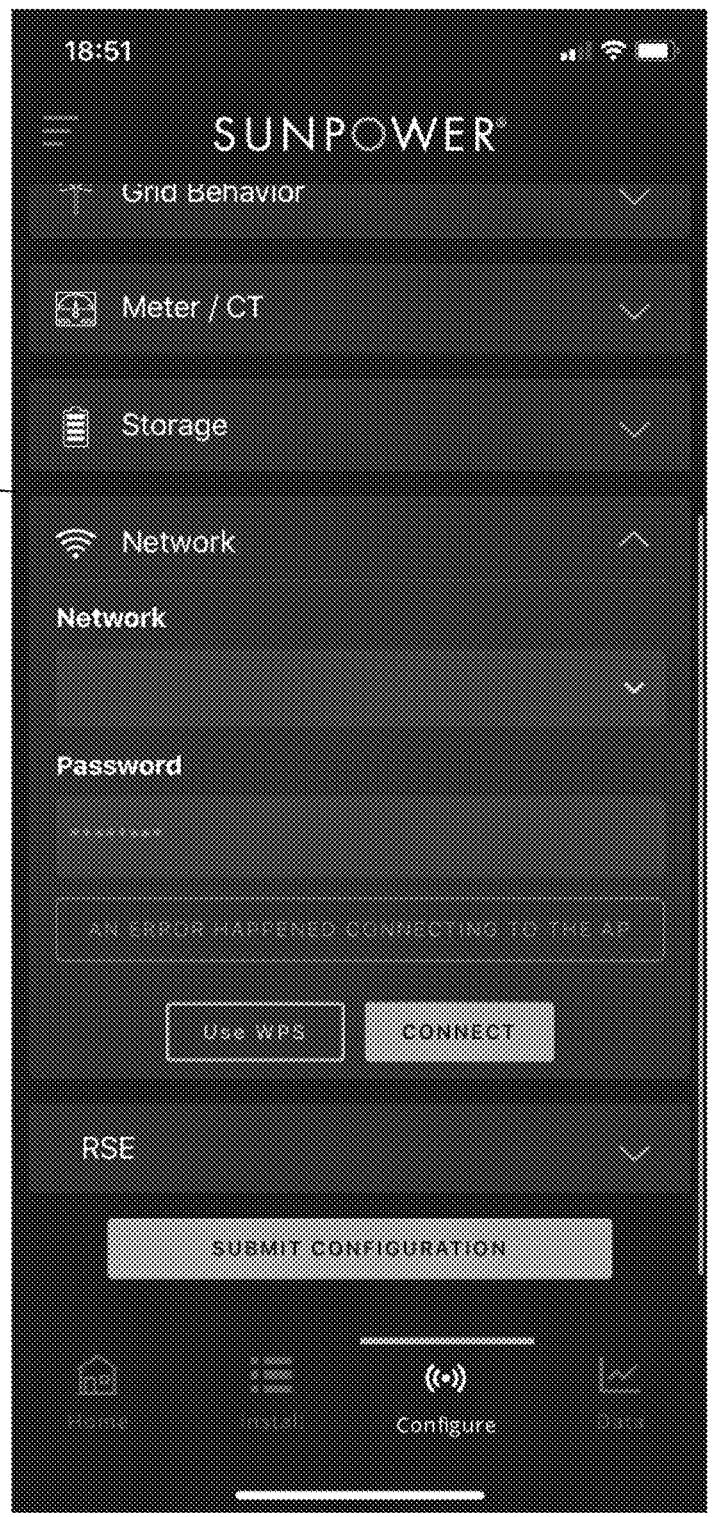
FIG. 22D illustrates the network section of configuration page implemented in the software application displayed on the mobile device according to one or more aspects of the disclosed subject matter.

FIG. 22D illustrates the network section of configuration page 2200 implemented in the software application displayed on the mobile device 120 according to one or more aspects of the disclosed subject matter. For example, the user can enter the name of the network and the network password to pair the mobile device 120 with the homeowner's router. In one aspect, the user can press the Wi-Fi Protected Setup (WPS) button (e.g., "Use WPS" button) on the network section of the configuration page 2200 and a WPS button on the homeowner's router, which can enable the mobile device 120 to pair with the homeowner's router without needing to enter a password.

Figure 22E:
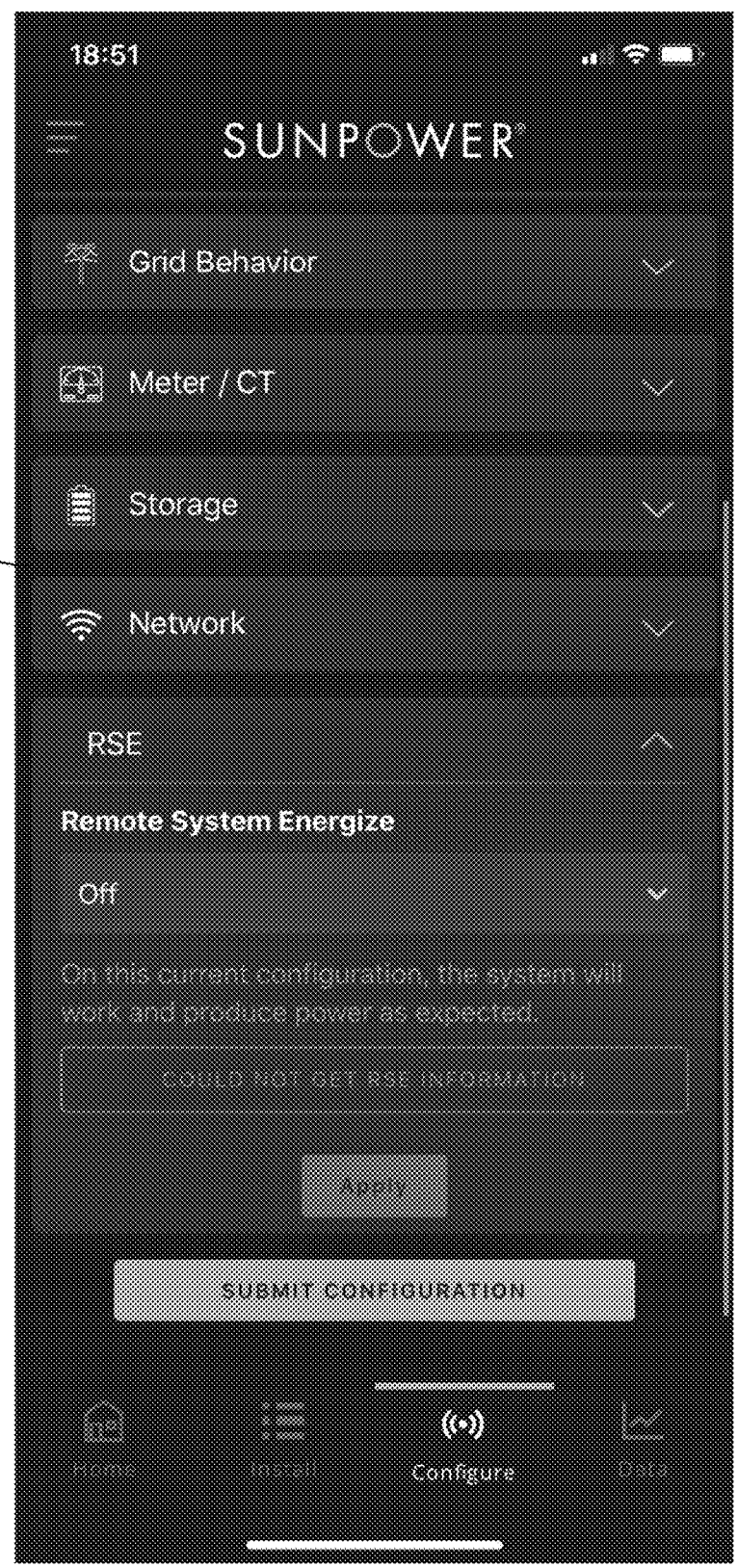
FIG. 22E illustrates the RSE section of configuration page implemented in the software application displayed on the mobile device according to one or more aspects of the disclosed subject matter.

FIG. 22E illustrates the RSE section of configuration page 2200 implemented in the software application displayed on the mobile device 120 according to one or more aspects of the disclosed subject matter. For example, the user, via the RSE section, can turn off the solar panel breakers electronically so no data is flowing, and the breakers can be turned on again later. For example, if the user doesn't have permission to operate while they are at the site, the user can enable the breakers remotely later on so the user doesn't have to go back to the site in person to enable the breakers.

Figure 23:
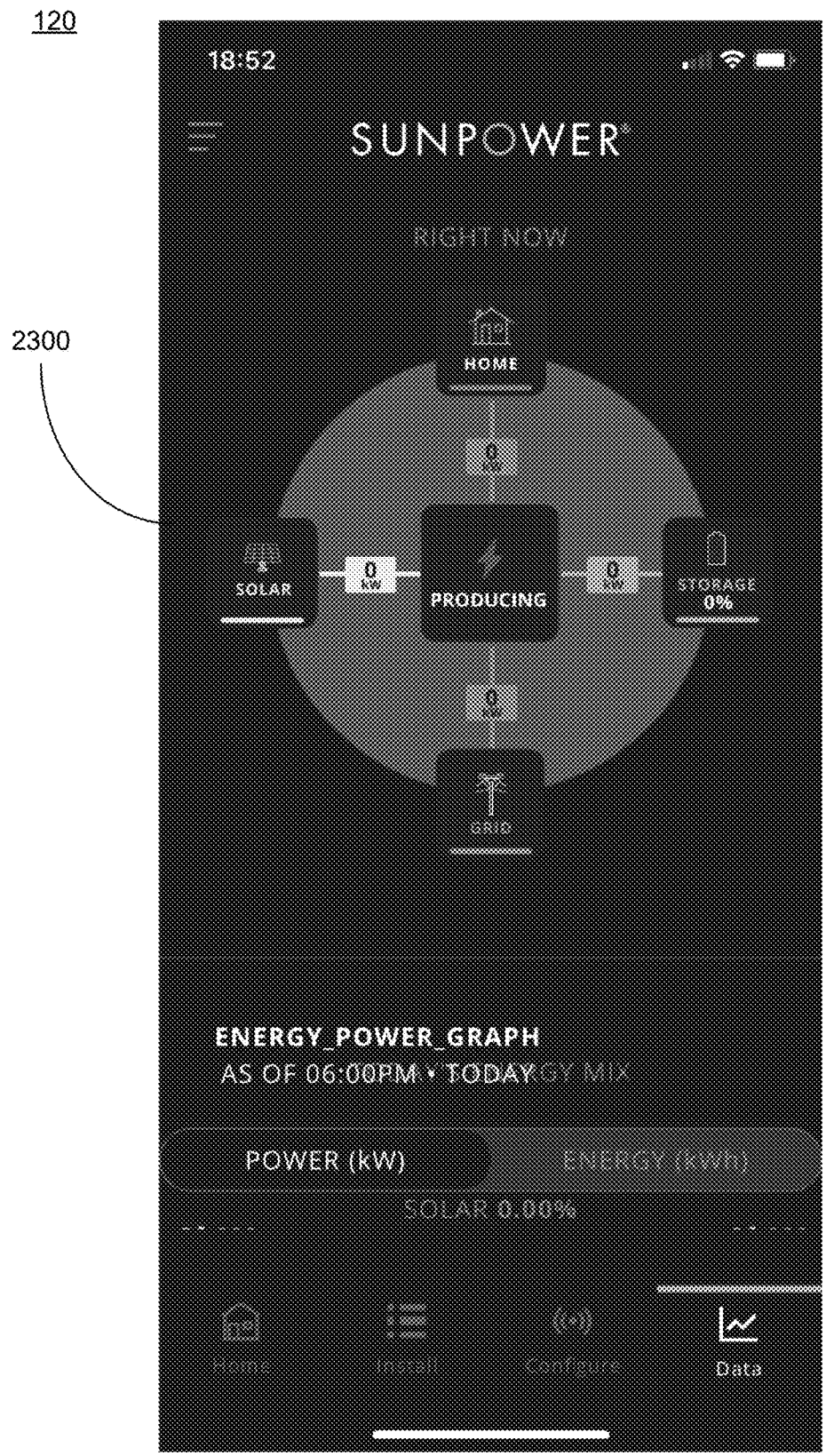
FIG. 23 illustrates an exemplary analysis page implemented in the software application displayed on the mobile device according to one or more aspects of the disclosed subject matter.

FIG. 23 illustrates an exemplary analysis page 2300 implemented in the software application displayed on the mobile device 120 according to one or more aspects of the disclosed subject matter. For example, after the system is configured (i.e., commissioned), that PV system data can be sent to a backend of the system 100. Accordingly, with the site and corresponding data being stored remotely, the data can be accessed through other software applications, for example. Additionally, after the commissioning is complete, the data for the PV system can be displayed via the analysis page 2300, which can be navigated to via a data tab in the home row. In one aspect, the user (e.g., dealer) can use the analysis page 2300 to verify that the energy flow is correct, and the system is operating as it should. In other words, the analysis page 2300 can be used as validation that the system was installed and commissioned correctly.

Figure 24:
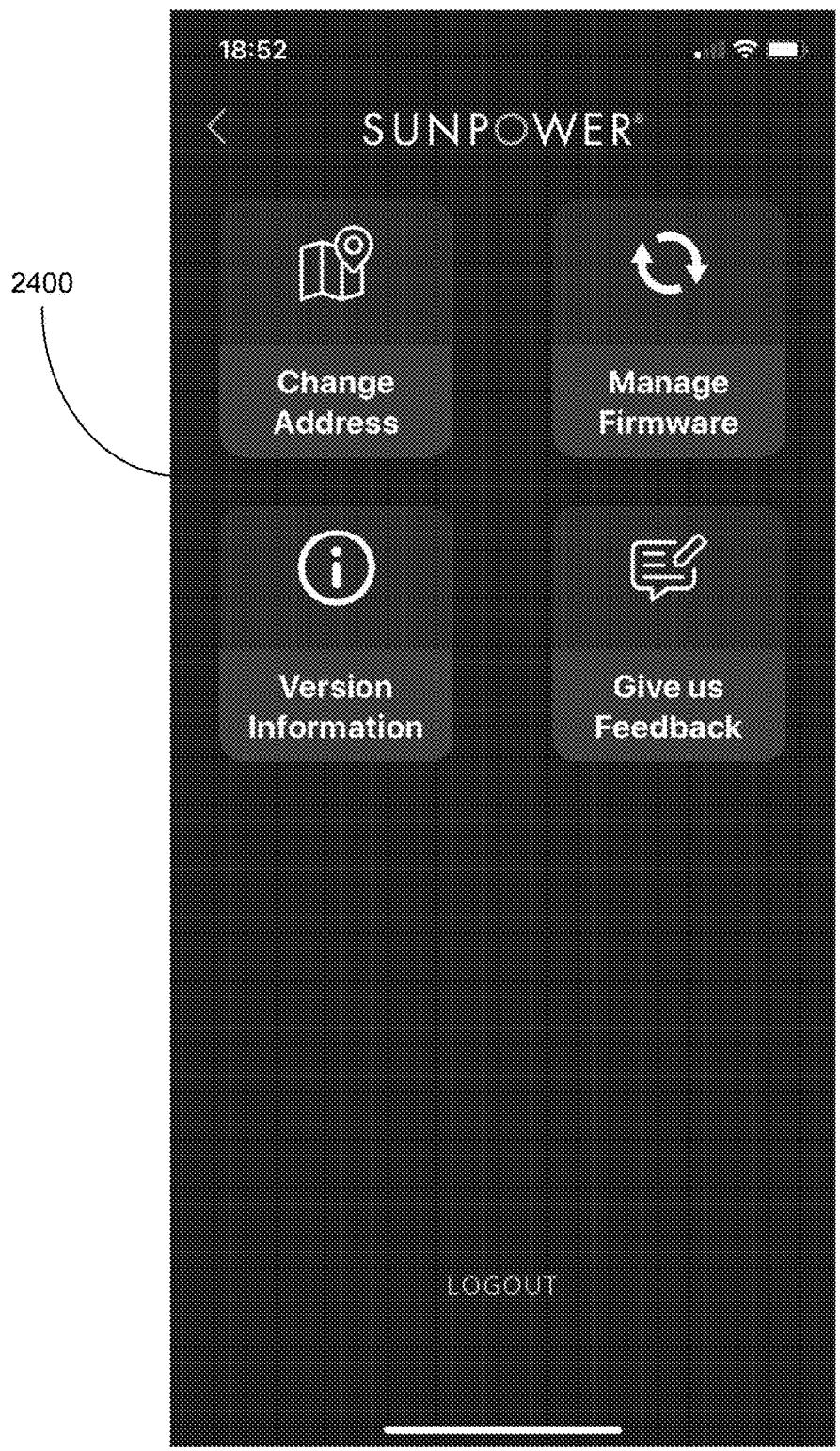
FIG. 24 illustrates an exemplary settings page implemented in the software application displayed on the mobile device according to one or more aspects of the disclosed subject matter.

FIG. 24 illustrates an exemplary settings page 2400 implemented in the software application displayed on the mobile device 120 according to one or more aspects of the disclosed subject matter. For example, the user can change address, manage firmware, review version information, and provide feedback.

Next, FIGS. 25-39 describe commissioning energy storage in a solar power commissioning system. In one aspect, commissioning energy storage in the solar power commissioning system can be combined with the commissioning process and corresponding software application (e.g., commissioning application) described for commissioning the solar power system through the system 100. In other words, reference to the commissioning application and/or the mobile device running the commissioning application being configured to do something can be understood to mean that corresponding circuitry (e.g., see FIG. 40) is configured to execute various commands to assist in the energy storage commissioning.

Installing energy storage is a complex process. Many data connections and power conductors need to be established and installed correctly, which makes it easy for an installer to make mistakes. Traditionally, troubleshooting a non-functional system is a time-consuming process that can take many hours of trial and error before a problem is identified and corrected. For example, commissioning energy storage as part of the system 100 is complex because multiple devices must be electrically and digitally connected for the system to work. Some of the common problems include establishing a connection between the energy management controller (e.g., an energy monitoring, control and/or communication device (PVS)), the storage inverter, and the batteries; ensuring that the storage inverter can sense voltage and frequency parameters to decide when it needs to start back-up mode; ensuring electrical connections between inverter and loads are correctly made so that the inputs to the microgrid controller are correct; ensuring that any power flow sensing equipment is correctly installed so that inputs to control system are valid; ensuring that PV strings used in backup-mode are installed correctly, and the like.

Figure 25A:
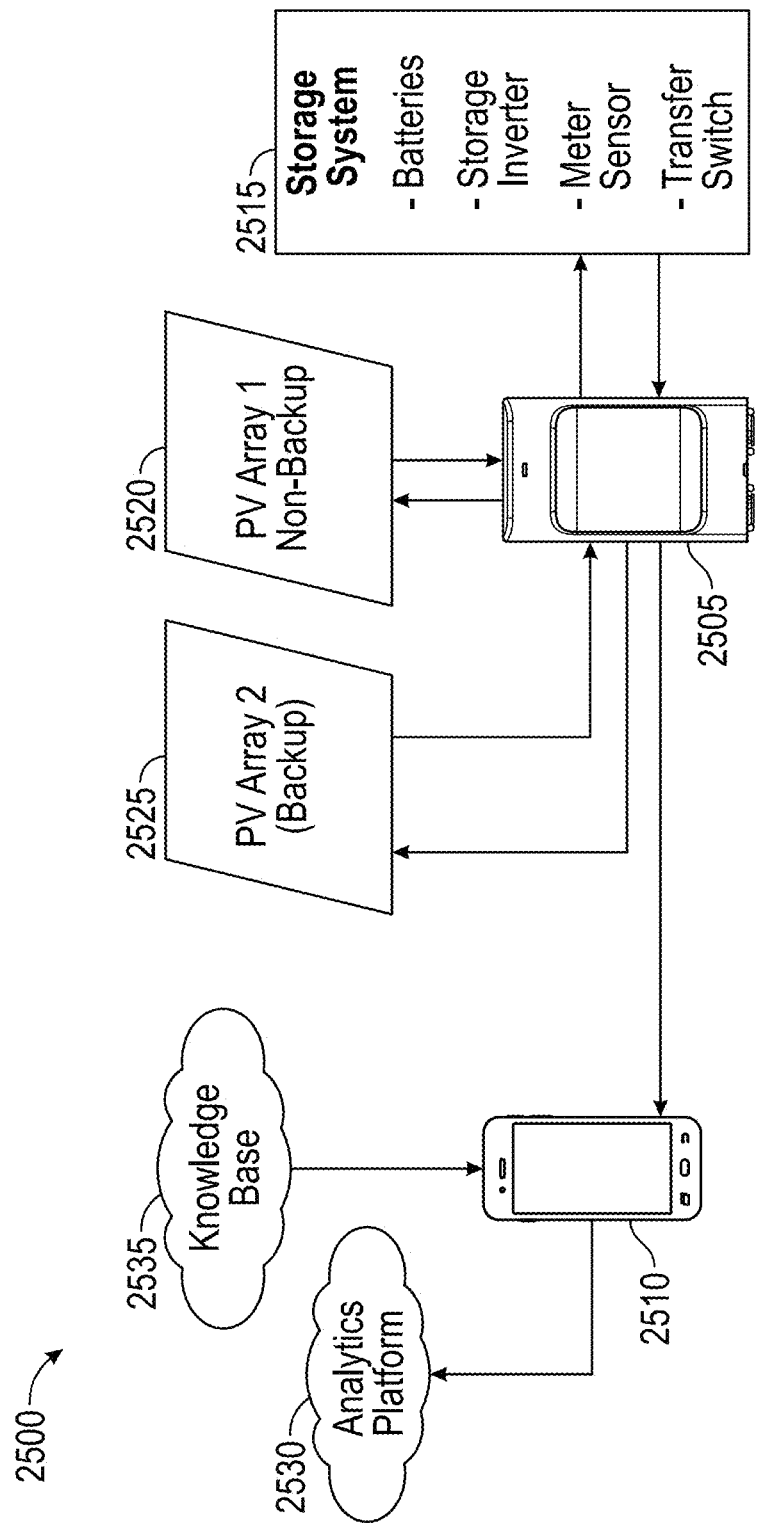
FIG. 25A illustrates an exemplary architecture for commissioning PV storage according to one or more aspects of the disclosed subject matter.

FIG. 25A illustrates an exemplary architecture 2500 for commissioning PV storage according to one or more aspects of the disclosed subject matter. The architecture 2500 can include an energy monitoring, control and/or communication device (e.g., SunPower's PV Supervisor (PVS)) 2505, a mobile device 2510 (e.g., in one aspect, the mobile device

Figure 25B:
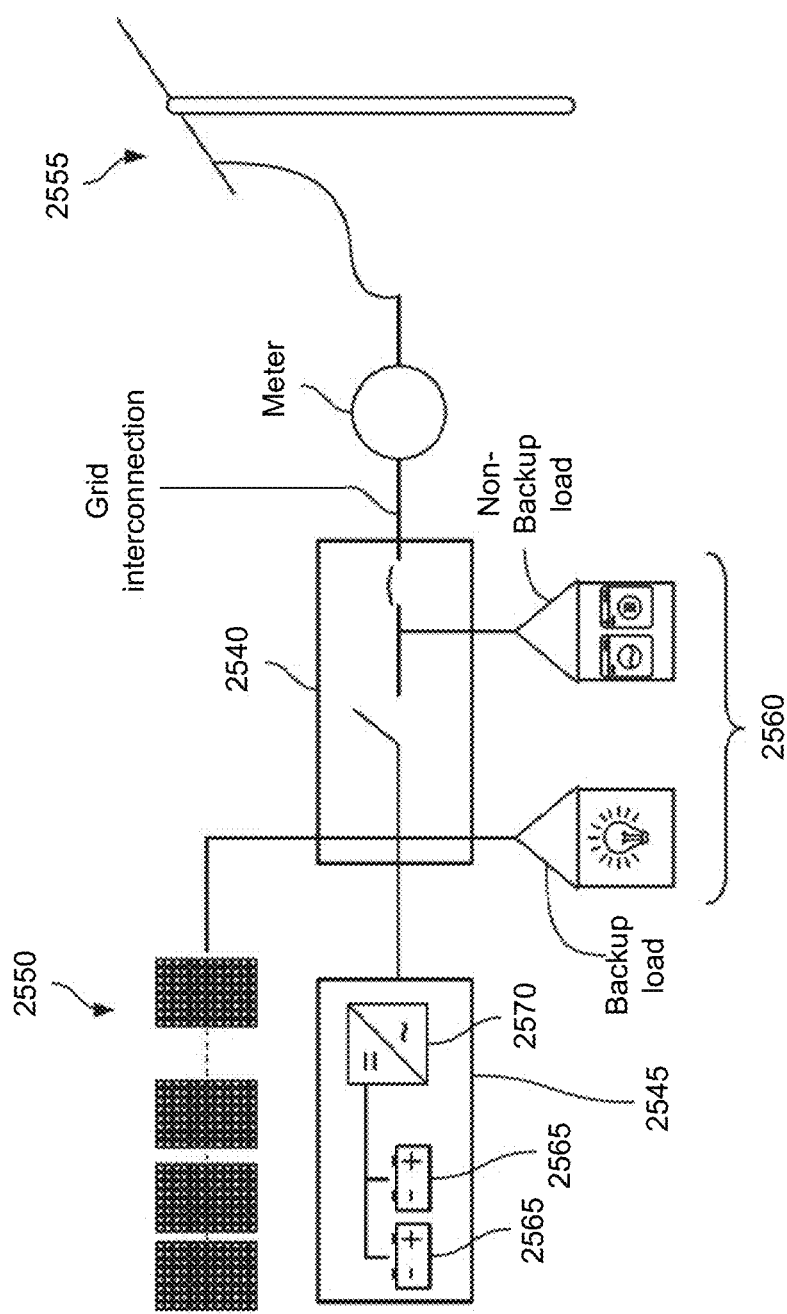
FIG. 25B illustrates an exemplary architecture for commissioning PV storage according to one or more aspects of the disclosed subject matter.

2510 can correspond to the mobile device 120 in FIG. 1), and an energy storage system 2515. In some embodiments, the photovoltaic supervisory system may include the same features of and operate in the same manner as the photovoltaic supervisory system described in U.S. patent application Ser. No. 14/810,423, filed Jul. 27, 2015, the disclosure of which is incorporated herein in its entirety by reference thereto. In one aspect, the exemplary architecture 2500 can also include additional components. For example, the architecture 2500 including the energy monitoring, control and/or communication device can include one or more additional components (e.g., an energy control system 2540 ("HUB+") architecture with a microgrid interconnection switch) corresponding to the energy monitoring, control and/or communication device as illustrated in FIG. 25B. In other words, the energy control system 2540 may control the flow of energy between an energy storage system 2545, a photovoltaic ("PV") system 2550, electrical grid power 2555, and an electrical load 2560. Energy control system 2540 may include, for example, batteries 2565 for storing energy and a converter (e.g., an inverter) 2570 for converting direct current ("DC") to alternating current ("AC") or vice versa.

Returning to FIG. 25A, the energy storage system 2515 can include batteries, storage inverter, meter sensors, and transfer switch, for example. Additionally, the energy monitoring device 2505 can also communicate with a non-backup PV array 2520 and a backup PV array 2525. Further, the mobile device 2510 can communicate with an analytics platform 2530 and a knowledge base 2535. Generally, the mobile device 2510 can be configured to run a software application (e.g., the commissioning application as has been described herein) to assist with commissioning the PV storage, and as an installer completes distinct steps in the commissioning process, the mobile device 2510, via the software application, can communicate with the energy storage system 2515 to obtain errors and health statuses.

More specifically, commissioning PV storage can include automated error detection. The automated error detection can include checking that the right devices are connected, check that the right batteries are connected to the right inverter (e.g., confirm mapping of the system is correct), validate electrical connections and sensor installations, diagnose device health, and validate system design, for example. Validating the system design corresponds to the non-backup PV array 2520 and backup PV array 2525 where the backup PV array 2525 will stay on when the grid goes out, but the non-backup PV array 2520 will not. In other words, validating the system design confirms whether the backup PV array 2525 was connected as intended. Commissioning PV storage also includes automated system topology mapping, real time feedback using web sockets on some steps rather than a polling-based approach, automated error disposition and troubleshooting, and process analytics for closed-loop improvement of experience. Regarding the automated error disposition and troubleshooting, rather than displaying a traditional error code to a user, the commissioning application can use the error code to retrieve more specific and user-friendly instructions from a database (e.g., instead of "Error code: 34567," the commissioning application displays "Check to see if the gateway is turned on").

Figure 26:
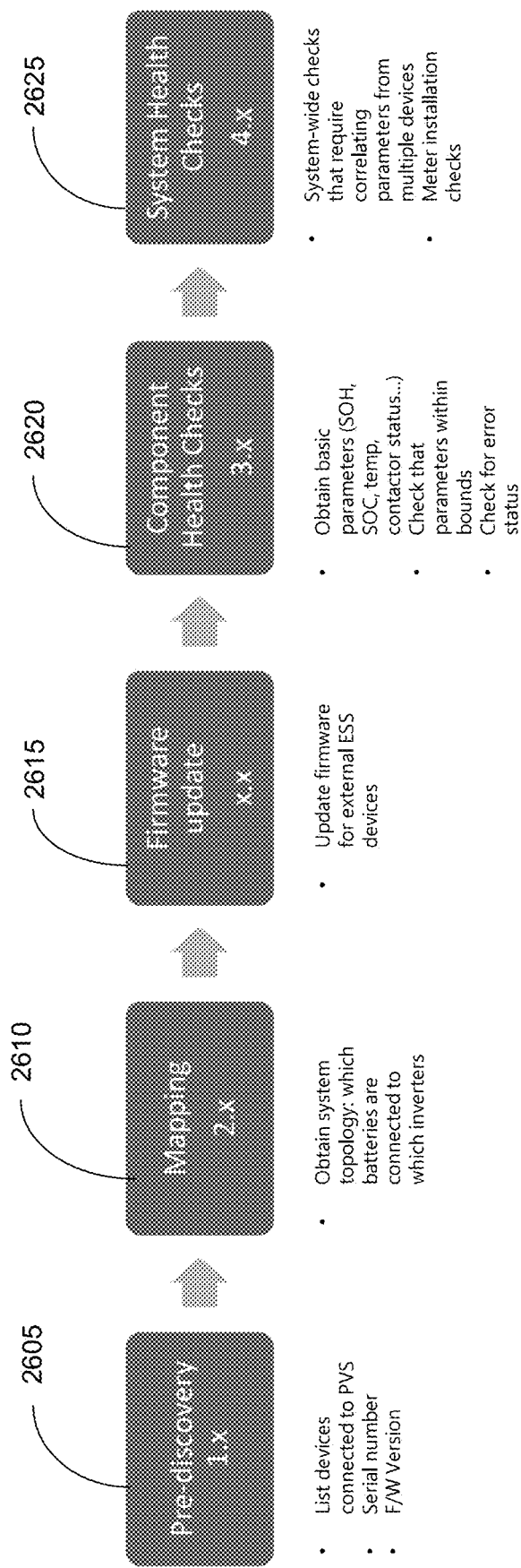
FIG. 26 illustrates an exemplary overview of the storage commissioning workflow according to one or more aspects of the disclosed subject matter.

FIG. 26 illustrates an exemplary overview of the storage commissioning workflow according to one or more aspects of the disclosed subject matter. The workflow includes pre-discovery 2605, mapping 2610, firmware update 2615, component health checks 2620, and system health checks 2625. The pre-discovery 2605 can include listing devices connected to PVS, serial numbers, and firmware version. The mapping 2610 can include obtaining a system topology (e.g., which batteries are connected to which inverters). The firmware update 2615 can include updating the firmware for devices external to the energy storage system 2515. The component health checks 2620 can include obtaining basic parameters (e.g., state of health (SOH), state of charge (SOC), temperature, contractor status, etc.), checking that parameters are within their bounds, and checking for error status. The system health checks 2625 can include system wide checks that require correlating parameters from multiple devices, and meter installation checks. In various implementations, some or all of the workflow elements or steps in FIG. 26 can be performed and some workflow elements or steps may be performed in an alternative order than illustrated in FIG. 26.

Figure 27:
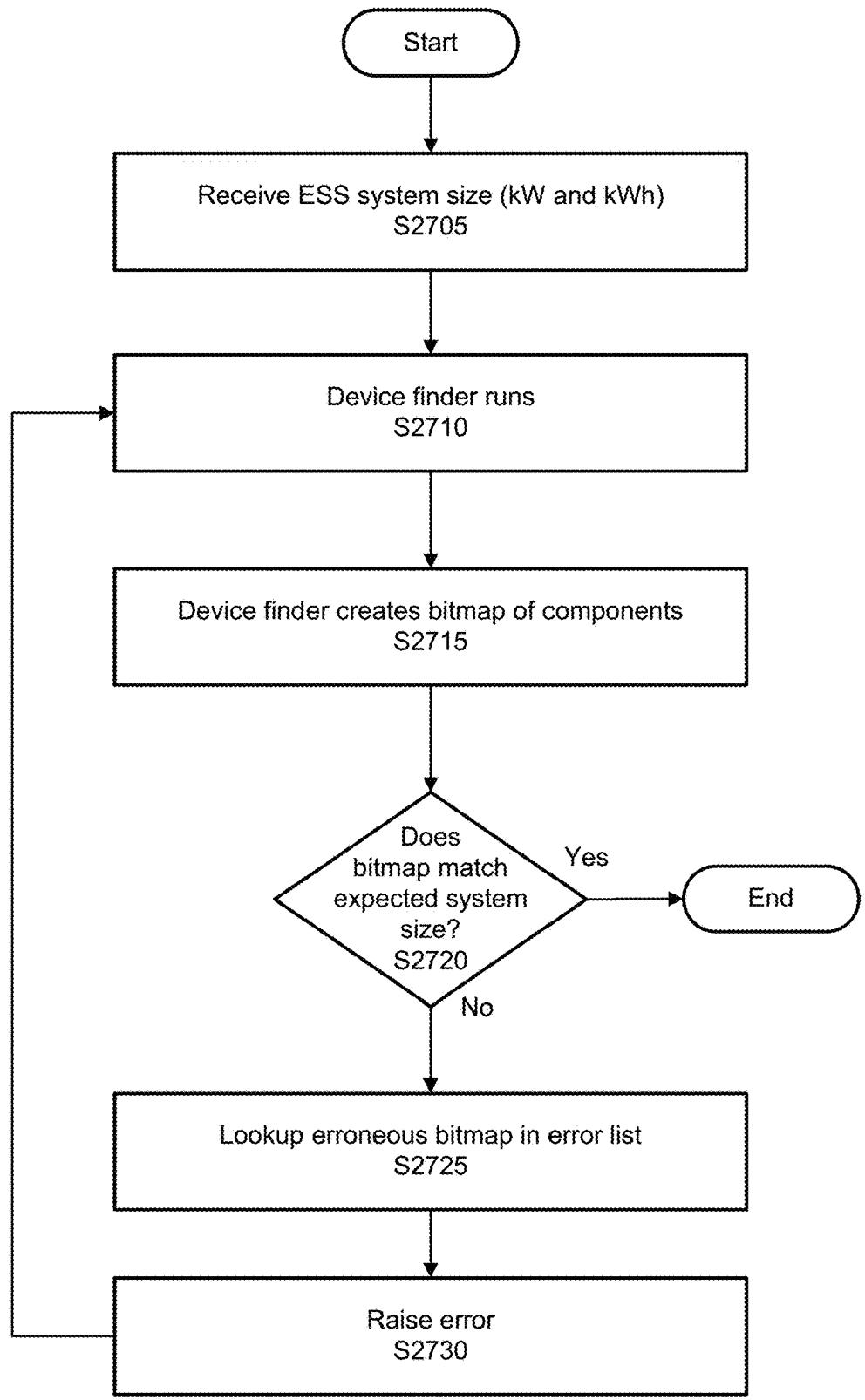
FIG. 27 is an algorithmic flow chart of a method for validating device connectivity according to one or more aspects of the disclosed subject matter.

FIG. 27 is an algorithmic flow chart of a method for validating device connectivity according to one or more aspects of the disclosed subject matter. When installing the energy storage system 2515, there are many components, some of which are wired in the field (i.e., in real time during installation) like connecting batteries to the inverter, making sure the inverter and gateway can communicate with the PVS, and making sure all components are connected as intended. The first step that can occur after installation is to determine if all the devices that are supposed to be found are found, which is addressed by the algorithmic flow chart in FIG. 27.

In S2705, the commissioning application can receive (e.g., via the mobile device 2510) a size of the energy storage system 2515 (e.g., kW and kWh). In other words, it needs to be understood how big the system is (e.g., what model of storage is being installed). Accordingly, in one aspect, the user only needs to enter the size of the system to validate the device connectivity.

In S2710, the commissioning application can run a device finder. In other words, using the device finder, the commissioning application can determine how many devices were found, which can be compared to how many devices were expected to be found (i.e., how many devices were supposed to be installed).

In S2715, the commissioning application can create a bitmap of the components. Table 1 corresponds to an exemplary bitmap.

TABLE 1

| No MIDC | No MIO | Some MIO | No Inverter Gateway | No Inverter | Some Inverter | No battery | Some battery | No Inverter Gateway battery | Some Inverter Gateway battery |
|---|---|---|---|---|---|---|---|---|---|
| 512 | 256 | 128 | 64 | 32 | 16 | 8 | 4 | 2 | 1 |

In S2720, the commissioning application can be configured to determine whether the bitmap created in S2715 matches an expected system size. In response to a determination that the bitmap does match the expected system size, the process can end. However, in response to a determination that the bitmap does not match the expected system size, the commissioning application can be configured to lookup an error in S2725.

In S2725, the commissioning application can be configured to lookup "erroneous" bitmap in an error list. It should be appreciated that the name of the error is simply exemplary.

In S2730, the commissioning application can raise an error corresponding to the results of looking up the erroneous bitmap error in S2725 which can assist in identifying which expected components are missing. After raising the error in S2730, the process can return to S2710 to continue to run the device finder again until all expected components are found and the installer has installed the system correctly.

Figure 28:
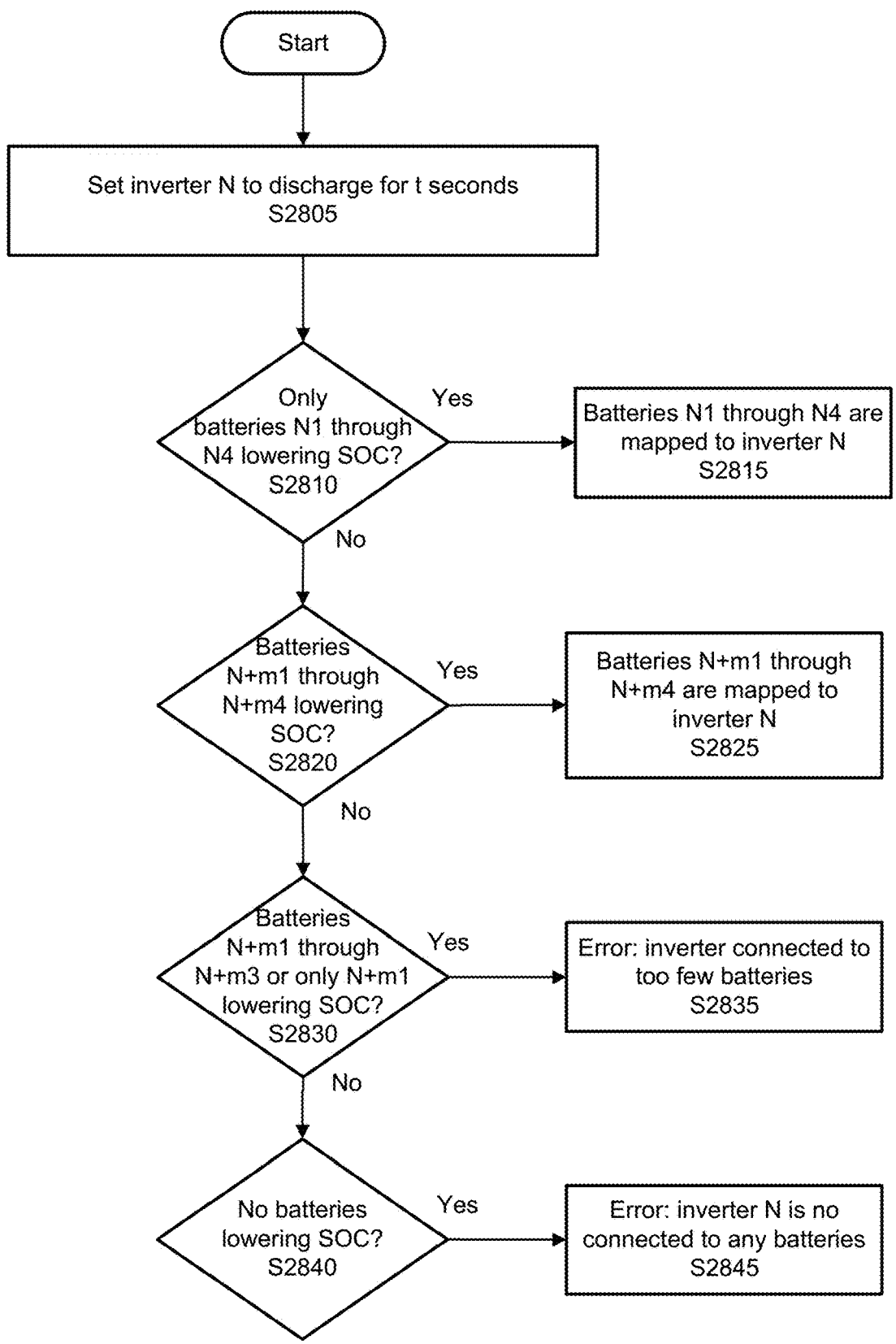
FIG. 28 is an algorithmic flow chart of a method for topology mapping according to one or more aspects of the disclosed subject matter.

FIG. 28 is an algorithmic flow chart of a method for topology mapping according to one or more aspects of the disclosed subject matter. Generally, larger power capacity storage systems will require multi-inverter architecture. In order to commission the system, the commissioning application can ascertain which inverter is connected to which set of batteries, and thus map the topology of the system. In one aspect, the method for topology mapping can be included with mapping the inverters.

In S2805, the commissioning application can be configured to set inverter N to discharge for t seconds.

In S2810, it can be determined if only batteries $N_1$ through $N_4$ are lowering their state of charge (SOC). In response to a determination that only batteries $N_1$ through $N_4$ are lowering their SOC, the commissioning application can determine that batteries $N_1$ through $N_4$ are mapped to inverter N in S2815. However, in response to a determination that not only batteries $N_1$ through $N_4$ are lowering their SOC, it can be determined if batteries $N+m_1$ through $N+m_4$ are lowering their SOC in S2820.

In S2820, it can be determined if batteries $N+m_1$ through $N+m_4$ are lowering their SOC. In other words, batteries $N+m_1$ through $N+m_4$ can correspond to a different set of batteries than $N_1$ through $N_4$ in S2810. In response to a determination that batteries $N+m_1$ through $N+m_4$ are lowering their SOC, the commissioning application can determine that batteries $N+m_1$ through $N+m_4$ are mapped to inverter N. However, in response to a determination that batteries $N+m_1$ through $N+m_4$ are not lowering their SOC, it can be determined if a subset of batteries $N+m_1$ through $N+m_4$ (e.g., $N+m_1$ through $N+m_3$ or only $N+m_1$) are lowering their SOC in S2830.

In S2830, the commissioning application can be configured to determine whether a subset of batteries $N+m_1$ through $N+m_4$ are lowering their SOC. For example, the groups of batteries may be groups of two or four batteries, so if a given group only has three batteries charging, that particular inverter has a problem with its connection to the batteries. Additionally, the determination about whether one battery or three batteries is too few or if three batteries is too many is based on the size of the system. In response to a determination that a subset of batteries $N+m_1$ through $N+m_4$ are lowering their SOC, the commissioning application can be configured to trigger an error in S2835 corresponding to a determination that inverter N is connected to too few batteries. However, if it is determined that it is not a subset of batteries $N+m_1$ through $N+m_4$ lowering their SOC, the commissioning application can be configured to determine if no batteries are lowering their SOC in S2840.

In S2840, the commissioning application can be configured to determine if no batteries are lowering their SOC. In response to a determination that no batteries are lowering their SOC, the commissioning application can be configured to trigger an error in S2845 corresponding to a determination that inverter N is not connected to any batteries. After making a determination in S2815, S2825, S2835, or S2845, the process can end.

Additionally, it should be appreciated that S2805 can be configured to set inverter N to charge rather than discharge, and the same steps S2810-S2840 can be performed where the SOC is increasing instead of lowering.

In one aspect, if the number of batteries or inverters are not matching, the topology mapping can include verifying the series connections of the COM cables because the COM cable terminations may not be properly connected.

Figure 29:
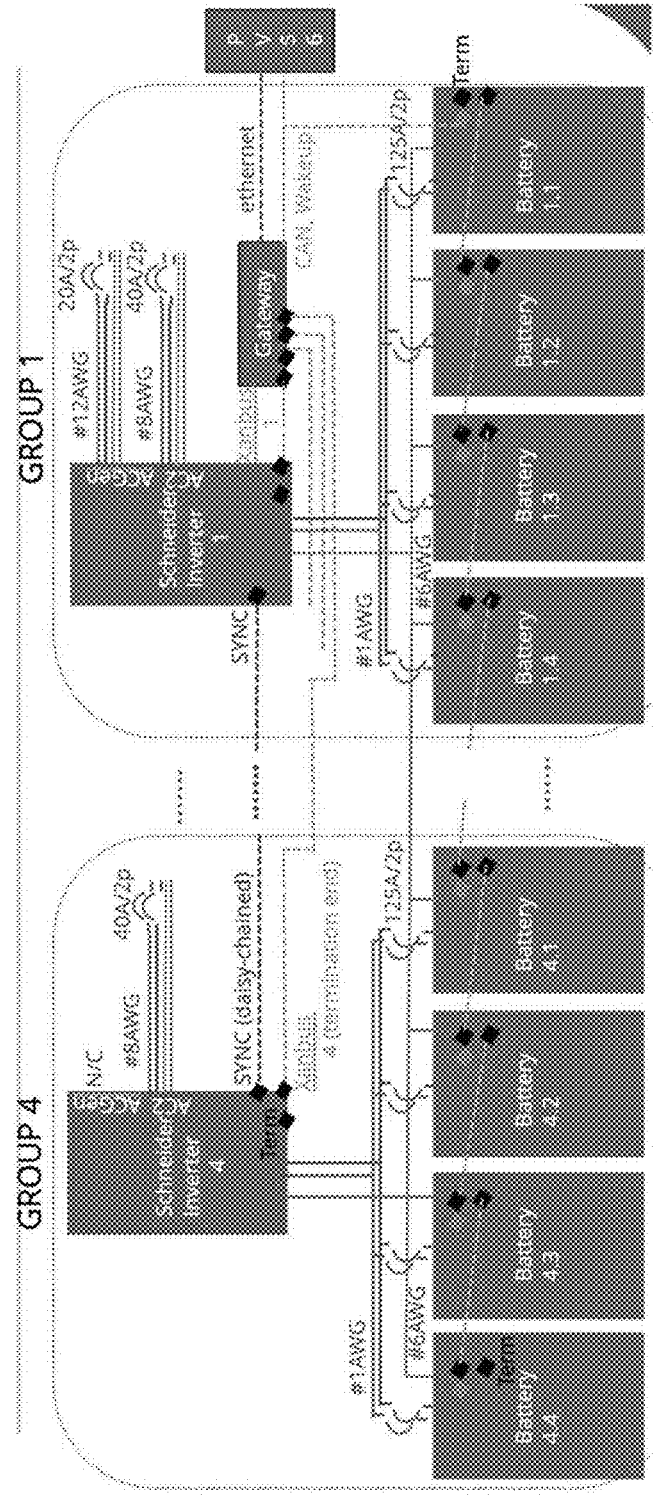
FIG. 29 illustrates an exemplary battery architecture diagram according to one or more aspects of the disclosed subject matter.

FIG. 29 illustrates an exemplary battery architecture diagram 2900 according to one or more aspects of the disclosed subject matter. Generally speaking, the system topology mapping and validation can correspond to rationality checks where an inverter can be dispatched to charge or discharge, batteries can be observed to increase or reduce SOC, respectively, and whichever batteries increased or reduced SOC, respectively, correspond to the inverter that was dispatched. Table 2 shows exemplary errors associated with the system topology mapping and validation.

TABLE 2

| Code | Error | Additional Information |
|---|---|---|
| 2.1 | Inverter with no batteries | Inverter Serial Number |
| 2.2 | Inverter with partial batteries | Inverter Serial Number |
| 2.3 | Batteries not mapped to inverter | Battery Serial Number |
| 2.4 | Too many batteries per inverter | Inverter Serial Number |
| 2.5 | Duplicate batter mapping | Batter Serial Number |
| 2.6 | NIO not mapped to inverter | Inverter Serial Number |

Figure 30A:
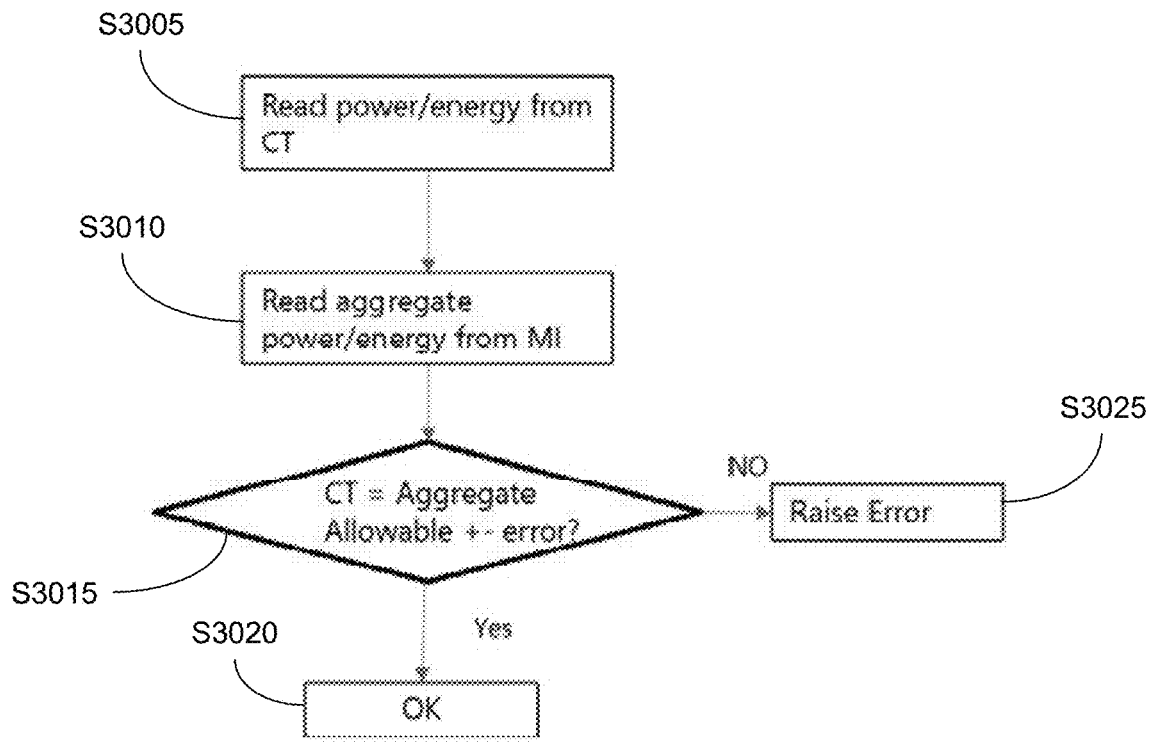
FIG. 30A is an algorithmic flow chart of a method for PV scaling according to one or more aspects of the disclosed subject matter.
Figure 30B:
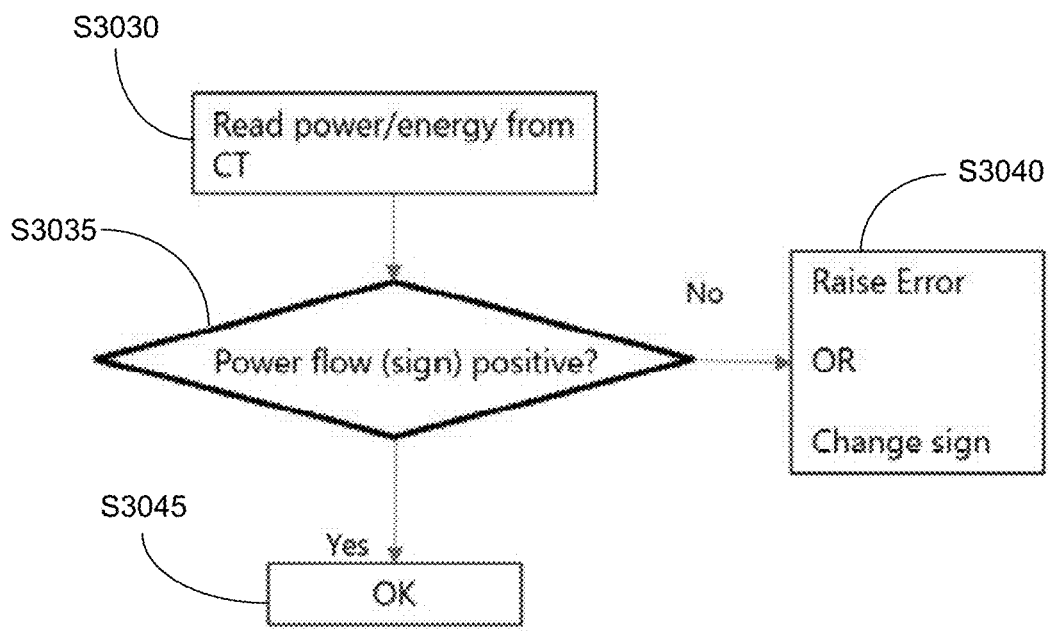
FIG. 30B is an algorithmic flow chart of a method for checking orientation according to one or more aspects of the disclosed subject matter.
Figure 30C:
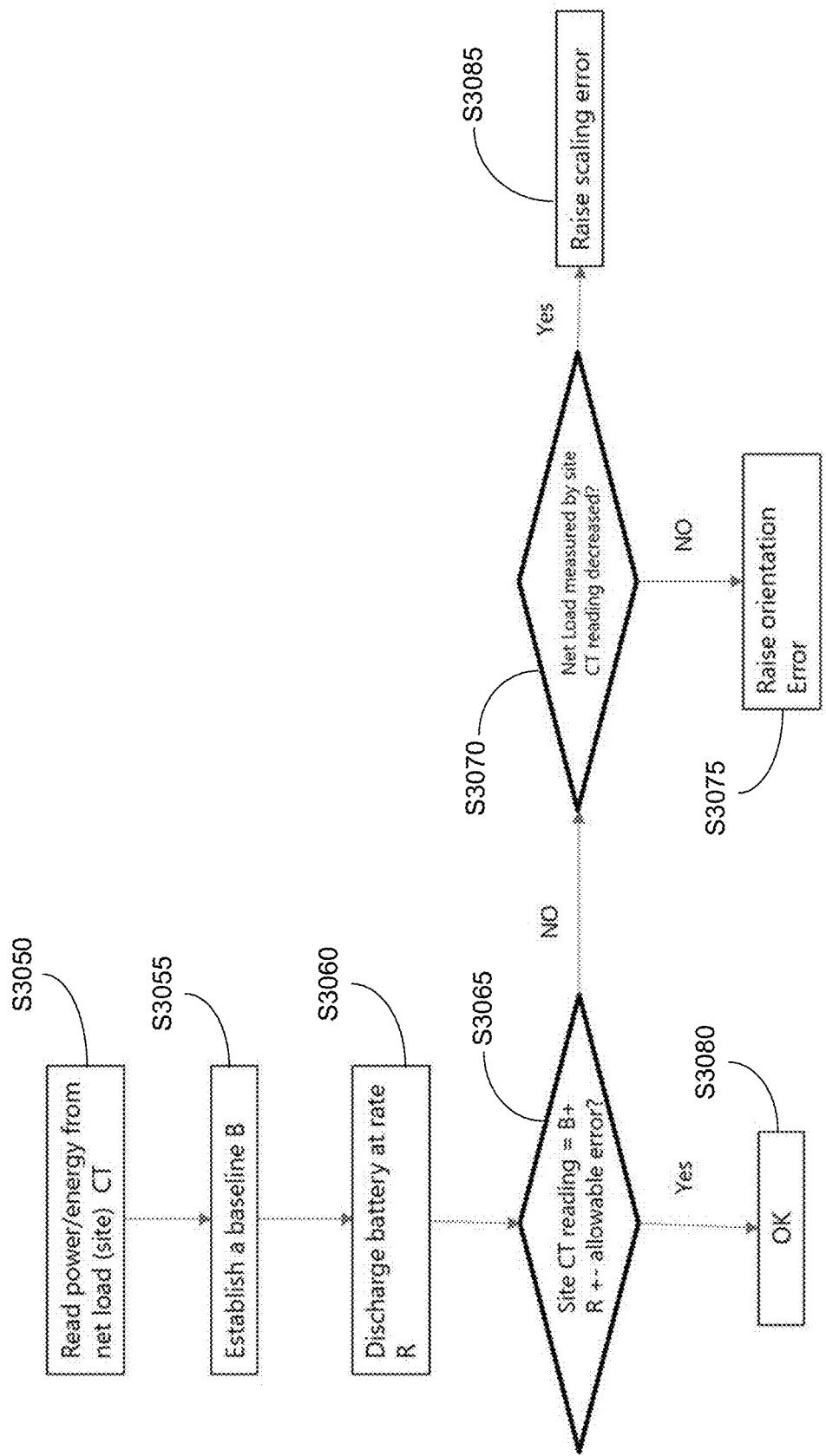
FIG. 30C is an algorithmic flow chart of a method for net load CT scaling and orientation detection according to one or more aspects of the disclosed subject matter.

FIGS. 30A-30C are algorithmic flow charts of methods for various electrical connection validations (e.g., system integration tests) according to one or more aspects of the disclosed subject matter.

FIG. 30A is an algorithmic flow chart of a method for a PV scaling check according to one or more aspects of the disclosed subject matter. Generally, current transducer (CT) devices are used to measure the amount of current flowing through a wire or cable. The PVS can use CTs, combined with voltage measurement devices, to measure power. CTs are directionally dependent devices because they need to read both negative and positive amperage values. If a CT is oriented incorrectly, then it will read the correct magnitude, but the wrong direction (e.g., positive instead of negative or negative instead of positive). Accordingly, the PVS can run a check to determine if the production CT is called correctly.

In one aspect, a CT and metering chip built into the PVS can be used for collecting production power and energy information. Alternatively, or additionally, information from AC and DC photovoltaic production devices can be aggregated to collect production power and energy information. Further, these two methods can be used to check each other. Using aggregated energy production information collected from production devices over a period of time, the value can be compared to the energy production value calculated by the production metering chip. If the two numbers are roughly equivalent, the CT is likely properly scaled. If the two values are not roughly equivalent, a PV CT scaling error can be raised.

In S3005, power and/or energy can be read from the CT.

In S3010, aggregate power and/or energy can be read from a microinverter.

In S3015, the aggregate energy production information can be compared to the energy production from the CT. When the two values are roughly equal (e.g., within a predetermined error range), the CT is properly scaled (S3020). When the two values are not roughly equivalent, a PV CT scaling error can be raised in response (S3025). After either raising an error or determining that the CT is properly scaled, the process can end.

FIG. 30B is an algorithmic flow chart of a method for checking orientation according to one or more aspects of the disclosed subject matter. Generally, the PVS can run a check to determine if the production CT is oriented in the expected direction. The production CT should only report significant power in the positive direction. It is possible that a very small amount of negative power could be detected due to sensor error. The PVS can read power/energy from the CT (S3030) and check whether the power flow (i.e., sign) is positive (S3035). In response to detecting a significant negative production power detected, an alert that the production CT is oriented incorrectly can be raised (S3040). Alternatively, the metering can be configured to automatically virtually change the orientation of the production CT (S3040). However, in response to the power flow being positive, it can be determined that the orientation is correct in S3045, and the process can end.

FIG. 30C is an algorithmic flow chart of a method for net load CT scaling and orientation detection according to one or more aspects of the disclosed subject matter. Generally, the PVS can run a check to determine if the site CTs are scaled correctly. For example, a pair of CTs and metering chips built in to the PVS can be used to collect site power consumption. If an energy storage system is located on site, it can be used to charge and discharge power at a known rate. This allows the scaling of the site CT to be tested. First, a measurement of power can be taken, then the ESS can be instructed to charge, and another measurement of site power can be taken. By comparing the two site power measurements, it can be determined whether the absolute difference in site power is roughly equivalent (e.g., within a predetermined error range) to the ESS power. In response to a determination that the site power is not roughly equivalent to the ESS power, then the site CTs are scaled incorrectly. Regarding orientation, the PVS can also run a check to determine if the site CTs are oriented in the expected direction. Similar to the site CT scaling check (e.g., which can be occurring at the same time), the PVS can detect whether the orientation of the site CT is incorrect. If the difference in site power measurements represent an increase in export power, a change from import power to export power, or a decrease in import power, then the site CTs are oriented incorrectly. In response to no change in power, it can be determined that only one CT is oriented incorrectly.

In S3050, power/energy can be read from a net load CT (e.g., site CT).

In S3055, a baseline B can be established.

In S3060, the battery can be discharged at a predetermined rate R.

In S3065, it can be determined whether the site CT reading equals the sum of the baseline and the rate within a predetermined error range. In response to a determination that the site CT reading does equal the sum of the baseline and the rate, then the check is complete with no error (S3080). However, in response to a determination that the site CT reading does not equal the sum of the baseline and the rate then the site CTs are scaled incorrectly and it can be determined whether the net load measured by the site CT reading decreased in S3070. In response to a determination that the net load decreased, a scaling error can be raised in S3085. However, in response to a determination that the net load has not decreased, an orientation error can be raised in S3075. After determining one of no error in S3080, raising an orientation error in S3075, or raising a scaling error in S3085, the process can end.

Figure 31:
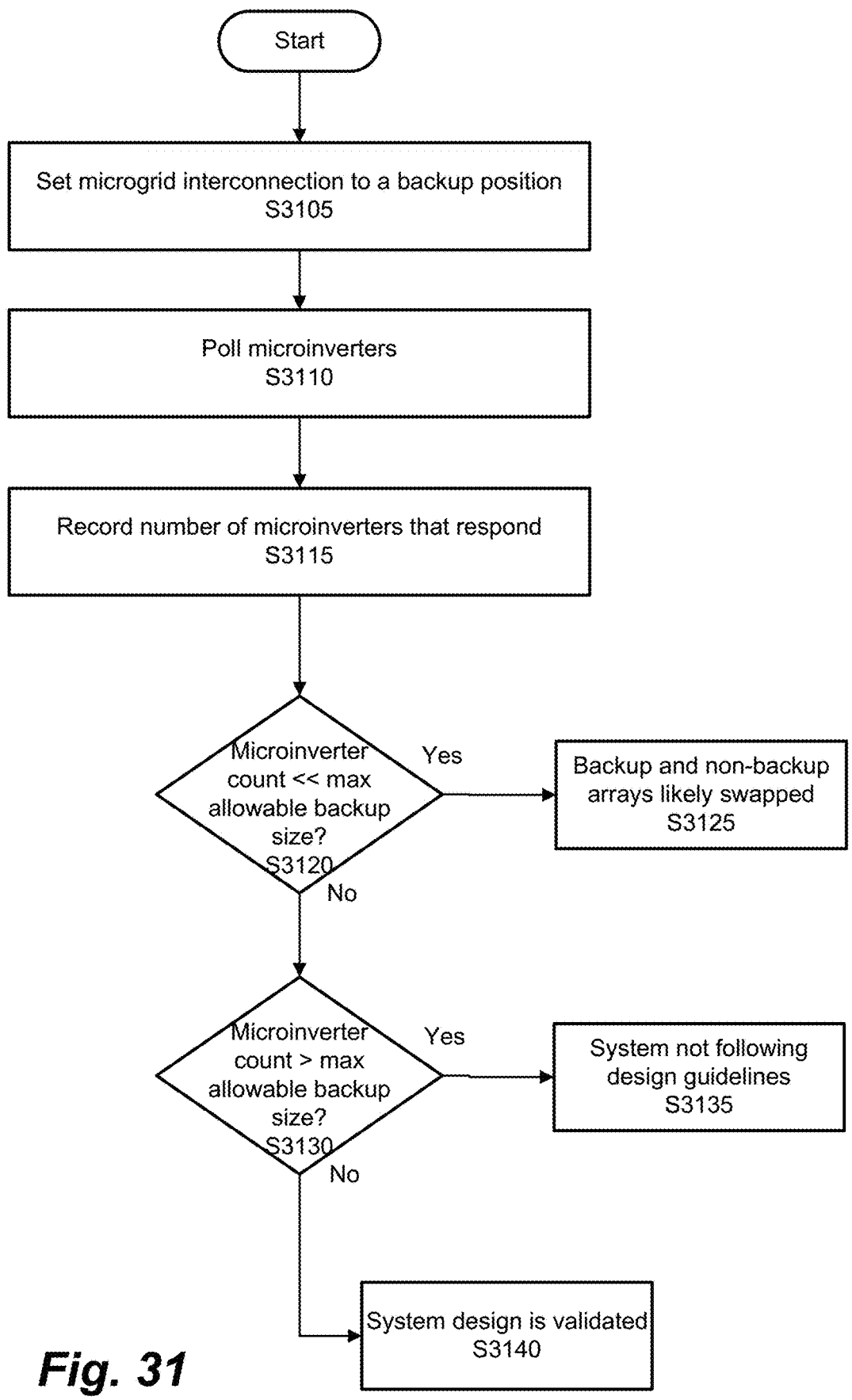
FIG. 31 is an algorithmic flow chart of a method for system design validation according to one or more aspects of the disclosed subject matter.

FIG. 31 is an algorithmic flow chart of a method for system design validation according to one or more aspects of the disclosed subject matter. In one aspect, the energy storage system 2515 includes two PV arrays (non-backup PV array 2520 and backup PV array 2525) wherein one remains operational during a grid outage and the other does not. It can be easy for an installer to erroneously swap the backup with the non-backup array. Accordingly, during PV storage commissioning, the commissioning application can poll microinverters (e.g., through the PVS) that have their transfer switch in the "backup" position and verify that the backup system size is not too small or too big.

In S3105, the commissioning application can be configured to set the system to backup mode by setting a microgrid interconnection device to a backup position.

In S3110, the commissioning application can be configured to poll microinverters (e.g., a list of microinverters that are connected to the microgrid interconnection device).

In S3115, the commissioning application can be configured to record number of microinverters that responded to the polling in S3110.

In S3120, it can be determined whether the microinverter count is less than a maximum allowable backup size. In one aspect, it can be determined whether the microinverter count is less than the maximum allowable backup size by more than a predetermined threshold. In response to a determination that the microinverter count is less than the maximum allowable backup size by more than a predetermined threshold, the commissioning application can be configured to determine that the backup and non-backup arrays are swapped in S3125. However, if it is determined that the microinverter count is not less than the maximum allowable backup size by more than a predetermined threshold, the commissioning application can be configured to determine if the microinverter count is greater than the maximum allowable backup size in S3130.

In S3130, the commissioning application can be configured to determine if the microinverter count is greater than the maximum allowable backup size. In response to a determination that the microinverter count is greater than the maximum allowable backup size, the commissioning application can be configured to determine that system is not following design guidelines in S3135 and the process can end. However, in response to a determination that the microinverter count is not greater than the maximum allowable back up size (and also not less than the less than the maximum allowable backup size by more than a predetermined threshold), the commissioning application can be configured to determine that the system design is validated in S3140 and the process can end.

In other words, by determining whether the microinverter count is less than a maximum allowable backup size or greater than an allowable maximum backup size, this logic can assist determining a total number of microinverters that can be communicated with on the backup side and the non-backup side and also taking the system into backup mode and seeing how many microinverters are able to be communicated with. This ensures that the number of microinverters are within the prescribed limits. Also, for customers that already have solar on their roof, they may want to add new panels and/or storage, for example. In this case, by checking the microinverter count compared to the maximum backup size, it can be determined if something was not installed correctly. Additionally, as checking the microinverter count compared to the maximum backup size can be automated, it does not require a technician to visit the site in person to troubleshoot.

In other words, the threshold for comparing the microinverter count to the maximum backup size can assist in 1) accurately monitoring energy from solar panels in the energy system and 2) provide seamless backup operation as part of the energy system dynamics. This initial commissioning enables later monitoring. Additionally, the backup (e.g., PV array 2525) and non-backup (e.g., PV array 2520) are separate because in backup mode the PV panels have to seamlessly work with the energy storage and be able to charge, shut off when the battery is full, etc. (i.e., system dynamics within storage and solar in backup mode). In other words, in order to accomplish this, comparing the microinverter count to the maximum backup size assists in sizing the system appropriately to avoid issues with the system dynamics.

In one aspect, if a larger load than the system can support is implemented, the system can fail micro-grid formation with a AC overload fault when it is operated. In response, the installer can be alerted to relocate the load to the non-backup PV array.

In one aspect, the systems design validation can also include a step for checking an amount of time taken for a back-up transition which can correspond to the system time checks the transition and provides an alert if the transition is taking longer than expected due to some loads or defects including communication cables that are too long, an internal defect of sub-components, etc. Additionally, systems tests can include automatically backing up and reconnecting to grid at a predetermined time, automatically charging from PV in backup and in grid-tied condition, checking for all low voltage power supplies when in backup and grid tied condition, and checking if the system is able to discharge in operating modes set such as PV self-consumption algorithm.

Figure 32:
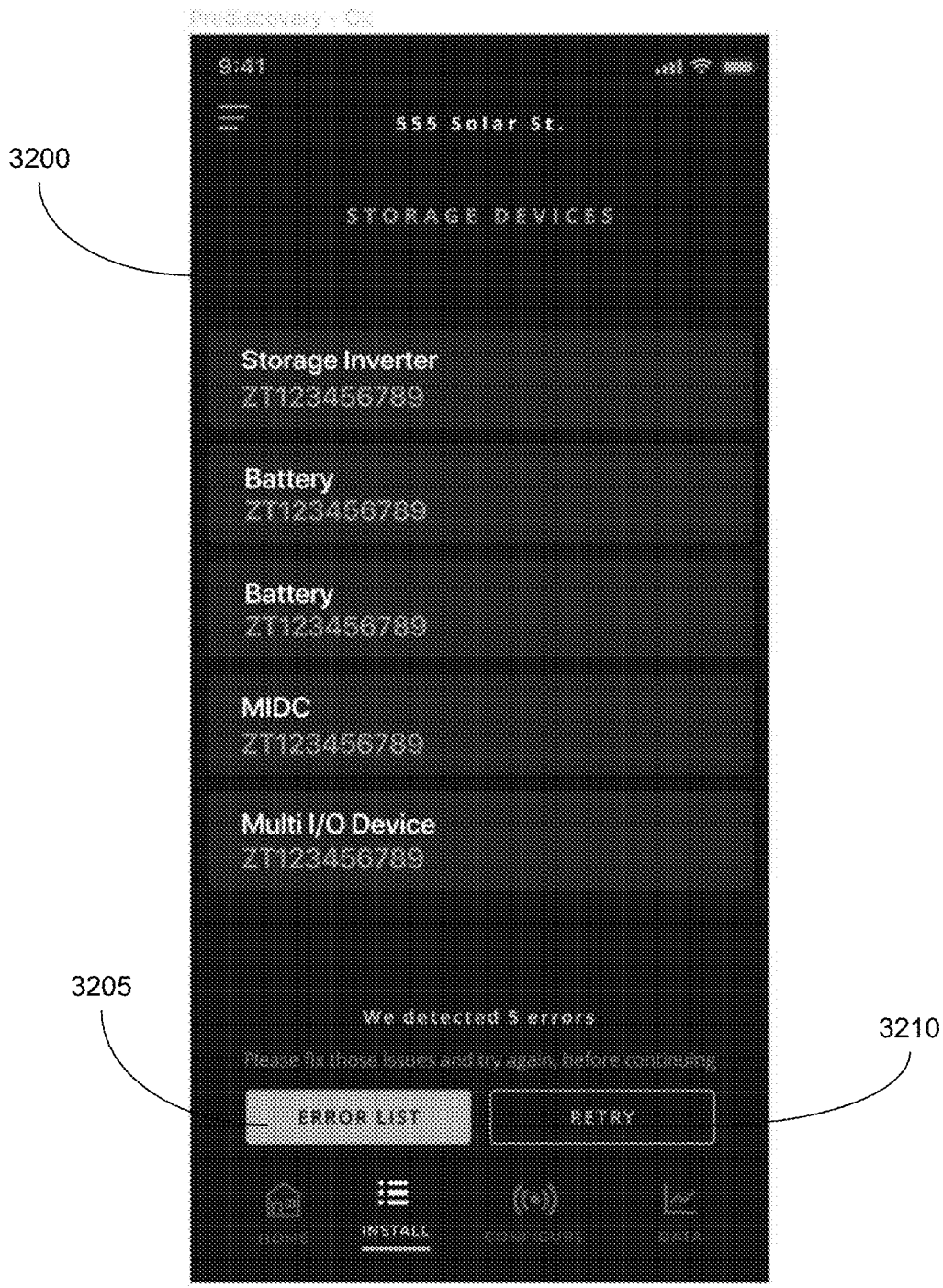
FIG. 32 illustrates an exemplary storage devices page when errors are detected implemented in the software application displayed on the mobile device according to one or more aspects of the disclosed subject matter.

FIG. 32 illustrates an exemplary storage devices page 3200 when errors are detected implemented in the software application displayed on the mobile device 2510 according to one or more aspects of the disclosed subject matter. For example, the number of errors detected can be displayed. Additionally, a first button 3205 (e.g., "ERROR LIST") can be pressed to display a listing of the detected errors. Additionally, a second button 3210 (e.g., "RETRY") can be pressed to retry after addressing the errors. In this case, retry can correspond to attempting to find all the storage devices. Similar buttons can be included on other pages described herein. For example, buttons that display the text "ERROR LIST" can perform substantially similar functions (e.g., displaying a corresponding error list) as described in FIG. 32 unless stated otherwise.

Figure 33:
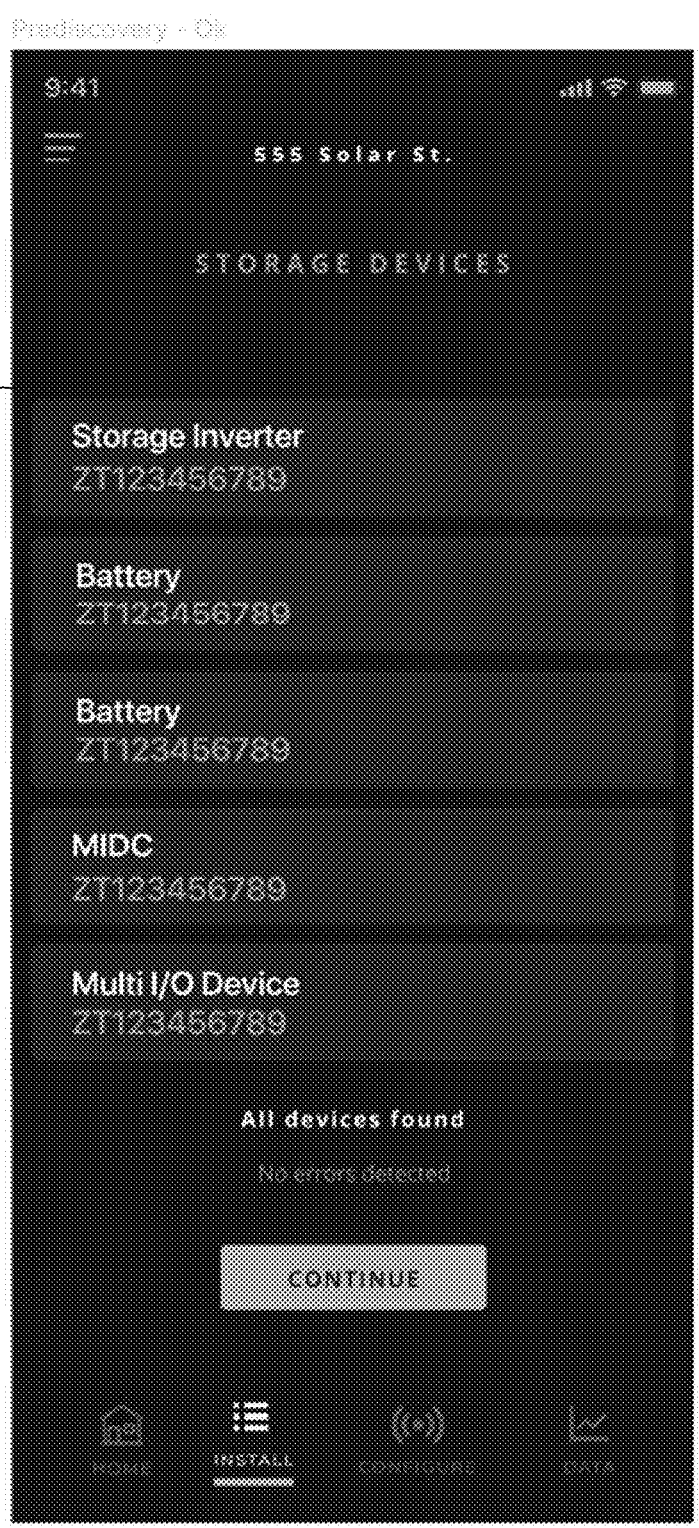
FIG. 33 illustrates an exemplary storage devices page when no errors are detected implemented in the software application displayed on the mobile device according to one or more aspects of the disclosed subject matter.

FIG. 33 illustrates an exemplary storage devices page 3300 when no errors are detected implemented in the software application displayed on the mobile device 2510 according to one or more aspects of the disclosed subject matter. Additionally, in the event that errors are detected, but the errors are redundant, unimportant, and/or not significant enough to prevent proceeding, the installer can manually clear those faults so that there are no errors.

Figure 34:
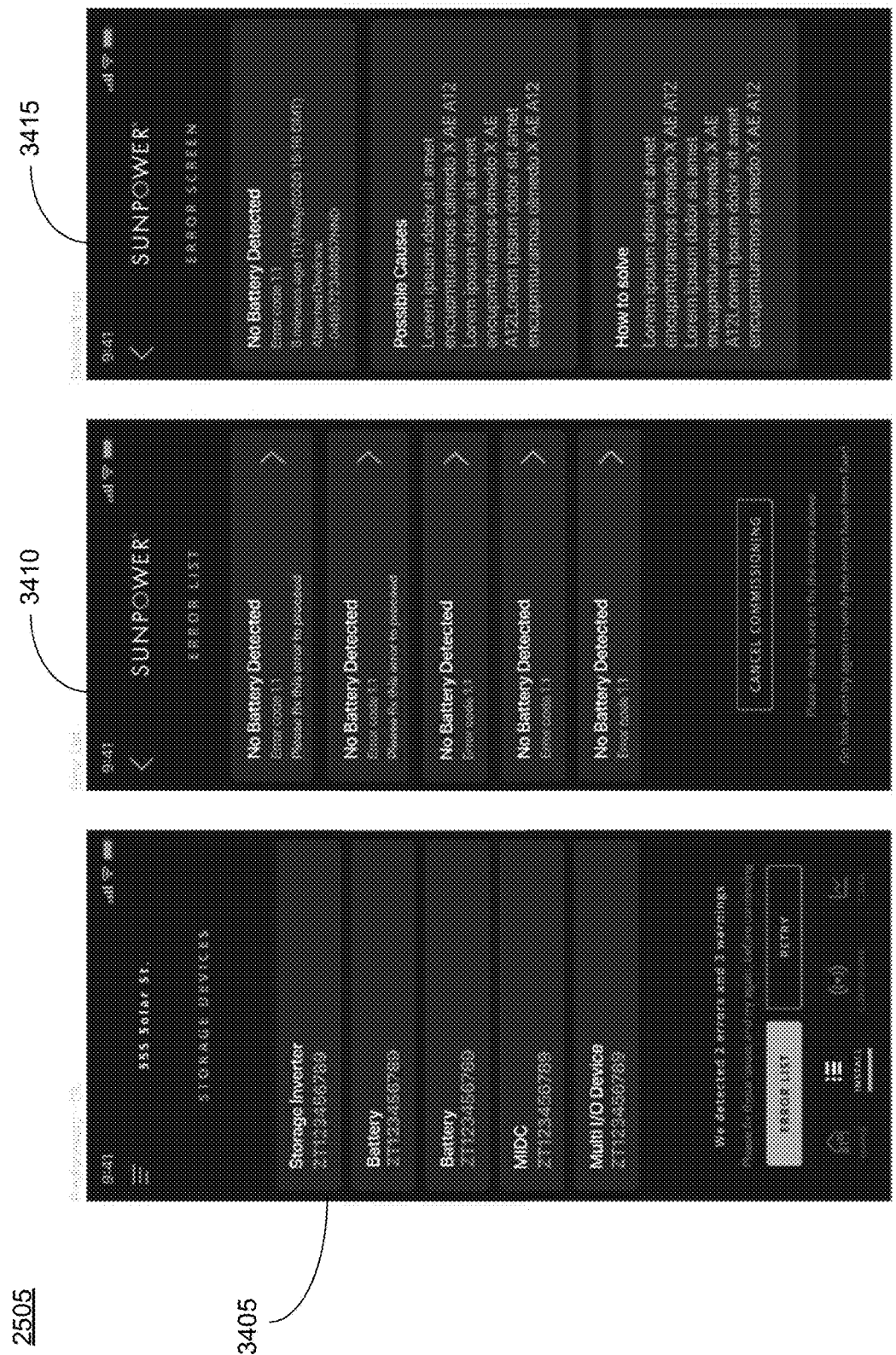
FIG. 34 illustrates exemplary storage devices page when at least one critical error is detected, error list page, and error description page, each implemented in the software application displayed on the mobile device according to one or more aspects of the disclosed subject matter.

FIG. 34 illustrates exemplary storage devices page 3405 when at least one critical error is detected, error list page 3410, and error description page 3415, each implemented in the software application displayed on the mobile device 2510 according to one or more aspects of the disclosed subject matter. By selecting the "ERROR LIST" button on the storage devices page 3405, the error list page 3410 can be displayed. By selecting one of the errors listed on the error list page 3410, the error description page 3415 can be displayed. The error description page can display the error detected in detail, possible causes of the error, and suggestions for how to solve the problem. In other words, rather than simply displaying an error code, the commissioning application can be configured to use the error code to search a database and display significant detail about the error, possible causes, and solutions. After troubleshooting and fixing the cause of the errors, the user can select the retry button on the storage devices page 3405. In one aspect, only certain errors require being fixed before proceeding while other errors can trigger warnings which may not require fixing before proceeding but information can still be provided for the error, possible causes, and solutions.

Figure 35:
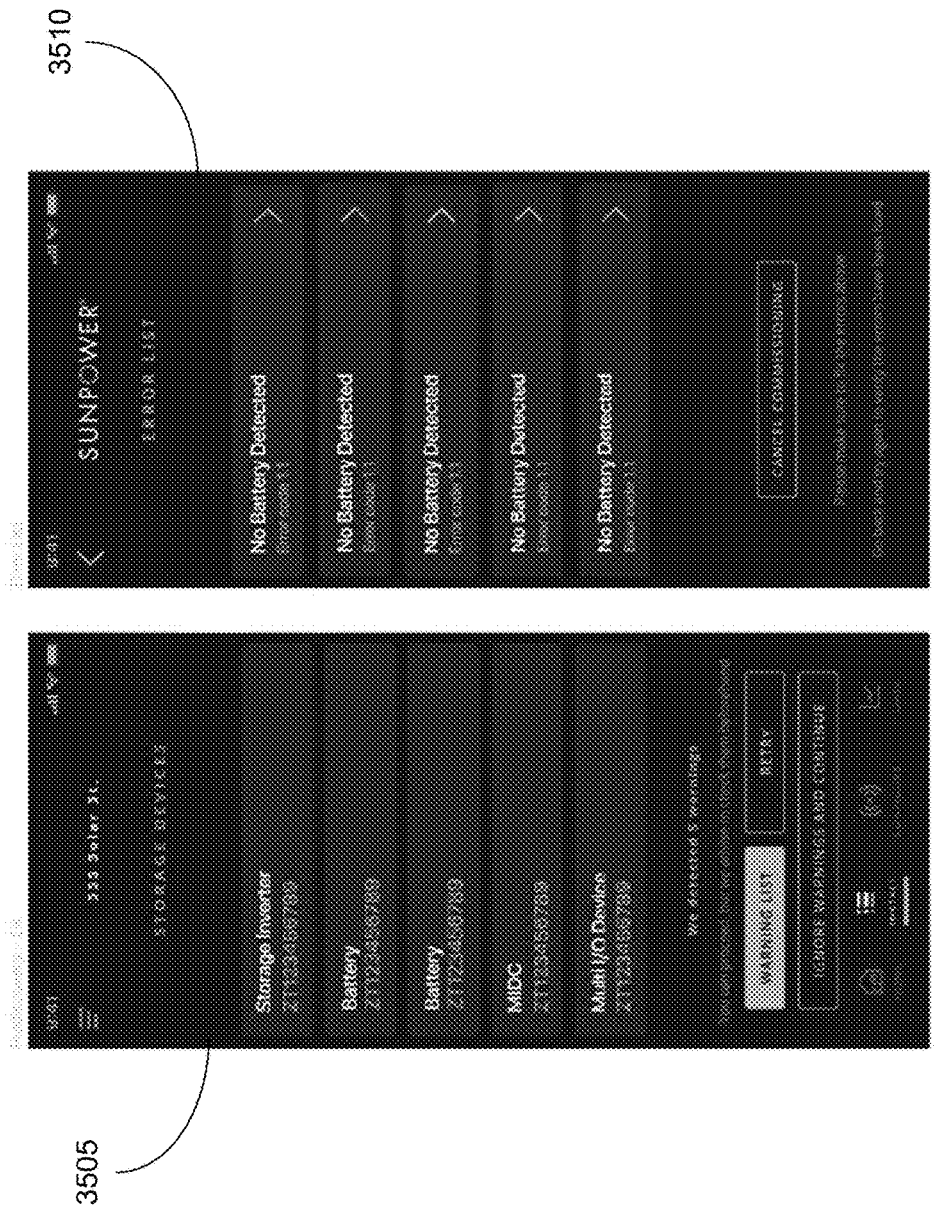
FIG. 35 illustrates an exemplary storage devices page when only warnings are detected and error list page, each implemented in the software application displayed on the mobile device according to one or more aspects of the disclosed subject matter.

FIG. 35 illustrates an exemplary storage devices page 3505 when only warnings are detected and error list page 3510, each implemented in the software application displayed on the mobile device 2510 according to one or more aspects of the disclosed subject matter.

It should be appreciated that the interfaces illustrated in FIGS. 32-35 which illustrate discovering storage devices connected to the energy storage system can be based on the output of the algorithmic flow chart of FIG. 27 (e.g., whether any errors are raised when the bitmap does not match expected system size).

Figure 36:
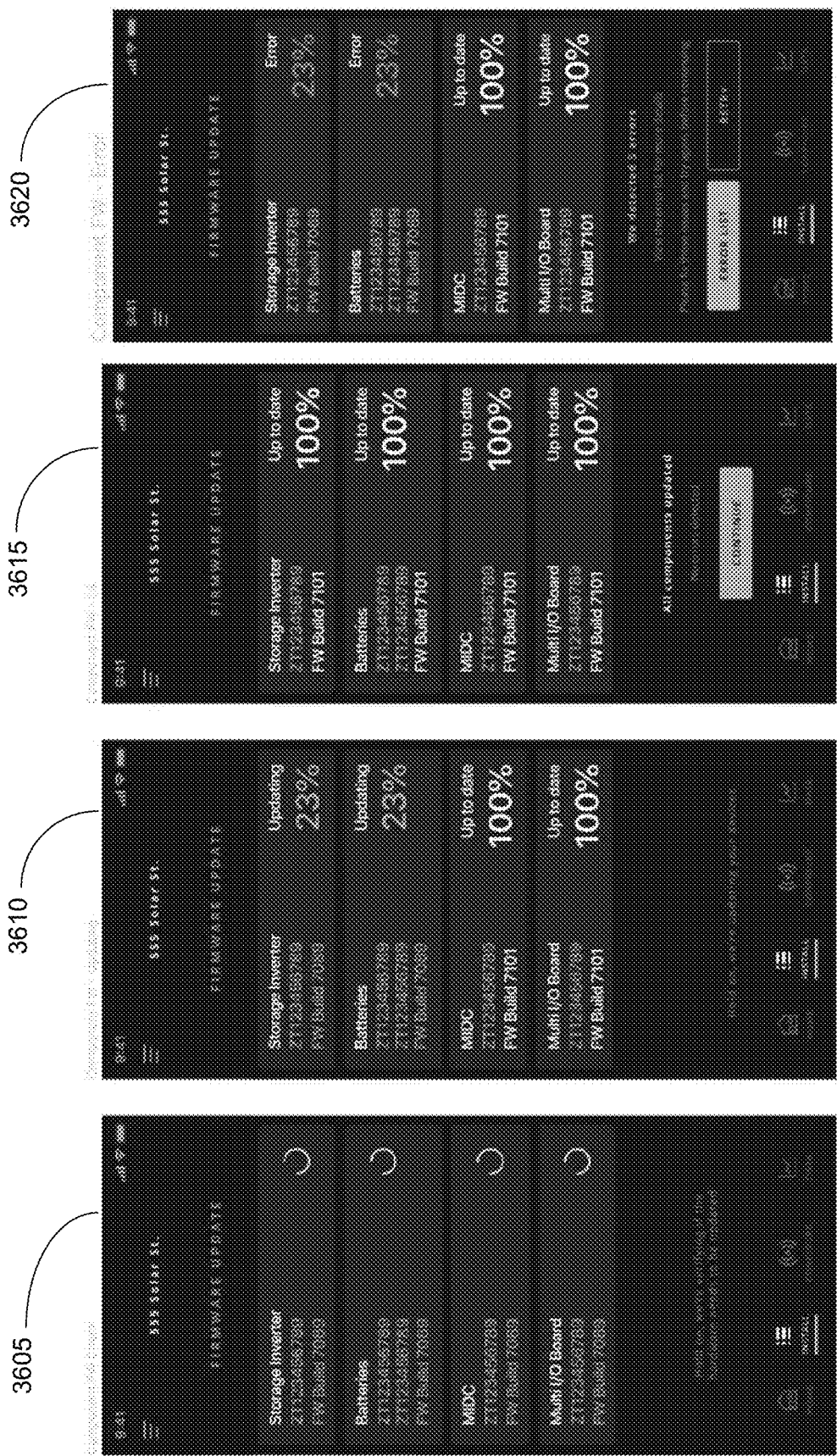
FIG. 36 illustrates an exemplary firmware update checking page, firmware updating page, firmware update complete page, and firmware update error page, each implemented in the software application displayed on the mobile device according to one or more aspects of the disclosed subject matter.

FIG. 36 illustrates an exemplary firmware update checking page 3605, firmware updating page 3610, firmware update complete page 3615, and firmware update error page 3620, each implemented in the software application displayed on the mobile device 2510 according to one or more aspects of the disclosed subject matter.

Figure 37:
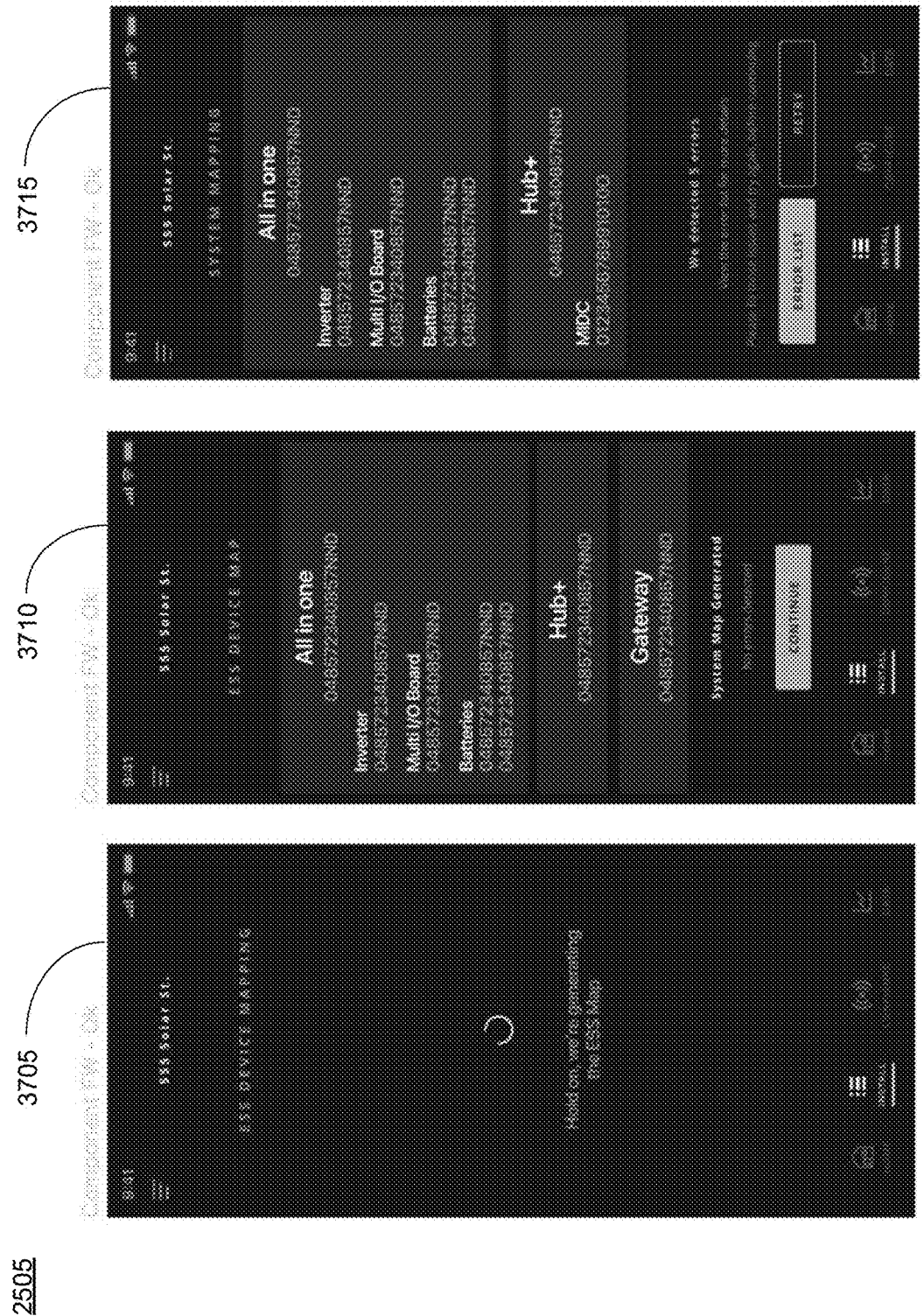
FIG. 37 illustrates an exemplary energy storage system device mapping page, ESS device map page when no errors are detected, and ESS device map page when errors are detected, each implemented in the software application displayed on the mobile device according to one or more aspects of the disclosed subject matter.

FIG. 37 illustrates an exemplary energy storage system device mapping page 3705, ESS device map 3710 when no errors are detected, and ESS device map page 3715 when errors are detected, each implemented in the software application displayed on the mobile device 2510 according to one or more aspects of the disclosed subject matter. It should be appreciated that the interfaces illustrated in FIG. 37 can be based on the output of the algorithmic flow chart of FIG. 28 and the battery architecture 2900 of FIG. 29.

Figure 38:
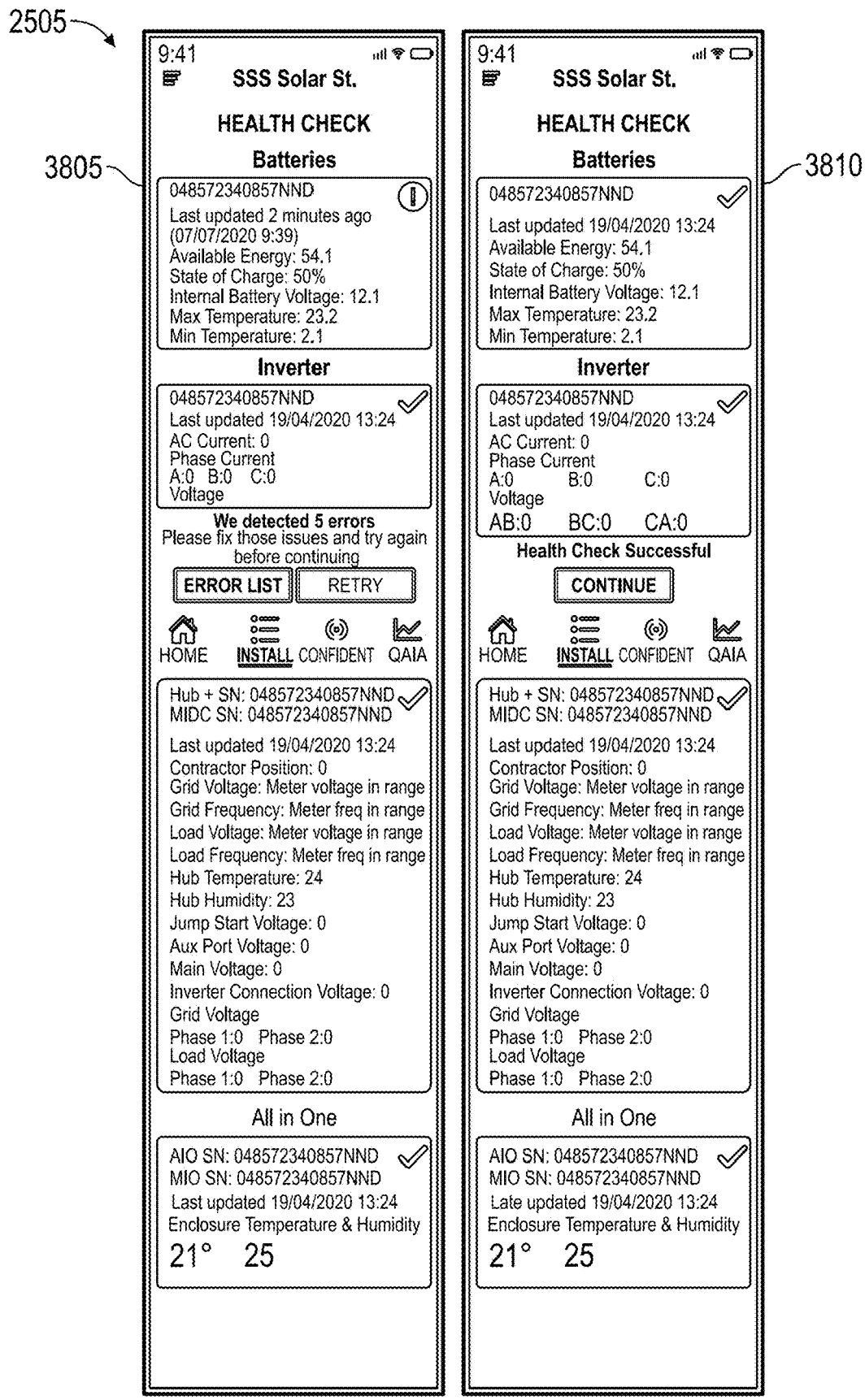
FIG. 38 illustrates an exemplary health check page when errors are detected and health check page when no errors are detected, each implemented in the software application displayed on the mobile device according to one or more aspects of the disclosed subject matter.

FIG. 38 illustrates an exemplary health check page 3805 when errors are detected and health check page 3810 when no errors are detected, each implemented in the software application displayed on the mobile device 2510 according to one or more aspects of the disclosed subject matter. The health checks can further include checking for positions of the AC or DC breakers within in the system. For example, the system can check whether DC breakers are On/Off between batteries and the inverter, the AC breakers from PV system, the AC breakers from the storage system, the AC breakers from the main service, the remote power off (RPO) switch is engaged, and the like. Additionally, the health checks can include internal component level current sensing (if single or multiple sensors are coupled) or voltage sensing (at different places match or differ). This applies to current sensing on solar system or storage system or site level consumption. Further, the health checks can include internal component level current sensing transformer scaling factor (when single or multiple sensors are coupled in different site configurations). This applies to current sensing on solar system or storage system or site level consumption. Whether sub-component COM terminations are missing for batteries or inverters or any other supporting devices can also be checked. Further, it should be appreciated that health check can be interchangeable with device health check, self test, diagnostic test, and diagnostic mode.

Figure 39:
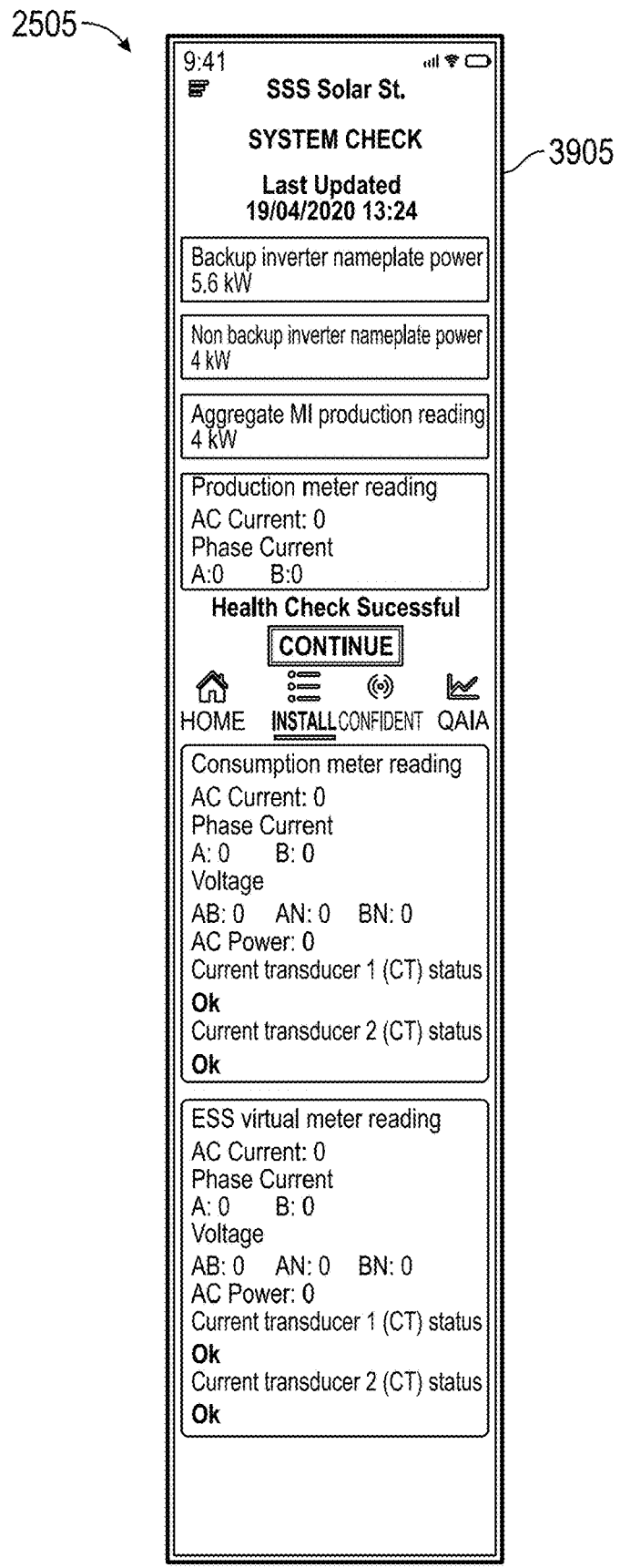
FIG. 39 illustrates an exemplary system check page implemented in the software application displayed on the mobile device according to one or more aspects of the disclosed subject matter.

FIG. 39 illustrates an exemplary system check page 3905 implemented in the software application displayed on the mobile device 2510 according to one or more aspects of the disclosed subject matter. It should be appreciated that the interface illustrated in FIG. 39 can be based on the output of the algorithmic flow chart of FIG. 31. Further, it should be appreciated that system check can be interchangeable with system integration test and system test.

In one aspect, the error detection described in FIGS. 32-39 can be included in the commissioning application during the installation process under the install tab. For example, FIGS. 32-39 can correspond to an "install" portion of the user interface of the commissioning application (e.g., starting after FIG. 20).

In one aspect, the commissioning can include analytics tracked through the software application, for example. The analytics can capture the amount of time that the user spent on each step or page of the process. This information can be related to one or more of any issues the user may have faced and troubleshooting on the step, the software application itself being very slow in responsiveness, the amount of time taken for firmware updates, and the like. In other words, this information can be useful for providing more detailed information about the commissioning process, which can be used to further improve the commissioning process.

In one aspect, the commissioning process can include a mode corresponding to permission to operate. In other words, a "pre-PTO" mode can be a pre-permission to operate mode. Once the system is installed and commissioned, it can be set into pre-PTO mode where the system does not yet operate to support the customer but is capable of self-protecting from any damage and be in standby. Once the customer receives permission to operate (PTO) from the appropriate public entity, then the system can be operated as desired.

In the above description of FIGS. 6-9, 26-28, 30, and 31, any processes, descriptions or blocks in flowcharts can be understood as representing modules, segments or portions of code which include one or more executable instructions for implementing specific logical functions or steps in the process, and alternate implementations are included within the scope of the exemplary embodiments of the present advancements in which functions can be executed out of order from that shown or discussed, including substantially concurrently or in reverse order, depending upon the functionality involved, as would be understood by those skilled in the art. The various elements, features, and processes described herein may be used independently of one another or may be combined in various ways. All possible combinations and sub-combinations are intended to fall within the scope of this disclosure.

Figure 40:
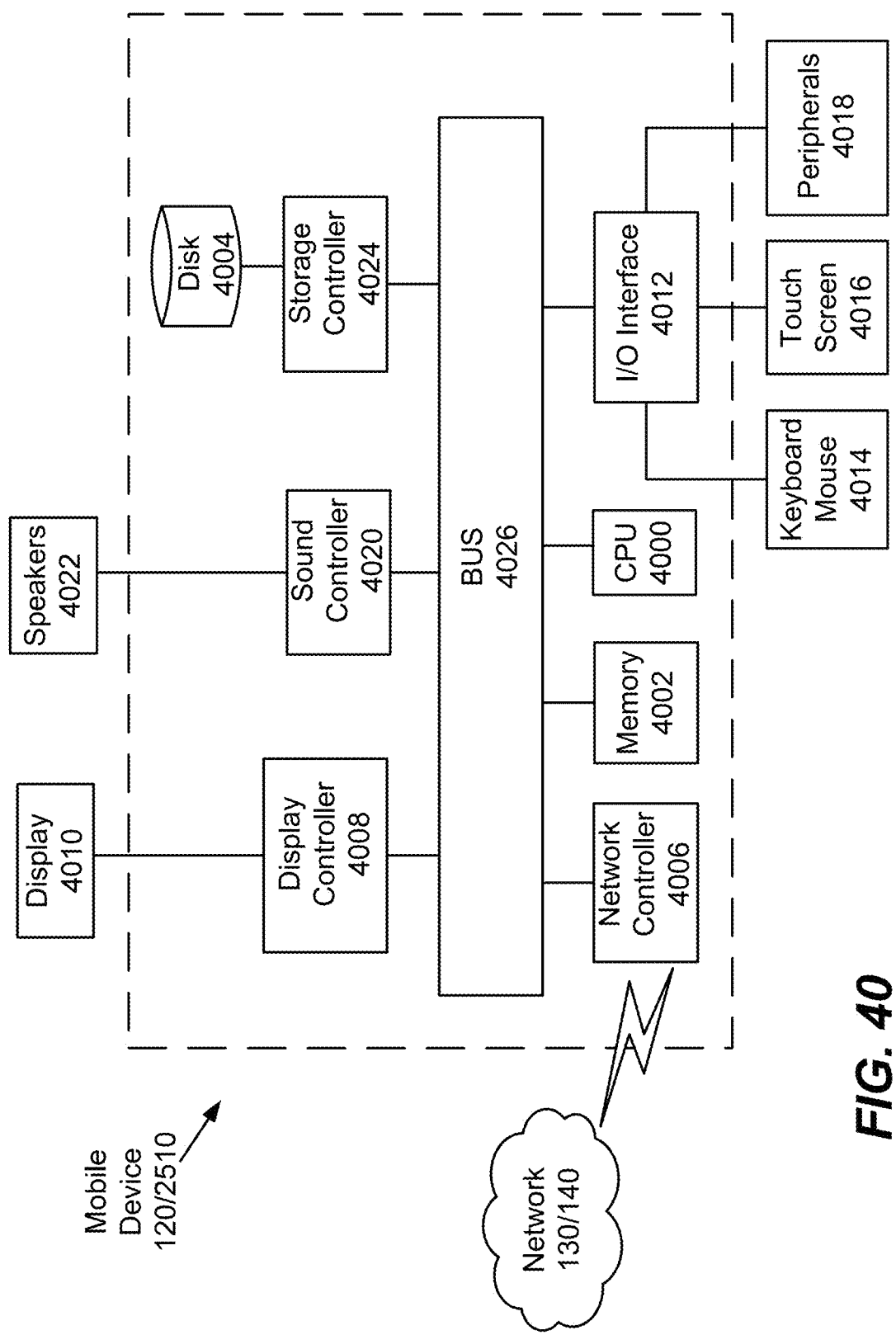
FIG. 40 is a hardware block diagram of a mobile device according to one or more exemplary aspects of the disclosed subject matter.

Next, a hardware description of a mobile device 120/2510 according to exemplary embodiments is described with reference to FIG. 40. The hardware description described herein can also be a hardware description of the processing circuitry. In FIG. 40, the mobile device 120/2510 includes a CPU 4000 which performs one or more of the processes described above/below. The process data and instructions may be stored in memory 4002. These processes and instructions may also be stored on a storage medium disk 4004 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the mobile device 120/2510 communicates, such as a server or computer.

Further, the claimed advancements may be provided as a utility application, background daemon, or component of an operating system, or combination thereof, executing in conjunction with CPU 4000 and an operating system such as Microsoft Windows, UNIX, Solaris, LINUX, Apple MAC-OS and other systems known to those skilled in the art.

The hardware elements in order to achieve the mobile device 120/2510 may be realized by various circuitry elements. Further, each of the functions of the above described embodiments may be implemented by circuitry, which includes one or more processing circuits. A processing circuit includes a particularly programmed processor, for example, processor (CPU) 4000, as shown in FIG. 40. A processing circuit also includes devices such as an application specific integrated circuit (ASIC) and conventional circuit components arranged to perform the recited functions.

In FIG. 40, the mobile device 120/2510 includes a CPU 4000 which performs the processes described above. The mobile device 120/2510 may be a general-purpose computer or a particular, special-purpose machine. In one embodiment, the mobile device 120/2510 becomes a particular, special-purpose machine when the processor 4000 is programmed to perform commissioning of a solar power system (and in particular, any of the processes discussed with reference to FIGS. 6-9, 26-28, 30, and 31).

Alternatively, or additionally, the CPU 4000 may be implemented on an FPGA, ASIC, PLD or using discrete logic circuits, as one of ordinary skill in the art would recognize. Further, CPU 4000 may be implemented as multiple processors cooperatively working in parallel to perform the instructions of the inventive processes described above.

The mobile device 120/2510 in FIG. 40 also includes a network controller 4006, such as an Intel Ethernet PRO network interface card from Intel Corporation of America, for interfacing with network 130/140. As can be appreciated, the network 130/140 can be a public network, such as the Internet, or a private network such as an LAN or WAN network, or any combination thereof and can also include PSTN or ISDN sub-networks. The network 130/140 can also be wired, such as an Ethernet network or via power line communication (PLC), or can be wireless such as a cellular network including EDGE, 3G and 4G wireless cellular systems. The wireless network can also be Wi-Fi, Bluetooth, or any other wireless form of communication that is known.

The mobile device 120/2510 further includes a display controller 4008, such as a graphics card or graphics adaptor for interfacing with display 4010, such as a monitor. A general purpose I/O interface 4012 interfaces with a keyboard and/or mouse 4014 as well as a touch screen panel 4016 on or separate from display 4010. General purpose I/O interface also connects to a variety of peripherals 4018 including printers and scanners.

A sound controller 4020 is also provided in the mobile device 120/2510 to interface with speakers/microphone 4022 thereby providing sounds and/or music.

The general-purpose storage controller 4024 connects the storage medium disk 4004 with communication bus 4026, which may be an ISA, EISA, VESA, PCI, or similar, for interconnecting all of the components of the mobile device 120/2510. A description of the general features and functionality of the display 4010, keyboard and/or mouse 4014, as well as the display controller 4008, storage controller 4024, network controller 4006, sound controller 4020, and general purpose I/O interface 4012 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset.

The functions and features described herein may also be executed by various distributed components of a system. For example, one or more processors may execute these system functions, wherein the processors are distributed across multiple components communicating in a network. The distributed components may include one or more client and server machines, which may share processing, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

Having now described embodiments of the disclosed subject matter, it should be apparent to those skilled in the art that the foregoing is merely illustrative and not limiting, having been presented by way of example only. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicant(s) intend(s) to embrace all such alternatives, modifications, equivalents, and variations that are within the spirit and scope of the disclosed subject matter.

The invention claimed is:

1. A method for commissioning a solar power system, comprising:
    imaging a plurality of labels, wherein each label of the plurality of labels is associated with an electronic component of a solar module;
    discovering each electronic component at the same time based on the imaging of the plurality of labels;
    displaying a list of the discovered electronic components; and
    commissioning a solar power monitoring system including the discovered electronic components for use, wherein the commissioning includes assigning logical addresses to associate each electronic component with the solar power monitoring system.

2. The method of claim 1, wherein the electronic component is a power optimizer.

3. The method of claim 1, wherein the electronic component is a microinverter.

4. The method of claim 1, wherein each of the one or more labels includes a unique identifier for identifying each of the electronic components explicitly.

5. The method of claim 1, wherein the imaging corresponds to a bulk scanning of the plurality of labels, wherein the bulk scanning reads each of the plurality of labels at the same time.

6. The method of claim 5, further comprising:
    determining a relative position of each solar module in a solar module array based on the bulk scanning.

7. The method of claim 6, further comprising:
    mapping the relative position of each solar module in the solar module array to a representation of a roof on which the solar panel system is installed.

8. The method of claim 7, further comprising:
    in response to a determination that an electronic component is not functioning properly, indicating on the representation of the roof on which the solar module array is installed which solar panel corresponds to the electronic component that is not functioning properly.

9. The method of claim 1, further comprising:
    requesting acknowledgment from each electronic component; and
    in response to a determination that an electronic component is not functioning properly, indicating that the electronic component is faulted.

10. The method of claim 1, further comprising:
    in response to a determination that an electronic component is not functioning properly, displaying trouble shooting information.

11. A method for commissioning a solar power system, comprising:
    discovering electronic components of the solar power system;
    mapping the electronic components in a solar power system topology;
    determining a health status of the electronic components; and
    determining a health status of the solar power system.

12. The method for commissioning a solar power system according to claim 11, wherein discovery includes determining the electronic components connected to a PV monitoring and control system.

13. The method for commissioning a solar power system according to claim 11, wherein mapping the electronic components in a solar power system topology comprises associating one or more batteries with one or more inverters of the solar power system.

14. The method for commissioning a solar power system according to claim 11, wherein determining health status of the electronic components includes obtaining a battery state of charge (SOC); and
    determining whether the battery SOC is within an predetermined acceptable range.

15. The method for commissioning a solar power system according to claim 11, wherein determining health status of the electronic components includes
    obtaining a battery state of charge temperature; and
    determining whether the battery state of charge temperature is within an acceptable range.

16. The method for commissioning a solar power system according to claim 11, wherein determining health status of the solar power system includes correlating one or more parameters between the electronic components of the solar power system.

17. The method for commissioning a solar power system according to claim 11, further comprising updating firmware for electronic components external to a battery.

18. One or more computer readable medium including computer program instructions, which when executed by an information processing system, cause the system to:
   discover electronic components of the solar power system;
   map the electronic components in a solar power system topology;
   determine a health status of the electronic components; and
   determine a health status of the solar power system.

19. The one or more computer readable medium of claim 18, wherein the information processing system is a mobile device.

20. The one or more computer readable medium of claim 18, wherein the information processing system is a server.

* * * * *